US012720290B1

(12) United States Patent
Nugiel et al.

(10) Patent No.: US 12,720,290 B1
(45) Date of Patent: Aug. 25, 2026

(54) CONTEXT-BASED SMS MESSAGING FOR SECURITY SYSTEM

(71) Applicant: SimpliSafe, Inc., Boston, MA (US)

(72) Inventors: Molly Nugiel, Somerville, MA (US); Matthew Hosking, Boston, MA (US); Samuel Hutchinson, Waltham, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 19/335,610

(22) Filed: Sep. 22, 2025

(51) Int. Cl.
*H04W 4/90* (2018.01)
*H04W 4/14* (2009.01)
*H04W 64/00* (2009.01)

(52) U.S. Cl.
CPC ............... *H04W 4/90* (2018.02); *H04W 4/14* (2013.01); *H04W 64/00* (2013.01)

(58) Field of Classification Search
CPC .................... G06F 40/30; G06F 16/38; H04M 2203/4581; H04M 2203/654; H04M 15/66; H04M 3/4936; H04M 1/67; H04M 1/72454; H04M 15/8038; H04M 1/72463; H04M 1/724631; H04M 2250/74; H04M 15/61; H04M 15/8228; H04M 1/72418; H04M 15/82; H04M 1/72457; H04M 15/62; H04M 15/8016; H04M 15/85; H04M 2250/52; H04M 1/72412; H04M 1/72445; H04M 15/41; H04M 15/8044; H04M 15/8214; H04M 2207/18; H04M 2250/10; H04M 3/42136; H04M 3/42382; H04M 3/436; H04M 3/533; H04M 3/54; H04M 1/72421; H04M 1/72424; H04M 1/72466; H04M 15/00; H04M 15/50;
(Continued)

(56) References Cited

U.S. PATENT DOCUMENTS 7,817,029 B1 * 10/2010 Hillenburg ........... G08B 25/001
340/541
8,489,065 B2 * 7/2013 Green .............. G08B 13/19684
455/404.1
(Continued)

FOREIGN PATENT DOCUMENTS

WO WO-9816412 A1 * 4/1998 ............. G08B 25/08

OTHER PUBLICATIONS

"What are Alarm Texts and how do I use them?", https://simplisafe.com/alarmtexts, accessible as of Oct. 28, 2022.
(Continued)

*Primary Examiner* — Matthew C Sams
(74) *Attorney, Agent, or Firm* — Pierce Atwood LLP

(57) ABSTRACT

A computing system may cause transmission of a short message service (SMS) message to an endpoint device, the SMS message being indicative of a signal for an alarm condition present at a monitored location. The computing system may determine that a reply to the SMS message from the endpoint device includes a command to take an action with respect to the alarm condition. The computing system may retrieve, from one or more data stores, context about an incident at the monitored location. The computing system may send, based at least in part on the command and the context, at least one instruction to take an action with respect to the alarm condition.

20 Claims, 19 Drawing Sheets

(58) Field of Classification Search
CPC ... H04M 2250/12; H04W 4/90; H04W 60/00; H04W 48/18; H04W 60/04; H04W 76/12; H04W 72/23; H04W 76/27; H04W 84/042; H04W 76/10; H04W 24/10; H04W 8/08; H04W 12/06; H04W 76/11; H04W 80/10; H04W 60/06; H04W 72/0446; H04W 8/18; H04W 48/16; H04W 88/14; H04W 24/02; H04W 76/18; H04W 76/30; H04W 68/005; H04W 28/0268; H04W 4/029; H04W 74/0833; H04W 80/02; H04W 4/70; H04W 76/28; H04W 72/1268; H04W 8/24; H04W 8/02; H04W 28/24; H04W 64/00; H04W 88/06; H04W 4/40; H04W 72/0453; H04W 12/08; H04W 36/0033; H04W 48/02; H04W 72/21; H04W 74/0808; H04W 68/02; H04W 76/34; H04W 76/22; H04W 76/25; H04W 8/22; H04W 4/027; H04W 24/08; H04W 76/20; H04W 16/14; H04W 36/0016; H04W 4/02; H04W 4/24; H04W 76/32; H04W 8/06; H04W 8/20; H04W 74/0836; H04W 76/19; H04W 36/0011; H04W 4/30; H04W 48/12; H04W 76/15; H04W 4/33; H04W 72/1273; H04W 74/0816; H04W 72/20; H04W 74/006; H04W 28/06; H04W 72/232; H04W 84/06; H04W 4/50; H04W 48/08; H04W 64/003; H04W 8/12; H04W 92/18; H04W 12/72; H04W 4/46; H04W 56/001; H04W 76/14; H04W 72/542; H04W 72/56; H04W 76/16; H04W 72/04; H04W 8/186; H04W 92/24; H04W 36/08; H04W 4/06; H04W 4/44; H04W 48/04; H04W 74/0838; H04W 88/08; H04W 36/0022; H04W 4/14; H04W 48/14; H04W 72/044; H04W 74/0866; H04W 8/183; H04W 88/085; H04W 4/16; H04W 4/80; H04W 48/17; H04W 52/146; H04W 72/02; H04W 72/569; H04W 74/002; H04W 76/40; H04W 88/02; H04W 28/086; H04W 40/02; H04W 72/046; H04W 72/1263; H04W 8/26; H04W 84/12; H04W 12/069; H04W 28/02; H04W 36/0058; H04W 36/14; H04W 52/0229; H04W 8/005; H04W 8/065; H04W 12/033; H04W 12/106; H04W 28/0236; H04W 28/20; H04W 36/0066; H04W 36/1443; H04W 4/08; H04W 74/0841; H04W 80/08; H04W 88/18; H04W 12/02; H04W 16/18; H04W 52/0216; H04W 72/543; H04W 76/50; H04W 8/082; H04W 88/16; H04W 92/10; H04W 12/40; H04W 28/10; H04W 28/22; H04W 36/26; H04W 36/322; H04W 4/12; H04W 52/0209; H04W 52/08; H04W 52/242; H04W 68/00; H04W 72/25; H04W 72/30; H04W 88/023; H04W 92/20; H04W 12/03; H04W 12/082; H04W 12/122; H04W 16/28; H04W 28/0289; H04W 28/0861; H04W 36/12; H04W 40/24; H04W 48/00; H04W 48/10; H04W 52/0235; H04W 60/02; H04W 72/1215; H04W 74/004; H04W 76/00; H04W 8/14; H04W 84/045; H04W 92/02; H04W 12/041; H04W 12/37; H04W 36/00222; H04W 36/0088; H04W 36/02; H04W 40/246; H04W 48/06; H04W 52/028; H04W 52/367; H04W 56/005; H04W 76/38; H04W 8/00; H04W 8/205; H04W 84/18; H04W 88/04; H04W 12/0431; H04W 12/062; H04W 24/00; H04W 28/0263; H04W 28/084; H04W 28/0865; H04W 36/0019; H04W 36/0055; H04W 36/13; H04W 36/142; H04W 36/144; H04W 4/60; H04W 56/0015; H04W 56/0045; H04W 60/005; H04W 72/12; H04W 84/047; H04W 12/037; H04W 12/12; H04W 12/71; H04W 24/06; H04W 36/0027; H04W 36/38; H04W 4/021; H04W 4/023; H04W 4/20; H04W 40/248; H04W 52/0254; H04W 52/0261; H04W 52/243; H04W 52/42; H04W 72/0466; H04W 72/231; H04W 72/40; H04W 72/51; H04W 72/53; H04W 72/541; H04W 76/23; H04W 8/16; H04W 88/10; H04W 12/068; H04W 12/10; H04W 16/02; H04W 28/0273; H04W 28/0278; H04W 28/082; H04W 28/088; H04W 28/0933; H04W 36/00226; H04W 36/0061; H04W 36/0064; H04W 36/00692; H04W 36/10; H04W 36/1446; H04W 36/22; H04W 36/32; H04W 4/026; H04W 40/12; H04W 40/36; H04W 52/325; H04W 56/00; H04W 72/27; H04W 72/52; H04W 72/566; H04W 8/04; H04W 8/245; H04W 84/005; H04W 88/12; H04W 92/12; H04W 92/16; H04W 12/043; H04W 12/30; H04W 12/77; H04W 28/0205; H04W 28/04; H04W 28/065; H04W 28/0942; H04W 28/0958; H04W 28/16; H04W 28/18; H04W 36/00; H04W 36/0005; H04W 36/0044; H04W 36/00698; H04W 36/00837; H04W 36/0085; H04W 36/0094; H04W 4/025; H04W 40/34; H04W 48/20; H04W 52/0232; H04W 52/0248; H04W 52/0251; H04W 52/16; H04W 52/50; H04W 52/52; H04W 56/0005; H04W 68/12; H04W 72/0457; H04W 72/535; H04W 74/0891; H04W 76/36; H04W 84/02; H04W 84/027; H04W 12/04; H04W 12/0471; H04W 12/35; H04W 12/50; H04W 12/69; H04W 12/75; H04W 12/76; H04W 28/0231; H04W 28/0862; H04W 28/0867; H04W 36/0069; H04W 36/0072; H04W 36/0235; H04W 36/085; H04W 36/087; H04W 36/125; H04W 36/16; H04W 36/24; H04W 36/304; H04W 36/305; H04W 4/00; H04W 4/10; H04W 4/21; H04W 40/22; H04W 52/0212; H04W 52/346; H04W 52/362; H04W 52/48; H04W 64/006; H04W 72/11; H04W 72/115; H04W 72/121; H04W 72/512; H04W 72/54; H04W 72/563; H04W 74/02; H04W 74/085; H04W 8/10; H04W 80/04; H04W 80/06; H04W 80/12; H04W 92/04; H04W 12/108; H04W 12/121; H04W 12/128; H04W 12/45; H04W 12/65; H04W 12/73; H04W 12/79; H04W 16/10; H04W 28/0252; H04W 28/0284; H04W 28/08; H04W 28/0831; H04W 28/0835; H04W 28/0846; H04W 28/0917; H04W 28/0925; H04W 28/12; H04W 36/0038; H04W 36/008375; H04W 36/026; H04W 36/06; H04W 36/249; H04W 36/324; H04W 36/362; H04W 4/022; H04W 4/42; H04W 4/48; H04W 40/005; H04W 40/20; H04W 52/02; H04W 52/10; H04W 52/18; H04W 52/226; H04W 52/247; H04W 52/248; H04W 52/281; H04W 52/36; H04W 52/365; H04W 52/40; H04W 52/58; H04W 56/002; H04W 56/003; H04W 56/0065; H04W 68/025; H04W 68/08; H04W 72/0473; H04W 72/50; H04W 74/08; H04W 74/0875; H04W 84/105; G08B 21/12; G08B 29/00; G08B 25/08; G08B 21/185; G08B 6/00; H04L 5/0053; H04L 5/0048; H04L 5/0051; H04L 5/0094; H04L 5/001; H04L 5/0044; H04L 5/0023; H04L 41/0894; H04L 12/1407; H04L 65/80; H04L 5/0055; H04L 41/0895; H04L 5/0007; H04L 41/40; H04L 1/08; H04L 1/1812; H04L 65/1069; H04L 67/14; H04L 41/0806; H04L 5/0092; H04L 65/1016; H04L 5/0091; H04L 27/0006; H04L 27/2607; H04L 65/1073; H04L 5/0035; H04L 5/005; H04L 67/148; H04L 5/0057; H04L 27/2636; H04L 41/342; H04L 41/5041; H04L 5/0064; H04L 5/0098; H04L 65/1104; H04L 67/142; H04L 27/261; H04L 5/1469; H04L 65/1089; H04L 67/143; H04L 1/1614; H04L 2463/082; H04L 41/5019; H04L 5/0073; H04L 63/0853; H04L 69/327; H04L 1/1822; H04L 1/1887; H04L 27/26025; H04L 63/0876; H04L 63/126; H04L 67/12; H04L 67/141; H04L 1/1854; H04L 1/1861; H04L 1/1896; H04L 27/2613; H04L 41/0896; H04L 5/0078; H04L 67/10; H04L 1/0026; H04L 43/08; H04L 5/14; H04L 63/0861; H04L 63/1441; H04L 67/51; H04L 12/6418; H04L 43/20; H04L 47/20; H04L 47/805; H04L 5/006; H04L 63/06; H04L 63/0838; H04L 63/107; H04L 69/04; H04L 69/24; H04L 1/0072; H04L 1/1819; H04L 1/189; H04L 41/0893; H04L 41/5051; H04L 43/06; H04L 43/0876; H04L 5/0032; H04L 5/0082; H04L 63/20; H04L 65/65; H04L 65/756; H04L 1/0025; H04L 1/0061; H04L 1/0071; H04L 1/1671; H04L 12/14; H04L 2101/618; H04L 2101/622; H04L 41/16; H04L 41/5009; H04L 45/125; H04L 5/0042; H04L 5/0062; H04L 63/0823; H04L 63/102; H04L 63/205; H04L 1/0002; H04L 1/0003; H04L 25/0226; H04L 43/12; H04L 45/24; H04L 5/0005; H04L 5/0046; H04L 61/4511; H04L 63/0428; H04L 63/105; H04L 63/12; H04L 63/1416; H04L 63/1425; H04L 65/752; H04L 67/06; H04L 69/322; H04L 9/3213; H04L 1/0041; H04L 12/185; H04L 2001/0093; H04L 27/2601; H04L 27/2602; H04L 27/2614; H04L 41/06; H04L 41/0816; H04L 41/5058; H04L 47/2416; H04L 47/801; H04L 5/0012; H04L 5/0016; H04L 5/0037; H04L 61/5007; H04L 63/083; H04L 63/0869; H04L 63/0892; H04L 63/101; H04L 63/1466; H04L 65/1063; H04L 67/02; H04L 67/34; H04L 69/22; H04L 69/40; H04L 1/0013; H04L 1/0017; H04L 1/0029; H04L 1/0067; H04L 1/16; H04L 1/1628; H04L 1/188; H04L 1/1893; H04L 12/2803; H04L 12/282; H04L 12/2823; H04L 12/56; H04L 2012/2841; H04L 2012/2843; H04L 27/26134; H04L 41/082; H04L 41/0886; H04L 41/12; H04L 41/145; H04L 41/22; H04L 43/0852; H04L 43/0894; H04L 43/16; H04L 45/04; H04L 45/243; H04L 47/2483; H04L 47/28; H04L 47/283; H04L 47/34; H04L 47/724; H04L 47/746; H04L 5/00; H04L 5/0083; H04L 5/10; H04L 61/4541; H04L 63/062; H04L 63/162; H04L 67/1021; H04L 67/303; H04L 67/306; H04L 67/56; H04L 67/566; H04L 67/63; H04L 9/08; H04L 9/32; H04L 1/0016; H04L 1/0038; H04L 1/1664; H04L 1/1825; H04L 1/1858; H04L 1/1864; H04L 1/1867; H04L 1/20; H04L 12/1425; H04L 2209/24; H04L 2209/805; H04L 2209/88; H04L 27/26132; H04L 27/265; H04L 41/0813; H04L 41/122; H04L 43/0805; H04L 43/0864; H04L 47/125; H04L 47/2441; H04L 47/2475; H04L 5/0014; H04L 5/0041; H04L 5/06; H04L 63/0435; H04L 63/0442; H04L 63/0807; H04L 65/1045; H04L 65/70; H04L 67/146; H04L 67/289; H04L 67/52; H04L 67/59; H04L 9/0618; H04L 9/065; H04L 9/0866; H04L 9/3215; H04L 9/3226; H04L 9/3236; H04L 9/3239; H04L 9/3271; H04L 9/3273; H04L 9/50; H04L 1/0004; H04L 1/0007; H04L 1/0009; H04L 1/0023; H04L 1/0045; H04L 1/0057; H04L 1/0068; H04L 1/1642; H04L 1/1678; H04L 1/187; H04L 1/1874; H04L 1/203; H04L 12/2807; H04L 12/2818; H04L 12/2825; H04L 12/2836; H04L 12/66; H04L 2001/0097; H04L 2101/663; H04L 2209/60; H04L 2209/601; H04L 2209/603; H04L 2209/80; H04L 25/0224; H04L 27/0008; H04L 27/18; H04L 27/2014; H04L 27/22; H04L 27/2603; H04L 41/044; H04L 41/0663; H04L 41/0686; H04L 41/0873; H04L 41/5022; H04L 41/5048; H04L 43/065; H04L 45/037; H04L 45/0377; H04L 45/50; H04L 45/74; H04L 47/19; H04L 47/24; H04L 47/25; H04L 47/726; H04L 47/78; H04L 5/0003; H04L 5/0025; H04L 5/0033; H04L 5/0085; H04L 5/0087; H04L 5/02; H04L 5/1461; H04L 5/16; H04L 51/224; H04L 51/42; H04L 54/58; H04L 61/251; H04L 63/0272; H04L 63/04; H04L 63/061; H04L 63/08; H04L 63/0815; H04L 63/10; H04L 63/104; H04L 63/1433; H04L 63/145; H04L 65/1059; H04L 65/40; H04L 65/403; H04L 65/4053; H04L 65/611; H04L 65/612; H04L 65/764; H04L 67/1097; H04L 67/125; H04L 67/147; H04L 67/60; H04L 67/61; H04L 9/3242; H04L 1/00; H04L 1/0027; H04L 1/003; H04L 1/0034; H04L 1/0052; H04L 1/0059; H04L 1/0064; H04L 1/06; H04L 1/1607; H04L 1/1685; H04L 1/18; H04L 1/1829; H04L 1/1848; H04L 12/12; H04L 12/1435; H04L 12/18; H04L 12/1868; H04L 12/189; H04L 12/2876; H04L 2012/5607; H04L 2012/5656; H04L 2209/56; H04L 2463/144; H04L 27/02; H04L 27/26; H04L 27/26035; H04L 27/2605; H04L 27/26522; H04L 27/2655; H04L 27/36; H04L 41/0668; H04L 41/0823; H04L 4/14; H04L 41/147; H04L 41/50; H04L 41/5054; H04L 41/5067; H04L 41/5096; H04L 43/062; H04L 43/067; H04L 43/0817; H04L 43/0858; H04L 43/091; H04L 45/12; H04L 45/121; H04L 45/122; H04L 45/22; H04L 45/28; H04L 45/655; H04L 45/742; H04L 45/76; H04L 47/00; H04L 47/12; H04L 47/2491; H04L 47/783; H04L 47/803; H04L 47/83; H04L 49/35; H04L 5/0026; H04L 5/0039; H04L 5/0096; H04L 51/04; H04L 51/18; H04L 51/222; H04L 61/2503; H04L 61/2514; H04L 61/255; H04L 61/2589; H04L 61/5014; H04L 61/5046; H04L 61/5076; H04L 63/0236; H04L 63/0254; H04L 63/1458; H04L 65/1066; H04L 65/1083; H04L 65/1108; H04L 65/75; H04L 65/762; H04L 67/04; H04L 67/1008; H04L 67/1017; H04L 67/50; H04L 67/53; H04L 67/535; H04L 69/163; H04L 69/326; H04B 7/0695; H04B 7/088; H04B 7/0626; H04B 17/318; H04B 7/0617; H04B 7/063; H04B 7/0639; H04B 7/06956; H04B 7/06964; H04B 7/195; H04B 17/345; H04B 7/0404; H04B 7/024; H04B 7/0456; H04B 7/18504; H04B 7/0632; H04B 17/336; H04B 7/0874; H04B 7/185; H04B 7/18526; H04B 7/18539; H04B 7/19; H04B 17/29; H04B 7/0417; H04B 7/06968; H04B 7/18545; H04B 1/69; H04B 15/00; H04B 2001/6904; H04B 7/022; H04B 7/0478; H04B 7/0479; H04B 7/0481; H04B 7/0658; H04B 7/0663; H04B 7/06952; H04B 7/06958; H04B 7/06966; H04B 7/086; H04B 7/18513; H04B 7/24; H04B 1/713; H04B 17/309; H04B 17/328; H04B 5/70; H04B 7/0469; H04B 7/0689; H04B 7/0691; H04B 7/18506; H04B 1/385; H04B 11/00; H04B 17/15; H04B 17/252; H04B 17/382; H04B 7/02; H04B 7/0413; H04B 7/043; H04B 7/0634; H04B 7/0665; H04B 7/15542; H04B 7/15557; H04B 7/2643; H04B 1/3816; H04B 1/7143; H04B 17/00; H04B 17/12; H04B 17/17; H04B 17/24; H04B 17/254; H04B 17/3913; H04B 2201/698; H04B 7/0408; H04B 7/0452; H04B 7/0486; H04B 7/0608; H04B 7/061; H04B 7/0623; H04B 7/0888

See application file for complete search history.

(56) References Cited

U.S. PATENT DOCUMENTS

| | | | | |
|---|---|---|---|---|
| 9,754,467 | B1 * | 9/2017 | Harrison | F41C 33/06 |
| 12,073,706 | B1 | 8/2024 | Rajkovic et al. | |
| 12,379,827 | B2 * | 8/2025 | Klimczak | G06F 3/04883 |
| 2006/0145841 | A1 * | 7/2006 | Daurensan | G08B 15/004 340/539.22 |
| 2006/0227001 | A1 * | 10/2006 | Petricoin | G08B 5/36 340/517 |
| 2009/0083828 | A1 * | 3/2009 | Romanczyk | G08B 25/14 726/1 |
| 2012/0268267 | A1 * | 10/2012 | Anderson | B60R 25/33 340/539.1 |
| 2012/0282974 | A1 * | 11/2012 | Green | G08B 13/19684 455/550.1 |
| 2017/0134895 | A1 * | 5/2017 | Rabb | G08B 29/24 |
| 2021/0280050 | A1 * | 9/2021 | Trundle | G08B 25/001 |
| 2022/0198913 | A1 * | 6/2022 | Thompson | G08B 27/001 |
| 2025/0259530 | A1 | 8/2025 | MacDonald et al. | |

OTHER PUBLICATIONS

"What are Alarm Texts and how do I use them?", https://simplisafe.com/alarmtexts, accessible as of Jun. 1, 2023.

"What are Alarm Texts and how do I use them?", https://simplisafe.com/alarmtexts, accessible as of Dec. 13, 2023.

"What are Alarm Texts and how do I use them?", https://simplisafe.com/alarmtexts, accessible as of Mar. 1, 2024.

"What are Alarm Texts and how do I use them?", https://simplisafe.com/alarmtexts, accessible as of Sep. 4, 2024.

* cited by examiner

718
Base Station
614
User
Interface
712
Non-volatile
Memory
706
Code
708
Data
710
716
Processor
700
Volatile
Memory
702
Network
Interface
704
Battery
Assembly
714

Source 1301
Event Data 1302
Event Queue 1303
Source 1301
Event Data 1302
Event Queue 1303
Source 1301
Event Data 1302
Event Queue 1303
Event Data 1302
Event Data 1302
Event Data 1302
Alarm History Service 102
Get Event Data 1305
Get Alarm Data 1308
Source 1301′
Event Data 1302
Alarm Data 1306
Consumer 1307′
Alarm Data 1306
Alarm History Persistence 1310
Alarm Data 1306
Consumer 1307
Alarm Data 1306
Consumer 1307
Alarm Data 1306
Alarm Data Queues 1309
Alarm Data 1306
Consumer 1307

1600
Start
End
Any events remaining?
1601
no
Finalize alarm incident state.
1605
yes
New alarm incident state warranted?
1602
yes
Create alarm incident state.
1603
no
Add event to alarm incident state.
1604

CONTEXT-BASED SMS MESSAGING FOR SECURITY SYSTEM

BACKGROUND

Some security systems employ a short message service (SMS) gateway to interact with customers about alarm conditions via SMS messages.

SUMMARY

In some aspects, the techniques described herein relate to a method including: causing, by a computing system, transmission of a short message service (SMS) message to an endpoint device, the SMS message being indicative of a signal for an alarm condition present at a monitored location; determining, by the computing system, that a reply to the SMS message from the endpoint device includes a command to take an action with respect to the alarm condition; retrieving, by the computing system and from one or more data stores, context about an incident at the monitored location; and sending, by the computing system and based at least in part on the command and the context, at least one instruction to take an action with respect to the alarm condition.

In some aspects, the techniques described herein relate to a system including: one or more processors; and one or more computer-readable mediums encoded with instructions which, when executed by the one or more processors, cause the system to: cause transmission of a short message service (SMS) message to an endpoint device, the SMS message being indicative of a signal for an alarm condition present at a monitored location; determine that a reply to the SMS message from the endpoint device includes a command to take an action with respect to the alarm condition; retrieve, from one or more data stores, context about an incident at the monitored location; and send, based at least in part on the command and the context, at least one instruction to take an action with respect to the alarm condition.

In some aspects, the techniques described herein relate to a method including: receiving, by a computing system, first and second indications that first and second conditions were detected by first and second sensors, respectively, at a monitored location; and causing, by the computing system, first and second short message service (SMS) messages indicative of the first and second conditions, respectively, to be sent to an endpoint device, the second SMS message including content abbreviated based at least in part on the first SMS message having been previously sent to the endpoint device.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

DETAILED DESCRIPTION

Figure 1:
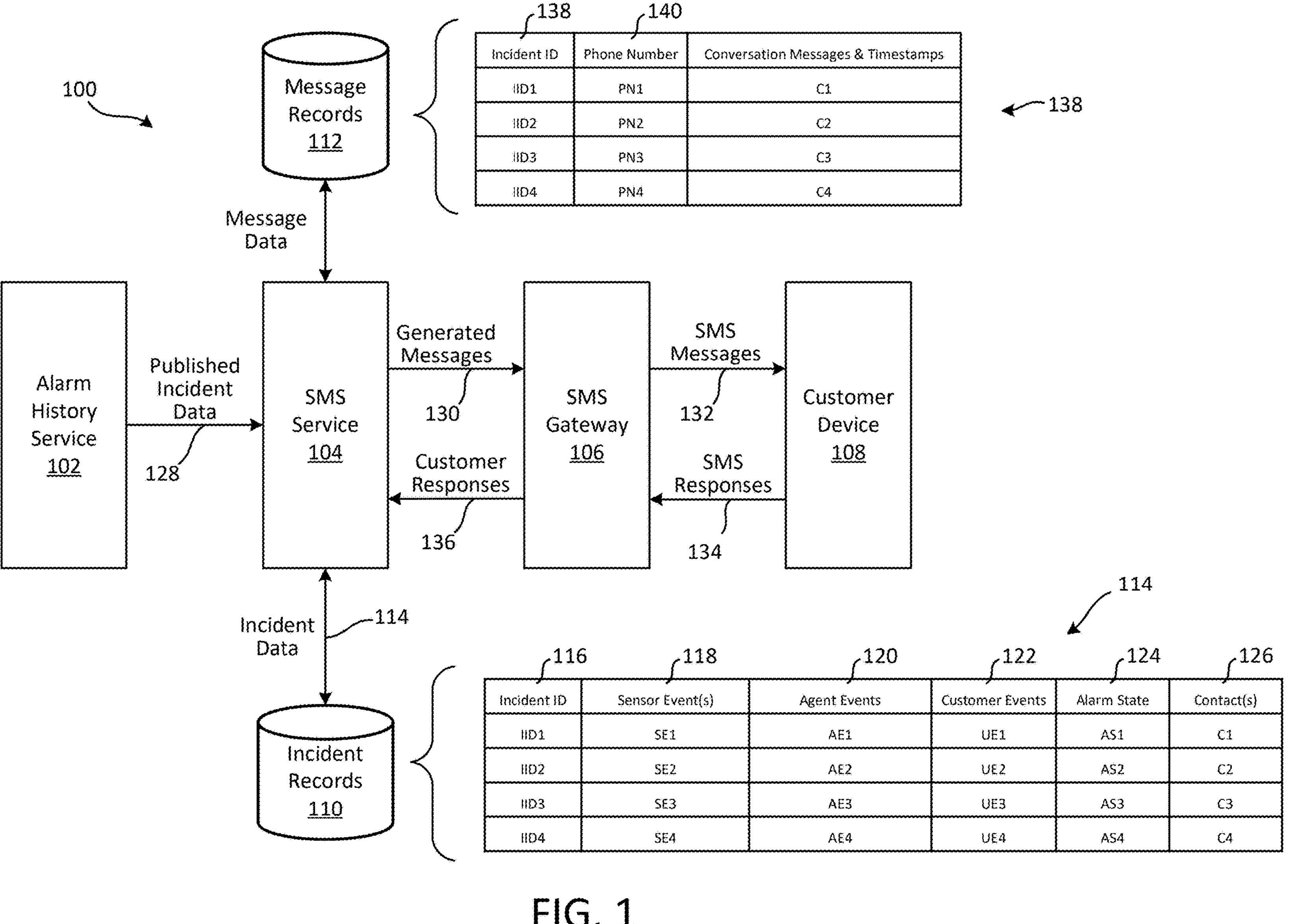
FIG. 1 shows an example system configured to generate and/or respond to SMS messages relating to an incident, in accordance with some implementations of the present disclosure.

In some security systems (e.g., SimpliSafe® Home Security Systems), monitoring agents review event notifications and their associated images to ascertain whether individual event notifications raise actual security concerns or were instead generated for innocuous reasons, such as pets or other animals, visiting neighbors, trees moving in strong winds, delivery personnel, door-to-door salespeople, etc. Upon determining that a threat or other security issue may exist, a monitoring agent could trigger an alarm, notify the police, verbally communicate with one or more individuals at the location, e.g., via a speaker on a camera, and/or take any of a number of other possible remedial actions. If the monitoring agent determined that no security issue existed, the monitoring agent could instead mark a record for the event as clear.

Some security systems also send SMS messages to customers upon the detection of certain phenomena by sensors and/or allow customers to provide instructions (e.g., to cancel an alarm) by replying to received SMS messages. For example, an SMS service of a security system may be configured to respond to individual signals for different events (e.g., a signal indicative of a sensor detection) by generating discrete SMS messages to notify a customer about the events represented by the respective signals and/or may take particular actions in response to receipt of certain reply SMS messages (e.g., replies that contain the letters "C" or "H" or the words "cancel" or "help").

In such existing systems, the SMS services generally generate alarm messages based solely on data indicating that a particular sensor had detected a particular event and do not take into account any contextual information beyond that data. Likewise, in such systems, when responding to a customer's SMS message, the SMS services generally take into account only the data used to generate the alarm message, in addition to the content and timing of the customer's message, and do not take into account any contextual information beyond that data. Accordingly, although such existing system provide certain benefits (e.g., timely notifications of alarms to a mobile device), they are not capable of tailoring or customizing SMS messages to account for the contextual circumstance in which a sensor signal was detected or in which a reply to an SMS message was received. This lack of contextual awareness may result in the generation of SMS messages that contain excessive or unhelpful information and/or may restrict the ability of the system to take context appropriate action in response to received SMS messages from customers.

The present disclosure describes example techniques for aggregating contextual data about multiple events relating to the same "incident" and/or contextual data concerning communications with one or more customers relating to such an incident, and using such aggregated contextual data, rather than just data concerning a single event, to generate SMS messages to alert and/or update a customer about the incident in question and/or to determine whether and/or how to respond to SMS messages received from the customer concerning the incident. The use of this aggregated contextual data when generating and/or responding to SMS messages can provide significant advantages, as outlined in detail below.

FIG. 1 shows an example system 100 configured to generate and/or respond to SMS messages relating to an incident, by using "incident data" (e.g., data indicative of multiple events relating to the incident) and/or "message data" (e.g., data indicative of past communications with one or more customers concerning the incident). As shown, in some implementations, the system 100 may include an alarm history service 102, an SMS service 104, an SMS gateway 106, a customer device 108, a data store 110 for "incident records," and a data store 112 for "message records."

The alarm history service 102 may be a server-based application (e.g., a cloud service) configured to aggregate or otherwise gather data about various types of events that relate to an incidence (e.g., a common incident) and make that data accessible by the SMS service 104, e.g., by publishing information about new events and/or status changes to the SMS service 104 as they occur. In some implementations, the alarm history service 102 may be included within the data center environment 624 described below in connection with FIGS. 6 and 10. An example implementation of the alarm history service 102 is described below in connection with FIGS. 12-16.

Like the alarm history service 102, in some implementations, the SMS service 104 may be a server-based application (e.g., a cloud service) and may be included within the data center environment 624 described below in connection with FIGS. 6 and 10. Upon receiving data relating to a new incident from the alarm history service 102, the SMS service 104 may create a new "record" (e.g., an incident record) in the data store 110. Thereafter, when the alarm history service 102 receives new/updated data relating to the same incident, the SMS service 104 may update that record with the new/updated data. A table 114 (shown in FIG. 1) illustrates example contents of several such records, which are indexed using an identifier (e.g., incident ID) 116. In some implementations, the individual records may be stored as data objects. As shown, in some implementations, an individual record stored in the data store 110 may include sensor data 118, agent data 120, customer data 122, state data 124, and contact data 126.

The sensor data 118 may represent one or more events (e.g., alarm conditions) that were detected by sensors monitoring a property. Examples of various types of sensors that may be used to monitor a monitored location 602 (e.g., see the monitored location 602*a* shown in FIG. 6) and the manner in which the alarm history service 102 may collect and aggregate the data about events detected by those sensors into "alarm incidents" are described in detail below in connection with FIGS. 6-16.

The agent data 120 may represent actions taken by one or more monitoring agents (e.g., while operating a monitor interface 630 of a computing device 1018 as described below in connection with FIGS. 10-12) during the review of an incident at a monitored location 602.

The customer data 122 may represent actions taken by one or more customers (e.g., while operating a customer interface 632 of a customer device 108 as described below in connection with FIGS. 10-12) in connection with an incident at a monitored location 602.

The state data 124 may represent the current state for the incident, and may include values such as "active" (indicating that the incident is still under review), "canceled" (indicating that the alarm for the incident has been canceled), or "dispatched" (indicating that emergency services have been dispatched for the incident). In some implementations, the SMS service 104 may update the state data 124 based on other incident data that is received from the alarm history service 102, such as agent event data indicating that a monitoring agent canceled an alarm or requested the dispatch of emergency services.

The contact data 126 may include information (e.g., names, phone numbers, addresses, etc.) for the individual(s) designated as contacts for the monitored location 602. In some implementations, the SMS service 104 may retrieve such information from another data store (e.g., using an identifier of the monitored location 602 received from the alarm history service 102) and may store that information (e.g., as the customer contact data 126) in a record at the time the SMS service 104 first creates the record in the data store 110.

As indicated by an arrow 128 in FIG. 1, as the alarm history service 102 gathers and aggregates data about events into alarm incidents (e.g., as described below in connection with FIGS. 12-16), it may publish data for newly detected events or state changes to the SMS service 104 for processing.

In some implementations, upon receiving newly published data about events for an incident from the alarm history service 102 (or otherwise intercepting an alarm signal), the SMS service 104 may evaluate a condition (e.g., the alarm condition) or other event for SMS messaging eligibility and, when appropriate, may construct a contextually tailored message that may be sent to the SMS gateway 106 (e.g., as indicated by an arrow 130 in FIG. 1) to enable the SMS gateway 106 to deliver that message, as an SMS message (as indicated by an arrow 132 in FIG. 1), to one or more enrolled mobile devices (e.g., as indicated in the customer contact data 126 for the corresponding incident record).

In some implementations, to perform such evaluation and/or construct an appropriate SMS message, the SMS service 104 may retrieve the conversation corresponding to the alarm signal from the data store 110 (e.g., using the incident ID 116 received from the alarm history service 102) and/or may retrieve one or more "conversations" relating to the incident from the data store 112. In some implementations, an individual conversation in the data store 112 may represent all of the SMS messages relating to a particular incident (referred to herein as a "conversation") that have been exchanged between the SMS gateway 106 and one or more devices (e.g., a mobile telephone) associated with a specific phone number. Like the records stored in the data store 110, in some implementations, the individual conversations may be stored as data objects. A table 138 (shown in FIG. 1) illustrates examples of information that may be included in the respective conversations. As shown, in addition to an incident ID 140 and a phone number 142, an individual conversation may include all of the messages between the SMS gateway 106 and the device(s) associated with the indicated phone number, with individual messages including a timestamp indicating the time at which it was sent or received.

As explained in more detail below in connection with FIGS. 2 and 3, in generating an SMS message relating to a newly detected alarm signal, the SMS service 104 may examine the alarm signal's type (burglary, fire, panic, environmental, etc.), sensor details (motion, entry, smoke, etc.), location configuration, and customer enrollment status to determine whether an interactive SMS should be generated. In some implementations, the SMS service 104 may employ specialized message builders that construct appropriate SMS content based on the alarm classification, the incident data retrieved from the data store 110, and/or the message data retrieved from the data store 112.

As indicated by arrows 134 and 136 in FIG. 1, if a customer operates the customer device 108 to reply to an SMS message received from the SMS gateway 106, the SMS gateway 106 may send the response to the SMS service 104 for processing. For such incoming replies from the customer device 108, the SMS service 104 may use the sender's phone number to query the data store 112 to retrieve the record for the most recent conversation involving that phone number and, based on the incident ID in the retrieved conversation, determine the incident ID to which the reply relates. The SMS service 104 may then use that incident ID to retrieve the corresponding record from the data store 110 and/or retrieve additional messages relating to the same incident from the data store 112.

As explained in more detail below in connection with FIG. 4, the SMS service 104 may use the contextual data from the retrieved record and/or the retrieve message(s) to operate as an interpreter that parses the response (cancel, help, unknown), validate the sender's authorization against active incidents, validate that the action is applicable for the alarm state (e.g., per the state data 124), and translate the text command into one or more monitoring system signals that control alarm dispatch behavior. The SMS service 104 may additionally or alternatively use the contextual data from the record and/or the message(s) to generate an appropriate acknowledgement SMS message to return to the sender and/or generate one or more tailored SMS messages to send to other individuals, e.g., other contacts associated with the same monitored location.

In one example scenario, the alarm history service 102 may aggregate data concerning various events relating to an incident (e.g., a common incident), such as a person entering and moving about a house, and may publish that data to the SMS service 104 (e.g., per the arrow 128 in FIG. 1). For instance, in response to receiving a signal from the alarm history service 102 identifying a "door entry event," the SMS service 104 may create a new record in the data store 110 for a property and may shortly thereafter add additional data (relating to one or more related events published by alarm history service 102) to the same record. Examples of other events that may be represented by such additional data include (A) a "motion detection" event detected by a motion sensor (e.g., stored as sensor event data 118 within the incident record), (B) an "agent action" event, such a monitoring agent clearing the incident, requesting dispatch of emergency authorities, establishing a real-time communication link with a camera at the property, etc. (e.g., stored as agent event data 120 within the incident record), (C) a "customer action" event, such as a customer operating a keypad, e.g., the keypad 608 described below, or a customer application, e.g., one of the customer interfaces 632 described below, to disarm an alarm system, cancel an alarm, etc. (e.g., stored as customer event data 122 within the incident record), and (D) a "state change" event, such as the changing of the state of an incident from "active" to "canceled" or "dispatch" (e.g., stored as state data 124 within the incident record).

In such a case, the SMS service 104 may evaluate the contextual data for multiple events reflected in the record, and not just a single event, when determining whether to generate, and/or how to generate the content for, SMS messages that are to be dispatched to one or more customer devices 108. Furthermore, as SMS messages relating to the incident are sent to the customer device(s) 108 and/or received from such customer device(s) 108, the SMS service 104 may create and/or update conversations stored in the data store 112. As such, the SMS service 104 may additionally or alternatively evaluate the contextual data included in such message(s) to determine whether to generate, and/or how to generate the content for, SMS messages that are to be dispatched to the customer device(s) 108.

The use of such additional contextual data can provide numerous advantages and improve the user experience in various ways. As one example, if a motion sensor event and a customer action event both occurred shortly after another event relating to the same incident (e.g., a door entry event), the SMS service 104 may generate a detailed SMS message for the door entry event, followed by abbreviated SMS messages for the motion sensor and customer action events, such as follows:

SMS Message 1:

Burglary Alarm—'Garage Entry'

An Entry Sensor was triggered at 4:35 PM.

Reply "C" to cancel. Reply "H" to send help to 123 Rural Road.

SMS Message 2:

A Motion Sensor 'Living Room' was triggered at 4:37 PM.

SMS Message 3:

This alarm was canceled by Keypad. No further action is required.

In some implementations, for example, the SMS service 104 may use a template (e.g., a first template) to generate a detailed message relating to an initial sensor event for an incident and may use another template (e.g., a second template that includes fewer fields and/or less descriptive text) to generate abbreviated messages relating to subsequent sensor events relating to the same incident.

Furthermore, the manner in which the SMS service 104 responds to and/or generates acknowledgement messages for customer requests sent by SMS messages may also be improved in various ways through the use of the contextual data included in the records (e.g., incident records) stored in the data store 110 and/or the message(s) stored in the data store 112. For example, in response to the SMS service 104 receiving a customer response to an alarm message for a "entry sensor" event, where the customer response includes the command "C" or "H," the SMS service 104 may look to data for events other than the "entry sensor" event to determine how to generate an acknowledgement message. For instance, the SMS service may generate different acknowledgment messages depending on whether another event in a retrieved record indicates that a monitoring agent has already dispatched emergency services and/or another event in the record indicates that the alarm has been canceled, such as by generating a message saying, "It's too late to cancel this alarm. Emergency services were already requested." or generating a message saying, "This alarm was canceled by the text message." In the latter case, the portion of the SMS message indicating the cancelation was made by "text message" may have been generated based on a "customer action" event that was added to the record (e.g., an incident record) in response to the customer's typing "C" in the responsive message, before the acknowledge message was generated. In a case where the record instead indicates that the alarm was canceled via another mechanism (e.g., a phone call or mobile app), the generated acknowledgement message may instead indicate the other mechanism that was used.

Several additional example scenarios in which the contextual information in the records and/or messages relating to an incident may be used to generate meaningful, user friendly SMS messages (and/or to determine appropriate actions to take in response to SMS messages received from customer devices 108) in various circumstances are also described further below.

Figure 2:
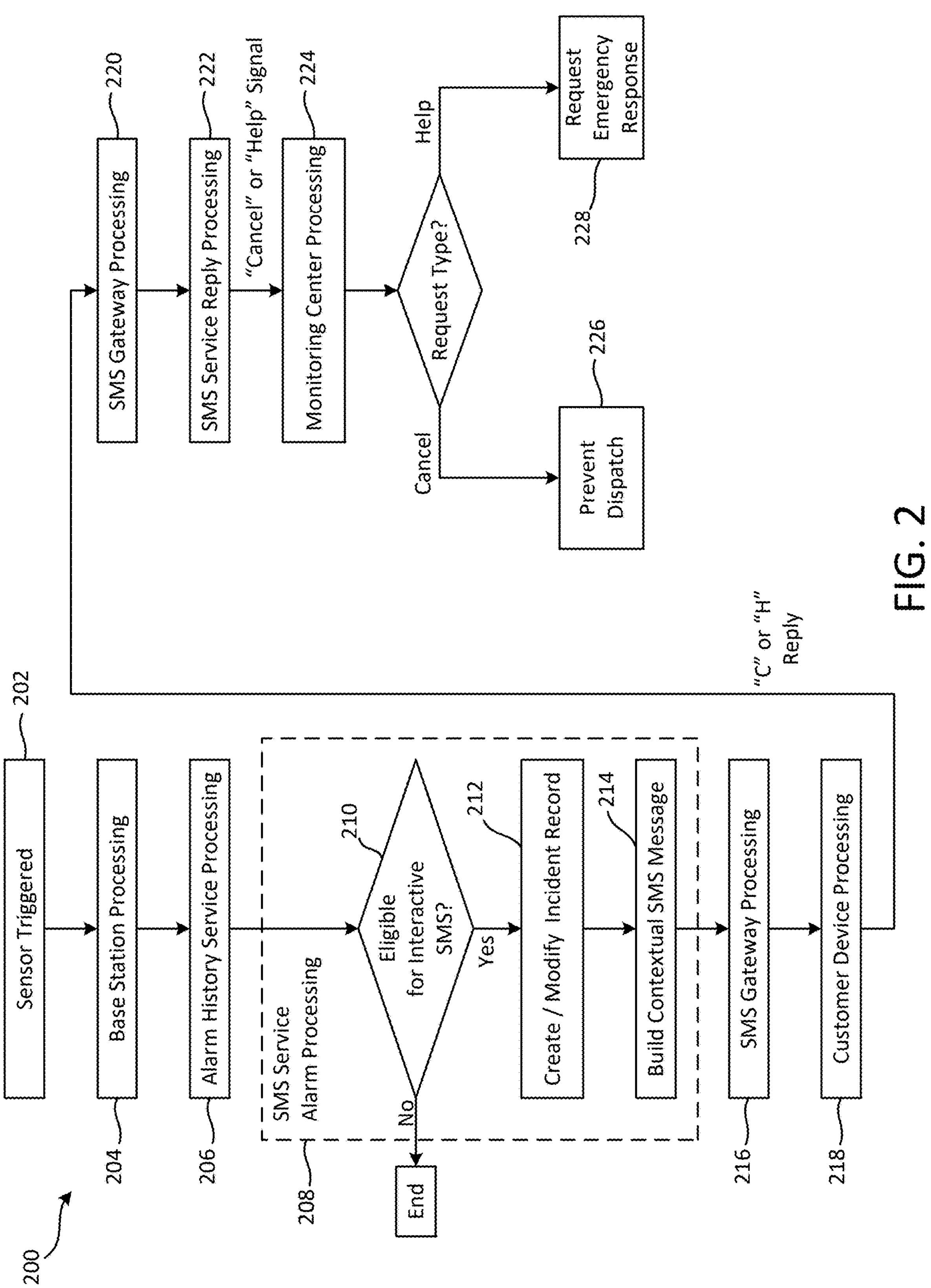
FIG. 2 shows an example method that may be performed by the system shown in FIG. 1, together with other components of the security system described below in connection with FIGS. 6-17.

FIG. 2 shows an example method 200 that may be performed by the system 100 shown in FIG. 1, together with other components of the security system 600 described below in connection with FIGS. 6-17.

Figure 6:
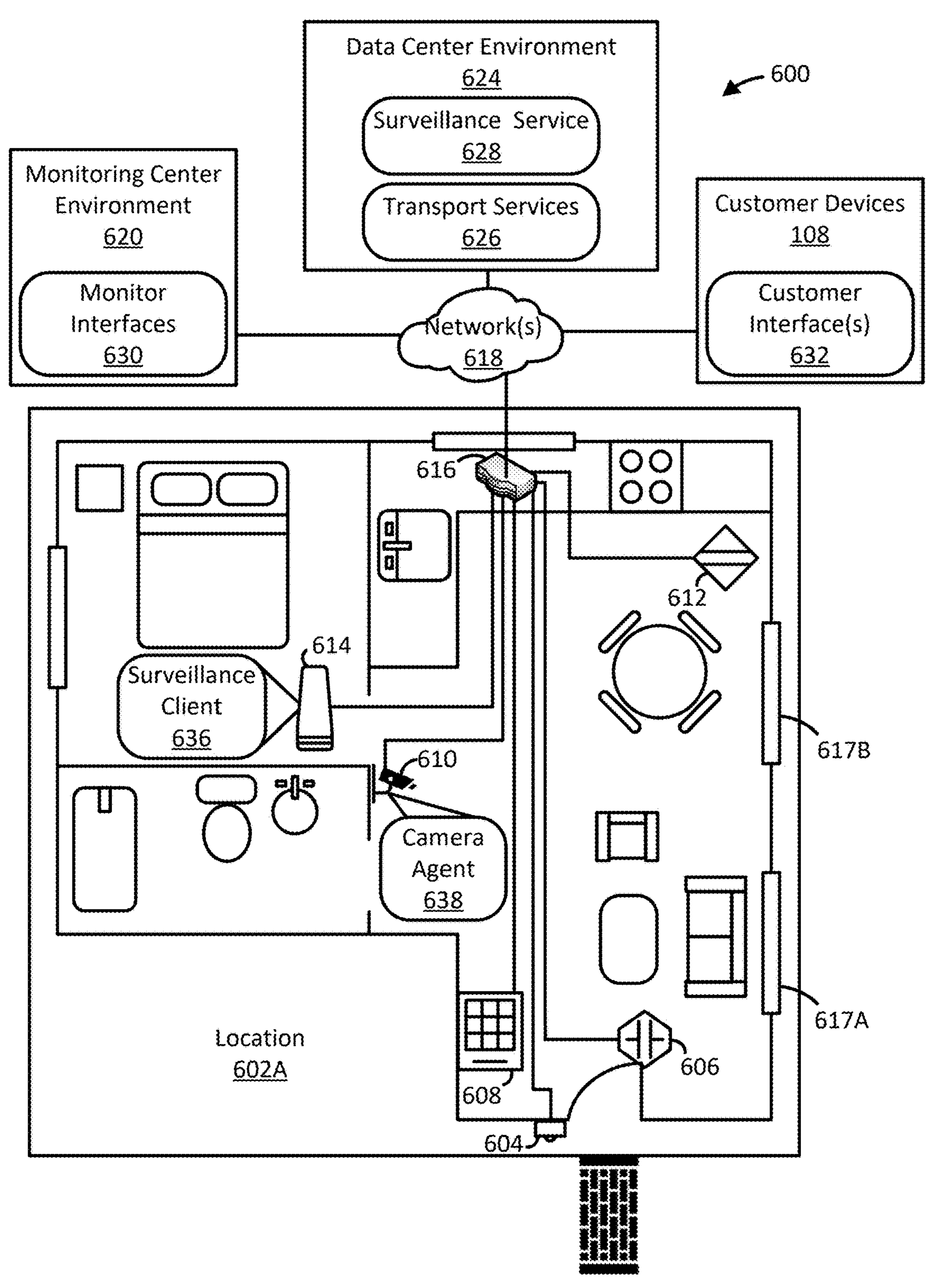
FIG. 6 shows an example implementation of a security system, according to some implementations of the present disclosure.

As shown, the method 200 may begin at a step 202, at which a sensor of the system (e.g., a security or smart home system) 600 shown in FIG. 6 (e.g., an image capture device 604, 610, a contact sensor assembly 606, a motion sensor assembly 612, a panic button, etc.) may detect a condition (e.g., motion, opening of a door or window, pressing of a panic button, etc.) at the monitored location 602*a*.

At a step 204 of the method 200, the surveillance clients 636A of the base station 614 of the system 600 may process the received sensor signal and forward it to the data center environment 624 (e.g., as an ingress message 1016B (see FIG. 10), where it may be processed by the alarm history service 102, as described in detail below.

Figure 12:
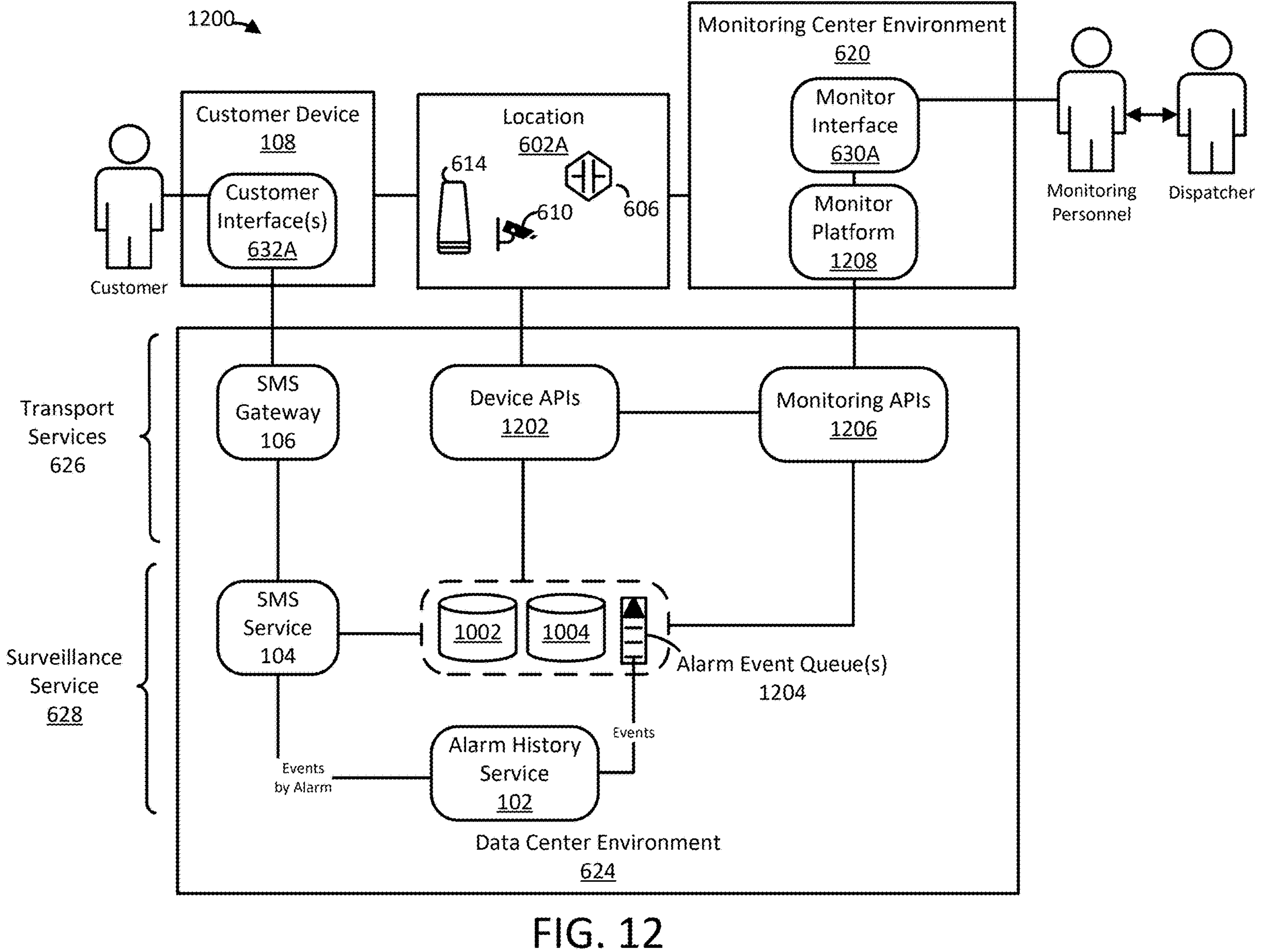
FIG. 12 is a schematic diagram of select portions of the security system of FIG. 1 that are configured to generate and/or respond to SMS messages relating to an incident, in accordance with some implementations of the present disclosure.
Figure 13:
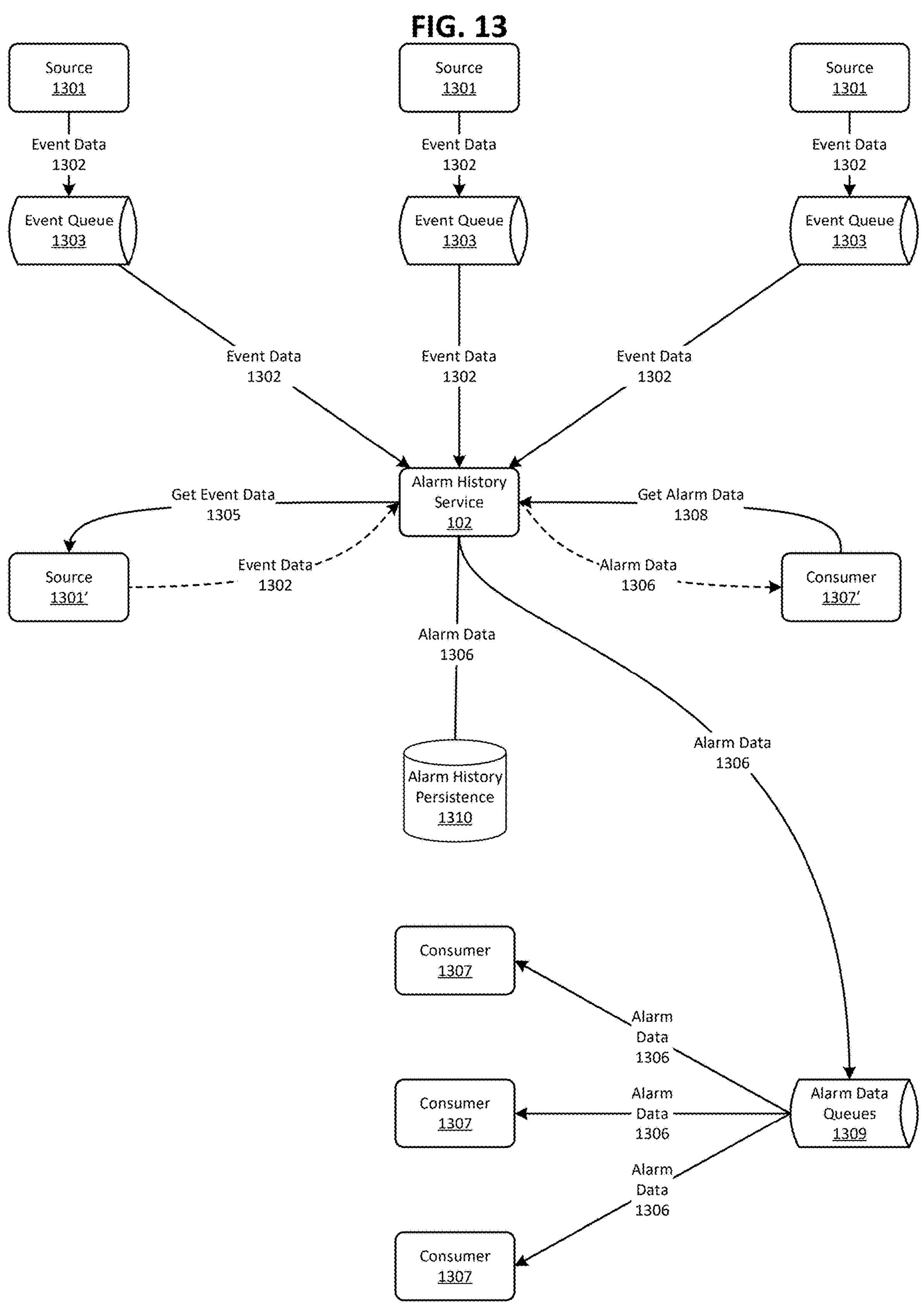
FIG. 13 a schematic diagram illustrating data flows to and from the alarm history service shown in FIG. 1, in accordance with some implementations of the present disclosure.
Figure 14:
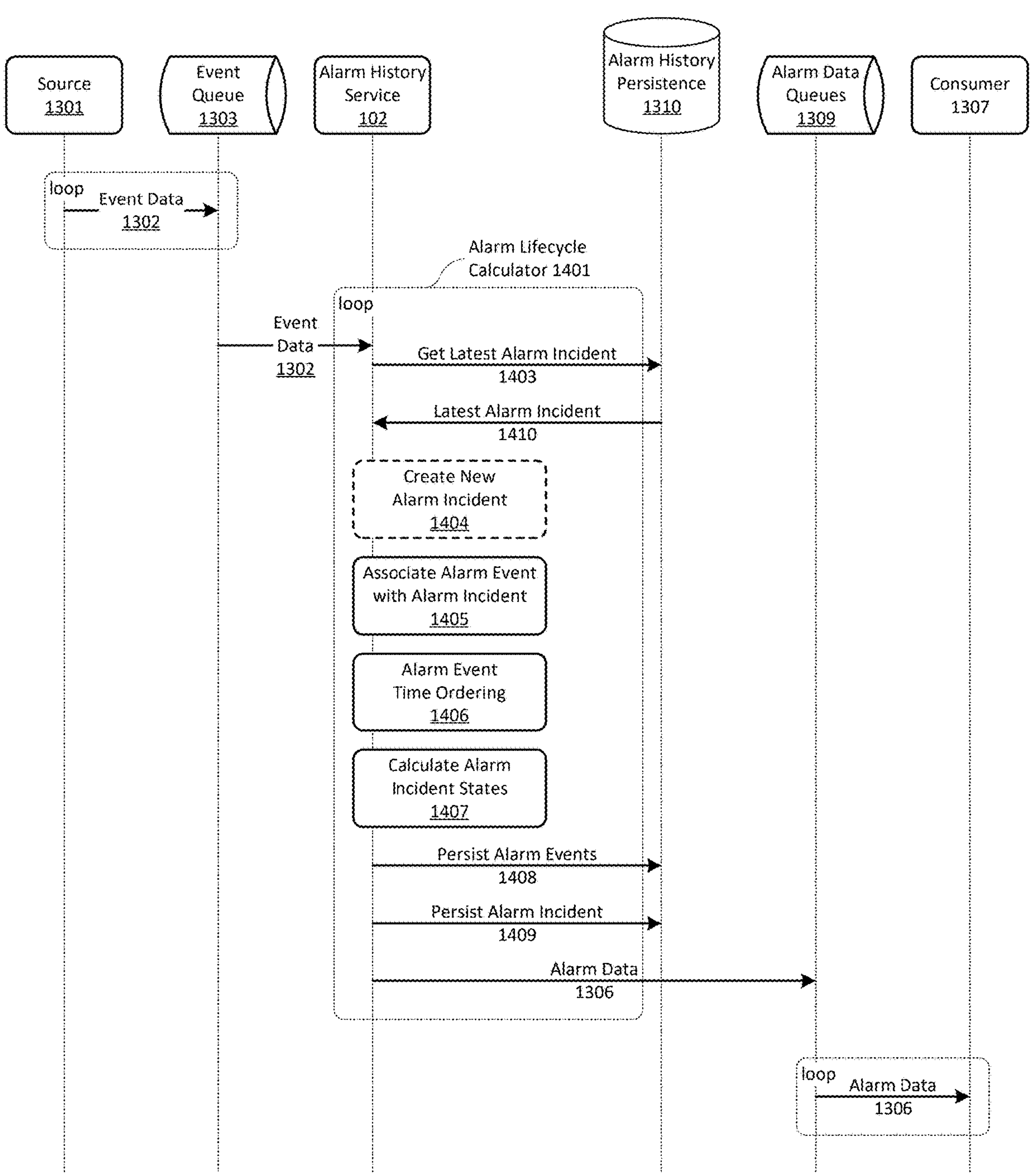
FIG. 14 is a sequence diagram illustrating operations performed by an alarm lifecycle calculator, in accordance with some implementations of the present disclosure.

At a step 206 of the method 200, the alarm history service 102 may process the sensor signal to generate and/or update an alarm incident for consumption by the SMS service 104, and perhaps other consumers 1307 (see FIGS. 12-14). The processing that may be performed by the alarm history service 102 for this purpose is described in detail below in connection with FIGS. 12-16.

Pursuant to a process 208 of the method 200, the SMS service 104 may receive and process incident data (including an alarm signal correspond to the sensor triggered at the step 202) from the alarm history service 102 to determine whether and how to build and send an SMS message to the customer device 108 (via the SMS gateway 106) relating to the alarm signal. As illustrated, per a decision 210 of the process 208, the SMS service 104 may evaluate the alarm signal to determine whether it is eligible to be processed via an interactive SMS exchange with a customer (per a decision 210). An example method 300 the SMS service 104 may perform to make the decision 210 is described below in connection with FIG. 3.

When, pursuant to the decision 210, the SMS service 104 determines that the alarm signal is not eligible for interactive SMS processing, the method 200 may terminate. When, on the other hand, the SMS service 104 determines (per the decision 210) that the alarm signal is eligible for interactive SMS processing, the SMS service 104 may (per a step 212) create a new incident record or modify an existing incident record to reflect the newly received alarm signal, e.g., by creating a new data object corresponding to a row of the table 114 shown in FIG. 1 or adding additional sensor event data 118 to a previously created data object. Based on the newly added sensor event data 118 and/or other contextual data in the incident record for the alarm signal, the SMS service 104 may then, pursuant to a step 214, build a contextually tailored SMS message for delivery to one or more customers and may send that message to the SMS gateway 106.

At a step 216 of the method 200, the SMS gateway 106 may process the message received from the SMS service 104 and send a corresponding SMS message to the customer device 108.

At a step 218 of the method 200, a customer interface 632 (see FIGS. 6 & 10) of the customer device 108 (e.g., a text messaging application) may process and display the received SMS message for review by a customer. As noted above, in some implementations, such an SMS message may identify reply options (e.g., pre-defined reply options), e.g., "C" or "H," for the customer to type in response to the alarm message. As indicated, any such response typed by the customer may be sent from the customer device 108 to the SMS gateway 106 (see step 220), and the SMS gateway 106 may forward the SMS response to the SMS service 104 for processing (per a process 222).

An example implementation of the process 222 is described below in connection with FIG. 4. As shown in FIG. 4, in some circumstances, the SMS service 104 may determine (e.g., per the step 428 or the step 432 of the process 222) that a "cancel" signal or a "help" signal is to be sent to the monitoring center environment 620 (e.g., see FIGS. 6 and 10) for processing.

Referring again to FIG. 2, per a step 224 of the method 200, the monitoring center environment 620 may receive and process the received signal in accordance with its type, such as by preventing dispatch of emergency personnel (per a step 226) in response to receipt of a "cancel" signal or requesting dispatch of emergency personnel (per a step 228) in response to receipt of a "help" signal (per a step 228).

Figure 3:
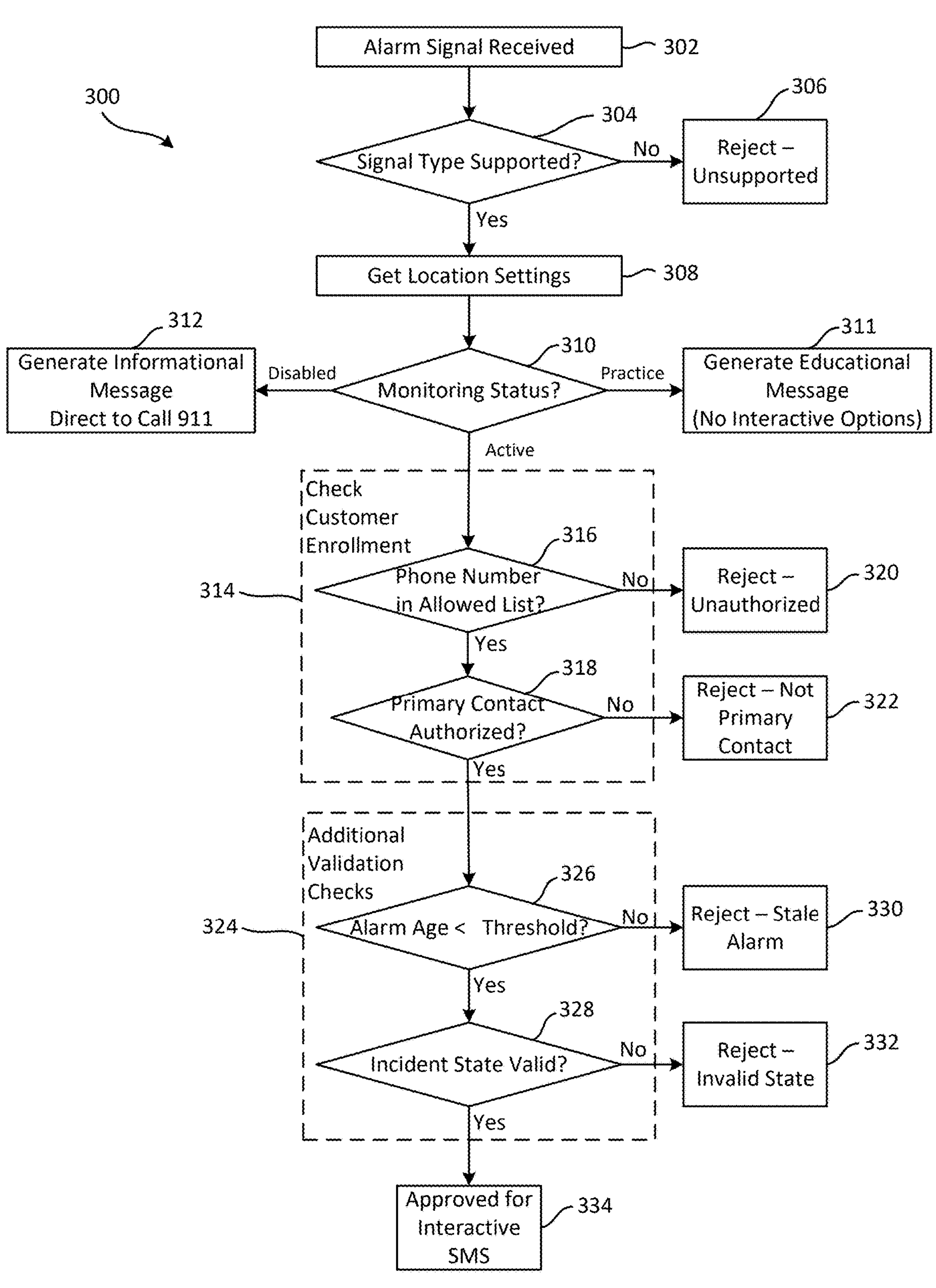
FIG. 3 is a flowchart showing an example method that the SMS service may perform to make the decision of the process shown in FIG. 2.

FIG. 3 is a flowchart showing an example method 300 that the SMS service 104 may perform to make the decision 210 of the process 208 shown in FIG. 2.

As shown, the method 300 may begin at a step 202, at which the SMS service 104 may receive a new alarm signal from the alarm history service 102.

At a decision 304 of the method 300, the SMS service 104 may evaluate the type (e.g., burglary, fire, panic, environmental, etc.) of the alarm signal that was received to determine whether the SMS service 104 is configured to support SMS communications for that type of alarm signal. In some implementations, for example, individual alarm signals may include codes (e.g., pre-defined signal codes) indicative of their types and the SMS service 104 may maintain a list of codes that it supports. The SMS service 104 may determine that a particular alarm signal is supported if its code matches a code in the list, and may otherwise determine (per the step 306) that the alarm signal is not supported.

At a step 308 of the method 300, the SMS service 104 may query the real-time monitoring status of the monitored location 602 from which the alarm signal originated to determine the operational mode (e.g., "active," "disabled," or "practice") of the that monitored location 602.

When the SMS service 104 determines, per a decision 310, that the operational status of the monitored location 602 is "disabled," the SMS service 104 may determine that the alarm signal is ineligible for interactive SMS messaging, and may thus, per a step 312, simply generate a message about the alarm that directs a customer to call 911 and instruct the SMS gateway 106 (or another system component) to send that message to one or more individuals associated with the monitored location 602. Similarly, when the SMS service 104 determines, per the decision 310, that the operational status of the monitored location 602 is "practice," the SMS service 104 may determine that the alarm signal is ineligible for interactive SMS messaging, and may thus, per a step 311, simply generate a message that educates the customer about the alarm process and instruct the SMS gateway 106 (or another system component) to send that message to one or more individuals associated with the monitored location 602.

When the SMS service 104 determines, per the decision 310, that the operational status of the monitored location 602 is "active," however, the SMS service 104 may determine that the alarm signal is potentially eligible for interactive SMS messaging, and may thus proceed to a process 314, pursuant to which the SMS service 104 may, per a decision 316, determine whether the phone number(s) in the record for the alarm are enrolled in the SMS service through an allowlist mechanism and may, per a decision 318, determine whether contacts are designated as authorized primary contacts for the monitored location 602, thus ensuring only legitimate customers can interact with the alarm system via SMS messaging. Per steps 320 and 322, if either of such conditions is not met, the SMS service 104 may determine that the alarm signal is not eligible for SMS messaging due to the absence of a legitimate, enrolled customer for the SMS service 104.

If both such conditions are met, however, the method 300 may proceed to a process 324, at which the SMS service 104 may perform additional validation checks to determine whether the alarm signal is stale, per a decision 326, and whether the alarm is in appropriate state for customer intervention, per a decision 328.

When the SMS service 104 determines, per the decision 326, that the age or duration of the alarm signal is not less than a threshold age (e.g., based on a timestamp included in the alarm signal) or determines, per the decision 328, that the alarm is not in a state appropriate for customer intervention (e.g., based on the state data 124), the SMS service 104 may determine (per step 330 or step 332, respectively) the alarm signal is not eligible for SMS messaging. When, however, SMS service 104 determines, per the decision 326, that the age of the alarm signal is less than a threshold age or duration and also determines, per the decision 328, that the alarm is in a state appropriate for customer intervention, the method 300 may instead proceed to a step 334 at which the alarm signal is eligible for interactive SMS messaging, after which the process 208 (shown in FIG. 2) may continue to the step 212, as described above.

Figure 4:
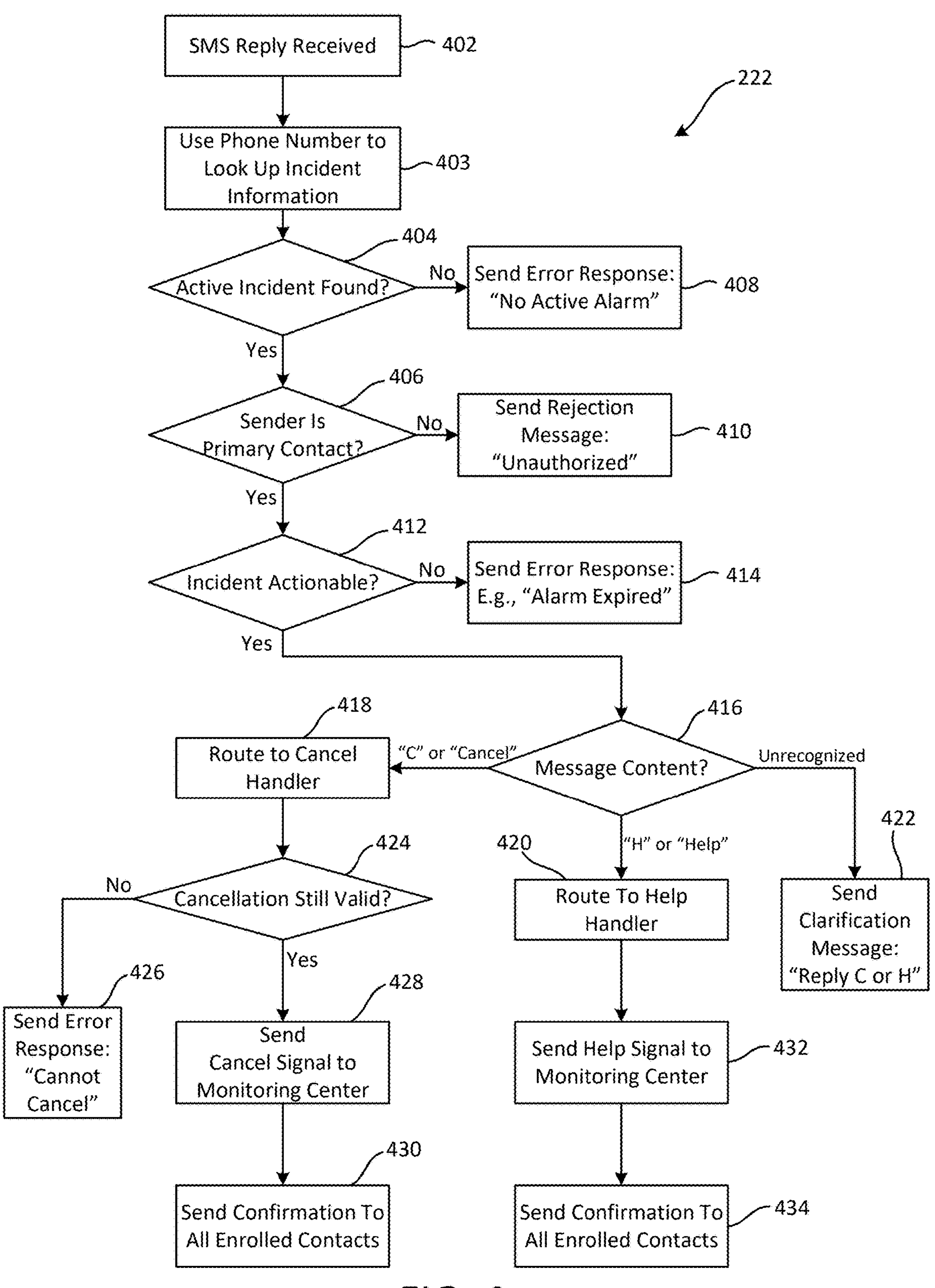
FIG. 4 shows an example implementation of the process that may be performed by the SMS service to parse, interpret, and respond appropriately to an SMS command input by a customer, in accordance with some implementations of the present disclosure.

FIG. 4 shows an example implementation of the process 222 that may be performed by the SMS service 104 to parse, interpret, and respond appropriately to an SMS command input by a customer (e.g., "C" or "H") in view of message data retrieved from the data store 110 and/or incident data retrieved from the data store 112, as described above, in connection with the method 200 shown in FIG. 2.

As shown, the process 222 may begin at a step 402 when the SMS service 104 receives an SMS reply from a customer device 108 (via the SMS gateway 106 per the step 220 of the method 200).

At a step 403 of the process 222, the SMS service 104 may use the phone number (or other metadata) of the received SMS reply to retrieve message data and/or incident data relating to an incident from the data store(s) 110, 112. For example, as noted above, in some implementations, the SMS service 104 may use the sender's phone number to query the data store 112 to retrieve the message record for the most recent conversation involving that phone number and, based on the incident ID in the retrieved message record, determine the incident ID to which the reply relates. The SMS service 104 may then use that incident ID to retrieve the corresponding incident record from the data store 110 and/or retrieve additional records relating to the same incident from the data store 112.

Per a decision 404 of the process 222, the SMS service 104 may determine whether the retrieved information is indicative of an active incident for a monitored location 602. In some implementations, for example, individual incident records stored in the data store 110 may include a field (e.g., within the state data 124 or otherwise) indicating whether they are "active" or "inactive" (or similar designators), and the process 222 may proceed to a decision 406 only if an active record is identified. In other implementations, one or more other criteria may be used to determine whether a given incident record is active per the decision 404. As indicated, per a step 408 of the process 222, in the event no active incident correlated to the phone number is identified, the SMS service 104 may generate a message indicating that there is not an active alarm associated with the sender's phone number and may instruct the SMS gateway 106 to send an SMS message to that effect to the customer device 108.

Per the decision 406, the SMS service 104 may perform an authorization verification to confirm that the sender of the SMS reply message is a designated primary contact for the monitored location 602. This may be accomplished, for example, by using the phone number of the SMS reply to look up a customer identifier and determining whether that customer identifier is listed as a primary contact for the monitored location 602 to which the incident record retrieved per the step 403 relates. As indicated, per a step 410 of the process 222, in the event the sender of the SMS reply is not listed as a primary contact, the SMS service 104 may generate a message indicating that the sender is not authorized to take action with respect to an incident and may instruct the SMS gateway 106 to send an SMS message to that effect to the customer device 108.

Per a decision 412 of the process 222, the SMS service 104 may confirm, e.g., based on the incident information obtained at the step 403, that the incident is in an actionable state, for example, by validating that the incident remains within an actionable time window (e.g., 30 minutes) and/or verifying that the current alarm state (e.g., per the state data 124) permits customer interaction. As indicated, per a step 414 of the process 222, in the event the incident is not in an actionable state, the SMS service 104 may generate a message indicating the particular reason(s) the incident is not in an actionable state (e.g., because the alarm for the incident has expired, has already been resolved, etc.) and may instruct the SMS gateway 106 to send an SMS message to that effect to the customer device 108.

Per a decision 416, the SMS service 104 may parse content of the SMS reply (e.g., using pattern matching, one or more machine learning models, etc.) to determine the intent of the sender. As indicated in FIG. 4, (A) if the SMS reply includes the letter "C" or the word "Cancel" (or similar, e.g., "Canel," "Cancell," etc.) or is otherwise determined to reflect an intent to cancel an alarm, the process 222 may proceed to a step 418, at which the SMS service 104 may route the request to a handler configured to process alarm cancelation requests, (B) if the SMS reply includes the letter "H" or the word "Help" (or similar, e.g., "Hep," "Help!," etc.) or is otherwise determined to reflect an intent to request emergency assistance, the process 222 may proceed to a step 420, at which the SMS service 104 may route the request to a handler configured to process emergency help requests, or (C) if the SMS service 104 is unable to determine the intent of the SMS reply, the SMS service 104 may, per a step 422, generate a message requesting clarification from the customer and instruct the SMS gateway 106 to send an SMS message to that effect to the customer device 108, such as by indicating that the reply was not recognized and instructing the customer to "Reply C or H."

When the SMS reply is routed to the cancel handler (per the step 418), the SMS service 104 may determine, per a decision 424, whether the request to cancel the alarm remains valid. In some implementations, for example, the SMS service 104 may evaluate the state data 124 in the incident record for the alarm and/or query the current alarm status within the monitoring center environment 620 to determine if cancellation remains viable. The SMS service 104 may determine, per the decision 424, that cancellation is not available or otherwise viable, for example, if emergency dispatch has already been initiated. As indicated, per a step 426 of the process 222, in the event the SMS service 104 determines that cancelation is unavailable, the SMS service 104 may generate a message indicating that the alarm cannot be canceled and may instruct the SMS gateway 106 to send an SMS message to that effect to the customer device 108. When, on the other hand, the SMS service 104 determines that cancelation of the alarm is viable, the SMS service 104 may instead, per a step 428, send a signal to the monitoring center environment 620 requesting that the alarm be canceled. Because the SMS service 104 is able to consult contextual data beyond the SMS reply (e.g., the state data 124 in an incident record-which may reflect, for example, whether the alarm has already been canceled, whether emergency services have already been dispatched, etc.) when determining how to respond to an SMS message including a "cancel" request, the time window during which a customer is able to cancel an alarm via an SMS message can be extended as long as possible. This may be contrasted with prior systems in which a customer was given only a predefined time window after an alarm message was sent (e.g., two minutes) to attempt to cancel the alarm.

Following the step 428, and perhaps in response to receiving a confirmation from the monitoring center environment 620 that the cancelation request was successful, the SMS service 104 may generate, per a step 430, one or more confirmation messages to the enrolled contacts for the monitored location 602 indicating that the alarm was canceled and instruct the SMS gateway 106 to send SMS message(s) to that effect to those contacts. In some implementations, the SMS service 104 may tailor such confirmation message(s) based on the message data and/or incident data for the alarm in question, such as by including an explanation of how (e.g., phone call, text message, app use, etc.) and/or by whom the alarm was canceled, and perhaps additionally or alternatively supplementing such message(s) to include additional information concerning the canceled alarm, such as identifying one or more of the various sensor events, agent events, customer events, etc., for the same incident that occurred, and/or including or summarizing one or more messages from one or more conversation(s) relating to the incident.

When the SMS reply is routed to the help handler (per the step 420), the SMS service 104 may, per a step 432, send a signal to the monitoring center environment 620 requesting that emergency services be dispatched for the incident in question.

Following the step 432, and perhaps in response to receiving a confirmation from the monitoring center environment 620 that emergency services have been dispatched, the SMS service 104 may generate, per a step 434, one or more confirmation messages to the enrolled contacts for the monitored location 602 indicating that emergency services have been dispatched and instruct the SMS gateway 106 to send SMS message(s) to that effect to those contacts. In some implementations, the SMS service 104 may tailor such confirmation message(s) based on the message data and/or incident data for the alarm in question, such as by including an explanation of how (e.g., phone call, text message, app use, etc.) and/or by whom emergency services were requested, and perhaps additionally or alternatively supplementing such message(s) to include additional information concerning the incident in question, such as identifying one or more of the various sensor events, agent events, customer events, etc., for the same incident that occurred, and/or including or summarizing one or more messages from one or more conversation(s) relating to the incident. In some implementations, for instance, the SMS service 104 may apply a set of rules for determining particular items of content (e.g., retrieved from the data store 110 and/or the data store 112 or otherwise), as well as the formatting for such content items (e.g., based on a selected template), that are to be included in individual confirmation messages to ideally tailor such messages for the contextual situation at hand, thereby providing the customer with a concise, and yet complete, explanation of the status of an incident following an instruction the customer sent via a reply SMS message.

Figure 5A:
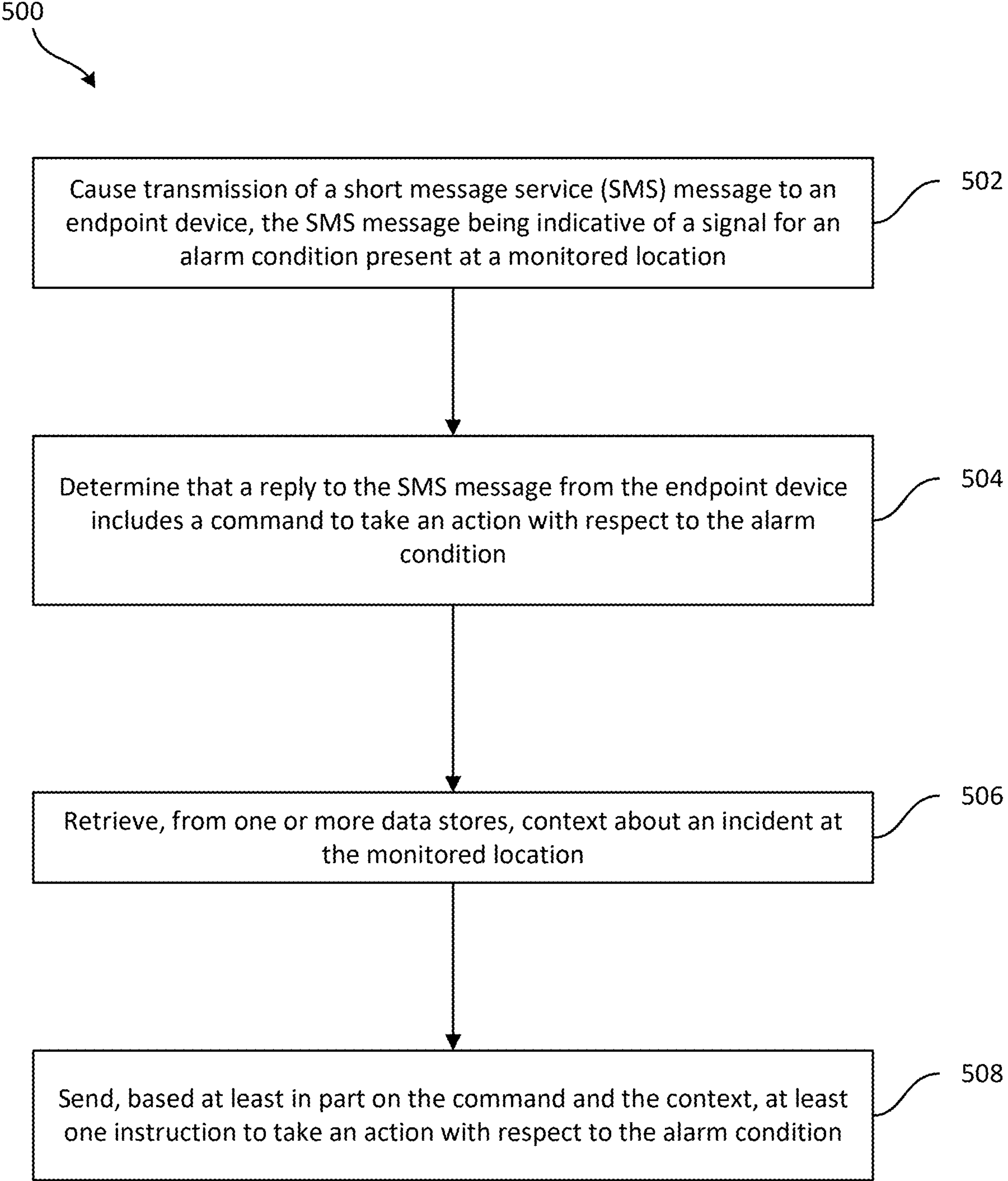
FIG. 5A is a flowchart showing an first example method that may be performed by the SMS service in accordance with some implementations of the present disclosure.

FIG. 5A is a flowchart showing a first example method 500 that may be performed by the SMS service 104 in accordance with some implementations of the present disclosure.

At a step 502 of the method 500, the SMS service 104 may cause transmission (e.g., per the arrows 130 and 132 in FIG. 1) of a short message service (SMS) message to an endpoint device (e.g., the customer device 108 in FIG. 1), the SMS message being indicative of a signal for an alarm condition present at a monitored location.

At a step 504 of the method 500, the SMS service 104 may determine that a reply to the SMS message from the endpoint device (e.g., per the arrows 134 and 136 in FIG. 1) includes a command to take an action with respect to the alarm condition (e.g., to cancel the alarm condition or request emergency services).

At a step 506 of the method 500, the SMS service 104 may retrieve, from one or more data stores (e.g., the data store 110 and/or the data store 112 shown in FIG. 1), context about an incident at the monitored location.

At a step 508 of the method 500, the SMS service 104 may send, based at least in part on the command and the context, at least one instruction to take an action with respect to the alarm condition (e.g., to instruct a monitoring center to cancel the alarm condition or dispatch emergency services to the monitored location, to cause a contextually tailored SMS message to be sent to one or more customer devices 108, etc.).

Figure 5B:
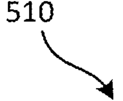
FIG. 5B is a flowchart showing a second example method that may be performed by the SMS service in accordance with some implementations of the present disclosure.
Figure 5B:
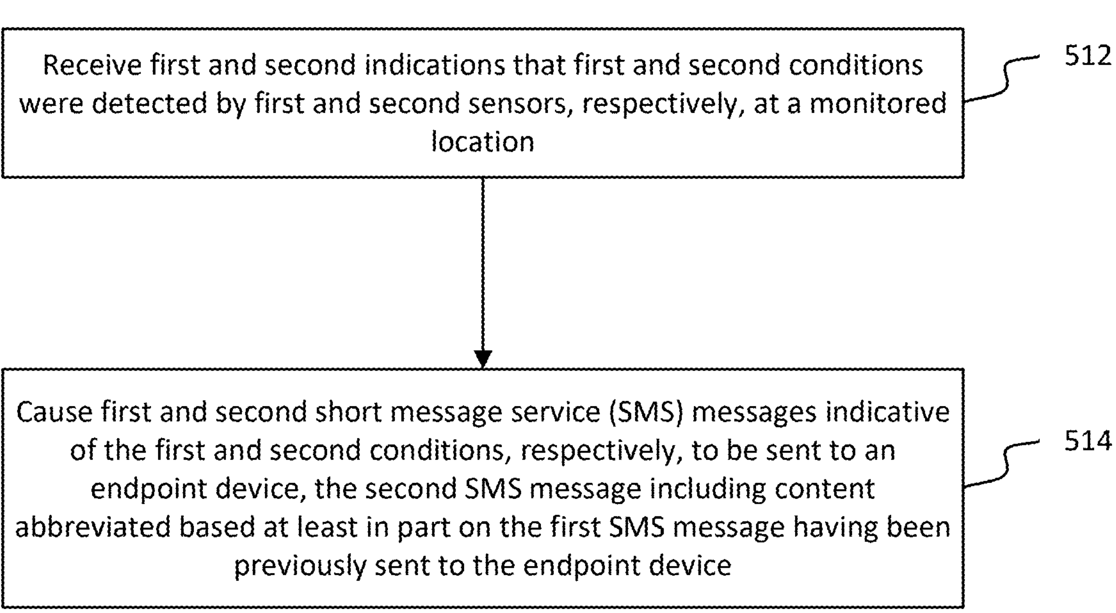

FIG. 5B is a flowchart showing a second example method 510 that may be performed by the SMS service 104 in accordance with some implementations of the present disclosure.

At a step 512 of the method 510, the SMS service 104 may receive (e.g., per the arrow 128 in FIG. 1) first and second indications that first and second conditions were detected by first and second sensors, respectively, at a monitored location.

At a step 514 of the method 510, the SMS service 104 may cause first and second short message service (SMS) messages indicative of the first and second conditions, respectively, to be sent (e.g., per the arrows 130 and 132 in FIG. 1) to an endpoint device (e.g., the customer device 108 in FIG. 1), the second SMS message including content abbreviated based at least in part on the first SMS message having been previously sent to the endpoint device.

The following are examples of new features of and/or benefits provided by the system 100 described herein:

- Context-Aware Messaging: A set of rules may modify SMS message content based on the event sequence. For example, an initial alarm trigger may generate a message with a full set of instructions, while subsequent related events (e.g., an additional sensor tripped) may generate a truncated message without redundant instructions to avoid superfluous communication.
- Dynamic Cancellation Window: A mechanism may be provided that, upon receiving a cancellation command via SMS, interrogates the alarm's real-time status within the monitoring platform to permit or deny the cancellation based on whether emergency personnel have already been requested.
- Extended Help Request Window: A mechanism may be provided that allows the system to process a user's SMS request for help for an extended period, such as 30 minutes, after the initial alarm trigger.
- Proactive Multi-Channel Status Updates: A mechanism may be provided to automatically inform all enrolled phone numbers via SMS of critical status changes (e.g., "Cancel Confirmed," "Dispatch Requested") even if the action was initiated through a different interface, such as a mobile app or a phone call with the monitoring center.
- Monitoring Status Awareness: A mechanism may be provided that dynamically adjusts SMS message content and available customer actions based on the location's current monitoring configuration and operational status. The system may query real-time monitoring settings to determine whether professional monitoring is active, disabled, or in practice mode, and may modify the initial alarm notification and/or customer response handling accordingly.

FIG. 6 is a schematic diagram of an example security system 600 configured to monitor geographically disparate locations in accordance with some examples. As shown in FIG. 6, the system 600 includes a monitored location 602A, a monitoring center environment 620, a data center environment 624, one or more customer devices 622, and one or more communication networks 618. Each of the monitored location 602A, the monitoring center environment 620, the data center environment 624, the one or more customer devices 622, and the communication network 618 may include one or more computing devices (e.g., as described below with reference to FIG. 17). The one or more customer devices 622 are configured to host one or more customer interface applications 632. The customer interface(s) 632 may include, for example, a customer application that can be operated by a customer to arm or disarm the system 600, review event alerts, access recorded or real-time video from one or more cameras, etc., as well as a text messaging application configured to exchange SMS messages with the SMS gateway 106 (shown in FIG. 1). The monitoring center environment 620 is configured to host one or more monitor interface applications 630. The data center environment 624 is configured to host a surveillance service 628 and one or more transport services 626. The location 602A includes image capture devices 604 and 610, a contact sensor assembly 606, a keypad 608, a motion sensor assembly 612, a base station 614, and a router 616. The base station 614 hosts a surveillance client 636. The image capture device 610 hosts a camera agent 638. The security devices disposed at the location 602A (e.g., devices 604, 606, 608, 610, 612, and 614) may be referred to herein as location-based devices.

In some examples, the router 616 is a wireless router that is configured to communicate with the location-based devices via communications that comport with a communications standard such as any of the various Institute of Electrical and Electronics Engineers (IEEE) 802.11 standards. As illustrated in FIG. 6, the router 616 is also configured to communicate with the network(s) 618. It should be noted that the router 616 implements a local area network (LAN) within and proximate to the location 602A by way of example only. Other networking technology that involves other computing devices is suitable for use within the location 602A. For instance, in some examples, the base station 614 can receive and forward communication packets transmitted by the image capture device 610 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc. Other wired, wireless, and mesh network technology and topologies will be apparent with the benefit of this disclosure and are intended to fall within the scope of the examples disclosed herein.

Continuing with the example of FIG. 6, the network(s) 618 can include one or more public and/or private networks that support, for example, IP. The network(s) 618 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network(s) 618 connects and enables data communication between the computing devices within the location 602A, the monitoring center environment 620, the data center environment 624, and the customer devices 622. In at least some examples, both the monitoring center environment 620 and the data center environment 624 include network equipment (e.g., similar to the router 616) that is configured to communicate with the network(s) 618 and computing devices collocated with or near the network equipment. It should be noted that, in some examples, the network(s) 618 and the network extant within the location 602A support other communication protocols, such as MQTT or other IoT protocols. The network(s) 618 may additionally include one or more wireless networks configured to support SMS messaging (e.g., between the customer device 108 and the SMS gateway 106 shown in FIG. 1) using conventional technologies.

Continuing with the example of FIG. 6, the data center environment 624 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 624 can be dedicated to the security system 600, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 6, the data center environment 624 is configured to host the surveillance service 628 and the transport services 626.

Continuing with the example of FIG. 6, the monitoring center environment 620 can include a plurality of computing devices (e.g., desktop computers) and network equipment (e.g., one or more routers) connected to the computing devices and the network(s) 618. The customer devices 622 can include personal computing devices (e.g., a desktop computer, laptop, tablet, smartphone, or the like) and network equipment (e.g., a router, cellular modem, cellular radio, or the like). As illustrated in FIG. 6, the monitoring center environment 620 is configured to host the monitor interfaces 630 and the customer devices 622 are configured to host the customer interface(s) 632.

Continuing with the example of FIG. 6, the devices 604, 606, 610, and 612 are configured to acquire analog signals via sensors incorporated into the devices, generate digital sensor data based on the acquired signals, and communicate (e.g. via a wireless link with the router 616) the sensor data to the base station 614. The type of sensor data generated and communicated by these devices varies along with the type of sensors included in the devices. For instance, the image capture devices 604 and 610 can acquire ambient light, generate frames of image data based on the acquired light, and communicate the frames to the base station 614, the monitor interfaces 630, and/or the customer interfaces 632, although the pixel resolution and frame rate may vary depending on the capabilities of the devices. Where the image capture devices 604 and 610 have sufficient processing capacity and available power, the image capture devices 604 and 610 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 600 (e.g., via the router 616). As shown in FIG. 6, the image capture device 604 has a field of view (FOV) that originates proximal to a front door of the location 602A and can acquire images of a walkway, highway, and a space between the location 602A and the highway. The image capture device 610 has an FOV that originates proximal to a bathroom of the location 602A and can acquire images of a living room and dining area of the location 602A. The image capture device 610 can further acquire images of outdoor areas beyond the location 602A through windows 617A and 617B on the right side of the location 602A.

Further, as shown in FIG. 6, in some examples the image capture device 610 is configured to communicate with the surveillance service 628, the monitor interfaces 630, and the customer interface(s) 632 separately from the surveillance client 636 via execution of the camera agent 638. These communications can include sensor data generated by the image capture device 610 and/or commands to be executed by the image capture device 610 sent by the surveillance service 628, the monitor interfaces 630, and/or the customer interfaces 632. The commands can include, for example, requests for interactive communication sessions in which monitoring personnel and/or customers interact with the image capture device 610 via the monitor interfaces 630 and the customer interfaces 632. These interactions can include requests for the image capture device 610 to transmit additional sensor data and/or requests for the image capture device 610 to render output via a user interface (e.g., the user interface 912 of FIG. 9B). This output can include audio and/or video output.

Continuing with the example of FIG. 6, the contact sensor assembly 606 includes a sensor that can detect the presence or absence of a magnetic field generated by a magnet when the magnet is proximal to the sensor. When the magnetic field is present, the contact sensor assembly 606 generates Boolean sensor data specifying a closed state. When the magnetic field is absent, the contact sensor assembly 606 generates Boolean sensor data specifying an open state. In either case, the contact sensor assembly 606 can communicate sensor data indicating whether the front door of the location 602A is open or closed to the base station 614. The motion sensor assembly 612 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 612 generates Boolean sensor data specifying a still state. When the audio sensor does not detect a reflection because an object is in motion within the monitored space, the motion sensor assembly 612 generates Boolean sensor data specifying an alarm state. In either case, the motion sensor assembly 612 can communicate the sensor data to the base station 614. It should be noted that the specific sensing modalities described above are not limiting to the present disclosure. For instance, as one of many potential examples, the motion sensor assembly 612 can base its operation on acquisition of changes in temperature rather than changes in reflected sound waves.

Continuing with the example of FIG. 6, the keypad 608 is configured to interact with a user and interoperate with the other location-based devices in response to interactions with the user. For instance, in some examples, the keypad 608 is configured to receive input from a user that specifies one or more commands and to communicate the specified commands to one or more addressed processes. These addressed processes can include processes implemented by one or more of the location-based devices and/or one or more of the monitor interfaces 630 or the surveillance service 628. The commands can include, for example, codes that authenticate the user as a resident of the location 602A and/or codes that request activation or deactivation of one or more of the location-based devices. Alternatively or additionally, in some examples, the keypad 608 includes a user interface (e.g., a tactile interface, such as a set of physical buttons or a set of virtual buttons on a touchscreen) configured to interact with a user (e.g., receive input from and/or render output to the user). Further still, in some examples, the keypad 608 can receive and respond to the communicated commands and render the responses via the user interface as visual or audio output.

Continuing with the example of FIG. 6, the base station 614 is configured to interoperate with the other location-based devices to provide local command and control and store-and-forward functionality via execution of the surveillance client 636. In some examples, to implement store-and-forward functionality, the base station 614, through execution of the surveillance client 636, receives sensor data, packages the data for transport, and stores the packaged sensor data in local memory for subsequent communication. This communication of the packaged sensor data can include, for instance, transmission of the packaged sensor data as a payload of a message to one or more of the transport services 626 when a communication link to the transport services 626 via the network(s) 618 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 614 executes, under control of the surveillance client 636, a variety of programmatic operations in response to various events. Examples of these events can include reception of commands from the keypad 608 or the customer interface application 632, reception of commands from one of the monitor interfaces 630 or the customer interface application 632 via the network(s) 618, or detection of the occurrence of a scheduled event. The programmatic operations executed by the base station 614 under control of the surveillance client 636 can include activation or deactivation of one or more of the devices 604, 606, 608, 610, and 612; sounding of an alarm; reporting an event to the surveillance service 628; and communicating location data to one or more of the transport services 626 to name a few operations. The location data can include data specifying sensor readings (sensor data), configuration data of any of the location-based devices, commands input and received from a user (e.g., via the keypad 608 or a customer interface 632), or data derived from one or more of these data types (e.g., filtered sensor data, summarizations of sensor data, event data specifying an event detected at the location via the sensor data, etc.).

Continuing with the example of FIG. 6, the transport services 626 are configured to securely, reliably, and efficiently exchange messages between processes implemented by the location-based devices and processes implemented by other devices in the system 600. These other devices can include the customer devices 622, devices disposed in the data center environment 624, and/or devices disposed in the monitoring center environment 620. In some examples, the transport services 626 are also configured to parse messages from the location-based devices to extract payloads included therein and store the payloads and/or data derived from the payloads within one or more datastores hosted in the data center environment 624. The data housed in these datastores may be subsequently accessed by, for example, the surveillance service 628, the monitor interfaces 630, and the customer interfaces 632.

In certain examples, the transport services 626 expose and implement one or more application programming interfaces (APIs) that are configured to receive, process, and respond to calls from processes (e.g., the surveillance client 636) implemented by base stations (e.g., the base station 614) and/or processes (e.g., the camera agent 638) implemented by other devices (e.g., the image capture device 610). Individual instances of a transport service within the transport services 626 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 626. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 626 are not limited to a particular protocol or architectural style. It should be noted that, in at least some examples, the transport services 626 can transmit one or more API calls to location-based devices to request data from, or an interactive communication session with, the location-based devices. In some implementations, the transport services 626 may additionally include the SMS gateway 106 (shown in FIG. 1) or one or more similar components that enable SMS communication between the customer device 108 and one or more components of the surveillance service 628, such as the SMS service 104.

Continuing with the example of FIG. 6, the surveillance service 628 is configured to control overall logical setup and operation of the system 600. As such, the surveillance service 628 can interoperate with the transport services 626, the monitor interfaces 630, the customer interfaces 632, and any of the location-based devices. In some examples, the surveillance service 628 is configured to monitor data from a variety of sources for reportable events (e.g., a break-in event) and, when a reportable event is detected, notify one or more of the monitor interfaces 630 and/or the customer interfaces 632 of the reportable event. In some examples, the surveillance service 628 is also configured to maintain state information regarding the location 602A. This state information can indicate, for instance, whether the location 602A is safe or under threat. In certain examples, the surveillance service 628 is configured to change the state information to indicate that the location 602A is safe only upon receipt of a communication indicating a clear event (e.g., rather than making such a change in response to discontinuation of reception of break-in events). This feature can prevent a "crash and smash" robbery from being successfully executed. Further example processes that the surveillance service 628 is configured to execute are described below.

Continuing with the example of FIG. 6, individual monitor interfaces 630 are configured to control computing device interaction with monitoring personnel and to execute a variety of programmatic operations in response to the interactions. For instance, in some examples, the monitor interface 630 controls its host device to provide information regarding reportable events detected at monitored locations, such as the location 602A, to monitoring personnel. Such events can include, for example, movement or an alarm condition generated by one or more of the location-based devices. Alternatively or additionally, in some examples, the monitor interface 630 controls its host device to interact with a user to configure features of the system 600. Further example processes that the monitor interface 630 is configured to execute are described below with reference to FIG. 11. It should be noted that, in at least some examples, the monitor interfaces 630 are browser-based applications served to the monitoring center environment 620 by webservers included within the data center environment 624. These webservers may be part of the surveillance service 628, in certain examples.

Continuing with the example of FIG. 6, individual customer interfaces 632 are configured to control computing device interaction with a customer and to execute a variety of programmatic operations in response to the interactions. For instance, in some examples, a customer interface 632 controls its host device to provide information regarding reportable events detected at monitored locations, such as the location 602A, to the customer. Such events can include, for example, an alarm condition generated by one or more of the location-based devices. Alternatively or additionally, in some examples, a customer interface 632 may be configured to process input received from the customer to activate or deactivate one or more of the location-based devices. Further still, in some examples, a customer interface 632 may configure features of the system 600 in response to input from a user. Moreover, in some implementations, the customer interface(s) 632 may include a text messaging application that enables the exchange of SMS messages with the SMS gateway 106, as described above. Further example processes that the customer interface(s) 632 may be configured to execute are described below with reference to FIG. 11.

Figures 7, 8:
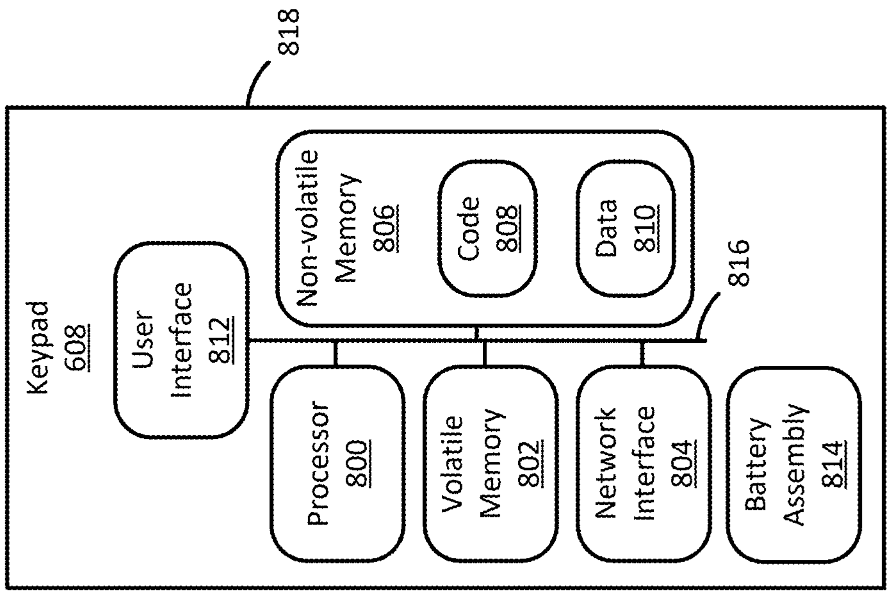
FIG. 7 shows an example implementation of the base station of the security system shown in FIG. 6, according to some implementations of the present disclosure.
FIG. 8 shows an example implementation of the keypad of the security system shown in FIG. 6, according to some implementations of the present disclosure.

Turning now to FIG. 7, an example base station 614 is schematically illustrated. As shown in FIG. 7, the base station 614 includes at least one processor 700, volatile memory 702, non-volatile memory 706, at least one network interface 704, a user interface 712, a battery assembly 714, and an interconnection mechanism 716. The non-volatile memory 706 stores executable code 708 and includes a data store 710. In some examples illustrated by FIG. 7, the features of the base station 614 enumerated above are incorporated within, or are a part of, a housing 718.

In some examples, the non-volatile (non-transitory) memory 706 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 708 stored in the non-volatile memory can include an operating system and one or more applications or programs that are configured to execute under the operating system. Alternatively or additionally, the code 708 can include specialized firmware and embedded software that is executable without dependence upon a commercially available operating system. Regardless, execution of the code 708 can implement the surveillance client 636 of FIG. 6 and can result in manipulated data that is a part of the data store 710.

Continuing with the example of FIG. 7, the processor 700 can include one or more programmable processors to execute one or more executable instructions, such as a computer program specified by the code 708, to control the operations of the base station 614. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 702) and executed by the circuitry. In some examples, the processor 700 is a digital processor, but the processor 700 can be analog, digital, or mixed. As such, the processor 700 can execute the function, operation, or sequence of operations using digital values and/or using analog signals. In some examples, the processor 700 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 700 that are multicore can provide functionality for parallel, simultaneous execution of instructions or for parallel, simultaneous execution of one instruction on more than one piece of data.

Continuing with the example of FIG. 7, prior to execution of the code 708 the processor 700 can copy the code 708 from the non-volatile memory 706 to the volatile memory 702. In some examples, the volatile memory 702 includes one or more static or dynamic random access memory (RAM) chips and/or cache memory (e.g. memory disposed on a silicon die of the processor 700). Volatile memory 702 can offer a faster response time than a main memory, such as the non-volatile memory 706.

Through execution of the code 708, the processor 700 can control operation of the network interface 704. For instance, in some examples, the network interface 704 includes one or more physical interfaces (e.g., a radio, an ethernet port, a universal serial bus (USB) port, etc.) and a software stack including drivers and/or other code 708 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 704 enables the base station 614 to access and communicate with other computing devices (e.g., the location-based devices) via a computer network (e.g., the LAN established by the router 616 of FIG. 6, the network(s) 618 of FIG. 6, and/or a point-to-point connection). For instance, in at least one example, the network interface 704 utilizes sub-GHz wireless networking to transmit messages to other location-based devices. These messages can include wake messages to request streams of sensor data, alarm messages to trigger alarm responses, or other messages to initiate other operations. Bands that the network interface 704 may utilize for sub-GHz wireless networking include, for example, an 868 MHz band and/or a 915 MHz band. Use of sub-GHz wireless networking can improve operable communication distances and/or reduce power consumed to communicate.

Through execution of the code 708, the processor 700 can control operation of the user interface 712. For instance, in some examples, the user interface 712 includes user input and/or output devices (e.g., a keyboard, a mouse, a touchscreen, a display, a speaker, a camera, an accelerometer, a biometric scanner, an environmental sensor, etc.) and a software stack including drivers and/or other code 708 that is configured to communicate with the user input and/or output devices. For instance, the user interface 712 can be implemented by a customer device 622 hosting a mobile application (e.g., a customer interface 632). The user interface 712 enables the base station 614 to interact with users to receive input and/or render output. This rendered output can include, for instance, one or more graphical user interfaces (GUIs) including one or more controls configured to display output and/or receive input. The input can specify values to be stored in the data store 710. The output can indicate values stored in the data store 710. It should be noted that, in some examples, parts of the user interface 712 are accessible and/or visible as part of, or through, the housing 718. These parts of the user interface 712 can include, for example, one or more light-emitting diodes (LEDs). Alternatively or additionally, in some examples, the user interface 712 includes a 95 dB siren that the processor 700 sounds to indicate that a break-in event has been detected.

Continuing with the example of FIG. 7, the various features of the base station 614 described above can communicate with one another via the interconnection mechanism 716. In some examples, the interconnection mechanism 716 includes a communications bus. In addition, in some examples, the battery assembly 714 is configured to supply operational power to the various features of the base station 614 described above. In some examples, the battery assembly 714 includes at least one rechargeable battery (e.g., one or more NiMH or lithium batteries). In some examples, the rechargeable battery has a runtime capacity sufficient to operate the base station 614 for 24 hours or longer while the base station 614 is disconnected from or otherwise not receiving line power. Alternatively or additionally, in some examples, the battery assembly 714 includes power supply circuitry to receive, condition, and distribute line power to both operate the base station 614 and recharge the rechargeable battery. The power supply circuitry can include, for example, a transformer and a rectifier, among other circuitry, to convert AC line power to DC device and recharging power.

Turning now to FIG. 8, an example keypad 608 is schematically illustrated. As shown in FIG. 8, the keypad 608 includes at least one processor 800, volatile memory 802, non-volatile memory 806, at least one network interface 804, a user interface 812, a battery assembly 814, and an interconnection mechanism 816. The non-volatile memory 806 stores executable code 808 and a data store 810. In some examples illustrated by FIG. 8, the features of the keypad 608 enumerated above are incorporated within, or are a part of, a housing 818.

In some examples, the respective descriptions of the processor 700, the volatile memory 702, the non-volatile memory 706, the interconnection mechanism 716, and the battery assembly 714 with reference to the base station 614 are applicable to the processor 800, the volatile memory 802, the non-volatile memory 806, the interconnection mechanism 816, and the battery assembly 814 with reference to the keypad 608. As such, those descriptions will not be repeated.

Continuing with the example of FIG. 8, through execution of the code 808, the processor 800 can control operation of the network interface 804. In some examples, the network interface 804 includes one or more physical interfaces (e.g., a radio, an ethernet port, a USB port, etc.) and a software stack including drivers and/or other code 808 that is configured to communicate with the one or more physical interfaces to support one or more LAN, PAN, and/or WAN standard communication protocols. These communication protocols can include, for example, TCP, UDP, HTTP, and MQTT among others. As such, the network interface 804 enables the keypad 608 to access and communicate with other computing devices (e.g., the other location-based devices) via a computer network (e.g., the LAN established by the router 616 and/or a point-to-point connection).

Continuing with the example of FIG. 8, through execution of the code 808, the processor 800 can control operation of the user interface 812. In some examples, the user interface 812 includes user input and/or output devices (e.g., physical keys arranged as a keypad, a touchscreen, a display, a speaker, a camera, a biometric scanner, an environmental sensor, etc.) and a software stack including drivers and/or other code 808 that is configured to communicate with the user input and/or output devices. As such, the user interface 812 enables the keypad 608 to interact with users to receive input and/or render output. This rendered output can include, for instance, one or more GUIs including one or more controls configured to display output and/or receive input. The input can specify values to be stored in the data store 810. The output can indicate values stored in the data store 810. It should be noted that, in some examples, parts of the user interface 812 (e.g., one or more LEDs) are accessible and/or visible as part of, or through, the housing 818.

In some examples, devices like the keypad 608, which rely on user input to trigger an alarm condition, may be included within a security system, such as the security system 600 of FIG. 6. Examples of such devices include dedicated key fobs and panic buttons. These dedicated security devices provide a user with a simple, direct way to trigger an alarm condition, which can be particularly helpful in times of duress.

Figure 9A:
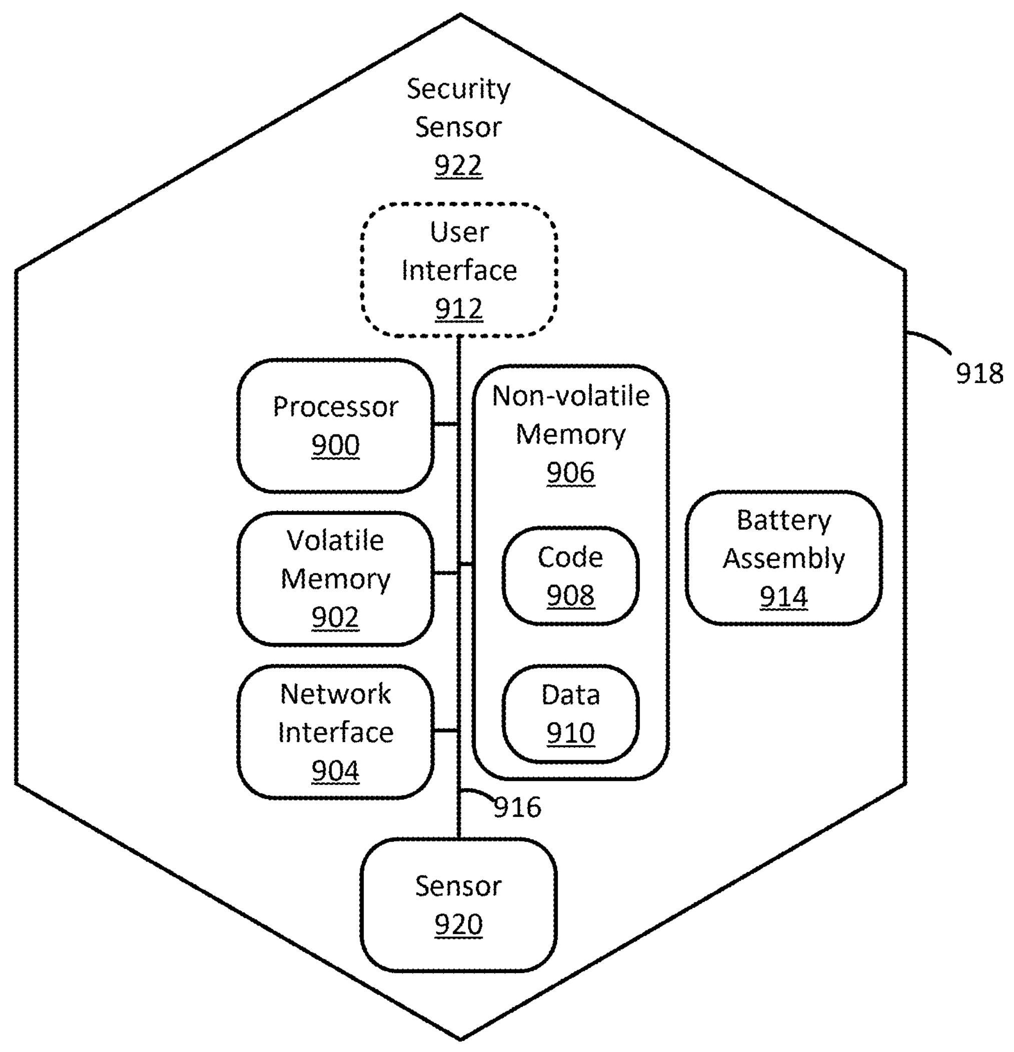
FIG. 9A shows an example implementation of a security sensor of the security system shown in FIG. 6, according to some implementations of the present disclosure.

Turning now to FIG. 9A, an example security sensor 922 is schematically illustrated. Particular configurations of the security sensor 922 (e.g., the image capture devices 604 and 610, the motion sensor assembly 612, and the contact sensor assemblies 606) are illustrated in FIG. 6 and described above. Other examples of security sensors 922 include glass break sensors, carbon monoxide sensors, smoke detectors, water sensors, temperature sensors, and door lock sensors, to name a few. As shown in FIG. 9A, the security sensor 922 includes at least one processor 900, volatile memory 902, non-volatile memory 906, at least one network interface 904, a battery assembly 914, an interconnection mechanism 916, and at least one sensor assembly 920. The non-volatile memory 906 stores executable code 908 and a data store 910. Some examples include a user interface 912. As indicated by its rendering in dashed lines, not all examples of the security sensor 922 include the user interface 912. In certain examples illustrated by FIG. 9A, the features of the security sensor 922 enumerated above are incorporated within, or are a part of, a housing 918.

In some examples, the respective descriptions of the processor 700, the volatile memory 702, the non-volatile memory 706, the interconnection mechanism 716, and the battery assembly 714 with reference to the base station 614 are applicable to the processor 900, the volatile memory 902, the non-volatile memory 906, the interconnection mechanism 916, and the battery assembly 914 with reference to the security sensor 922. As such, those descriptions will not be repeated.

Continuing with the example of FIG. 9A, through execution of the code 908, the processor 900 can control operation of the network interface 904. In some examples, the network interface 904 includes one or more physical interfaces (e.g., a radio (including an antenna), an ethernet port, a USB port, etc.) and a software stack including drivers and/or other code 908 that is configured to communicate with the one or more physical interfaces to support one or more LAN, PAN, and/or WAN standard communication protocols. The communication protocols can include, for example, TCP, UDP, HTTP, and MQTT among others. As such, the network interface 904 enables the security sensor 922 to access and communicate with other computing devices (e.g., the other location-based devices) via a computer network (e.g., the LAN established by the router 616 and/or a point-to-point connection). For instance, in at least one example, when executing the code 908, the processor 900 controls the network interface to stream (e.g., via UDP) sensor data acquired from the sensor assembly 920 to the base station 614. Alternatively or additionally, in at least one example, through execution of the code 908, the processor 900 can control the network interface 904 to enter a power conservation mode by powering down a 2.4 GHz radio and powering up a sub-GHz radio that are both included in the network interface 904. In this example, through execution of the code 908, the processor 900 can control the network interface 904 to enter a streaming or interactive mode by powering up a 2.4 GHz radio and powering down a sub-GHz radio, for example, in response to receiving a wake signal from the base station via the sub-GHz radio.

Continuing with the example of FIG. 9A, through execution of the code 908, the processor 900 can control operation of the user interface 912. In some examples, the user interface 912 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 908 that is configured to communicate with the user input and/or output devices. As such, the user interface 912 enables the security sensor 922 to interact with users to receive input and/or render output. This rendered output can include, for instance, one or more GUIs including one or more controls configured to display output and/or receive input. The input can specify values to be stored in the data store 910. The output can indicate values stored in the data store 910. It should be noted that, in some examples, parts of the user interface 912 are accessible and/or visible as part of, or through, the housing 918.

Continuing with the example of FIG. 9A, the sensor assembly 920 can include one or more types of sensors, such as the sensors described above with reference to the image capture devices 604 and 610, the motion sensor assembly 612, and the contact sensor assembly 606 of FIG. 6, or other types of sensors. For instance, in at least one example, the sensor assembly 920 includes an image sensor (e.g., a charge-coupled device or an active-pixel sensor) and/or a temperature or thermographic sensor (e.g., an active and/or passive infrared (PIR) sensor). Regardless of the type of sensor or sensors housed, the processor 900 can (e.g., via execution of the code 908) acquire sensor data from the housed sensor and stream the acquired sensor data to the processor 900 for communication to the base station.

It should be noted that, in some examples of the devices 608 and 922, the operations executed by the processors 800 and 900 while under control of respective control of the code 808 and 908 may be hardcoded and/or implemented in hardware, rather than as a combination of hardware and software. Moreover, execution of the code 908 can implement the camera agent 638 of FIG. 6 and can result in manipulated data that is a part of the data store 910.

Figure 9B:
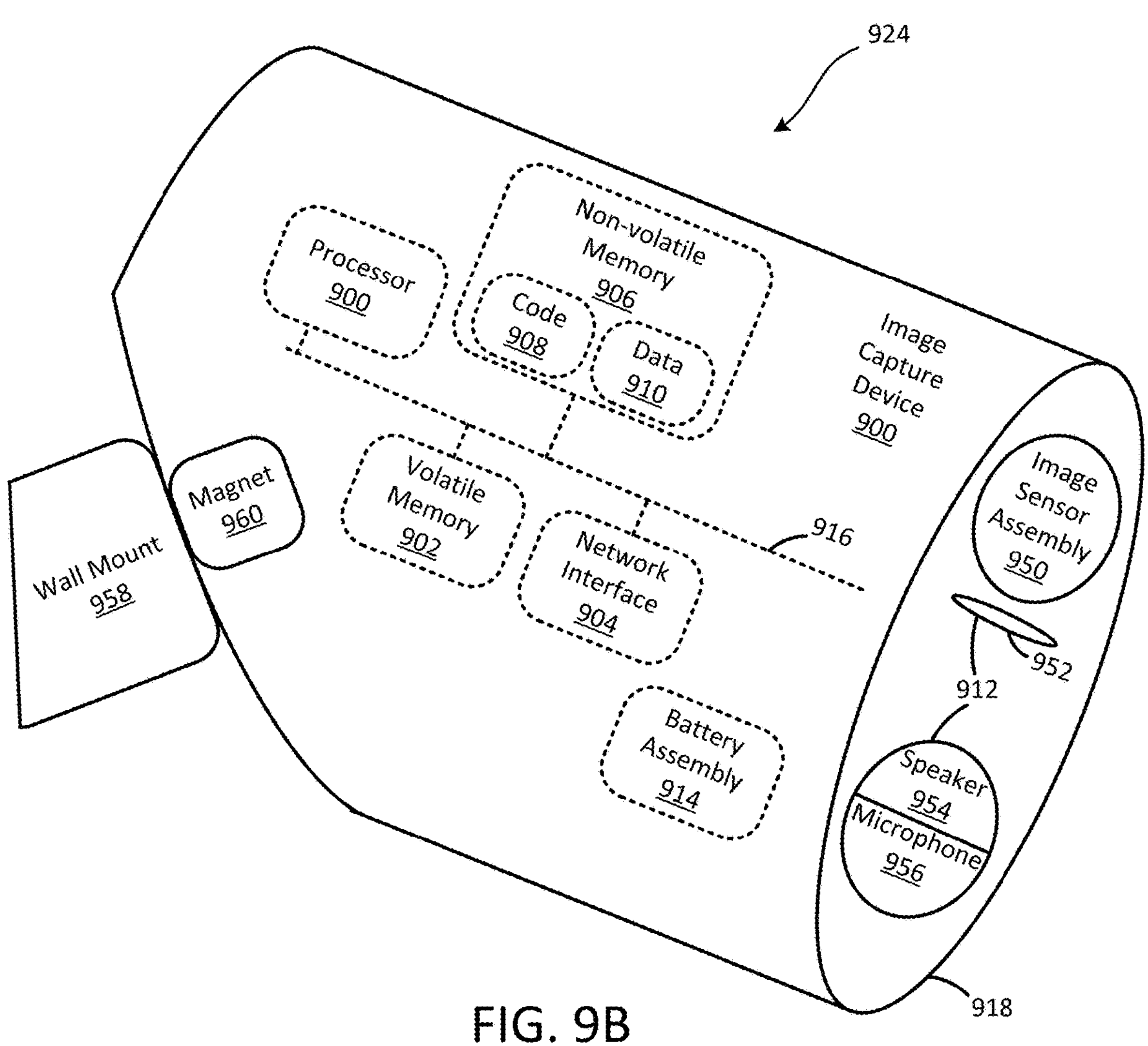
FIG. 9B shows an example implementation of an image capture device of the security system shown in FIG. 6, according to some implementations of the present disclosure.

Turning now to FIG. 9B, an example image capture device 924 is schematically illustrated. Particular configurations of the image capture device 924 (e.g., the image capture devices 604 and 610) are illustrated in FIG. 6 and described above. As shown in FIG. 9B, the image capture device 924 includes at least one processor 900, volatile memory 902, non-volatile memory 906, at least one network interface 904, a battery assembly 914, and an interconnection mechanism 916. These features of the image capture device 924 are illustrated in dashed lines to indicate that they reside within a housing 918. The non-volatile memory 906 stores executable code 908 and a data store 910.

Some examples further include an image sensor assembly 950, a light 952, a speaker 954, a microphone 956, a wall mount 958, and a magnet 960. The image sensor assembly 950 may include a lens and an image sensor (e.g., a charge-coupled device or an active-pixel sensor) and/or a temperature or thermographic sensor (e.g., an active and/or passive infrared (PIR) sensor). The light 952 may include a light emitting diode (LED), such as a red-green-blue emitting LED. The light 952 may also include an infrared emitting diode in some examples. The speaker 954 may include a transducer configured to emit sound in the range of 60 dB to 80 dB or louder. Further, in some examples, the speaker 954 can include a siren configured to emit sound in the range of 70 dB to 90 dB or louder. The microphone 956 may include a micro electro-mechanical system (MEMS) microphone. The wall mount 958 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 960 to magnetically couple to the wall mount 958, thereby holding the image capture device 924 in place.

In some examples, the respective descriptions of the processor 900, the volatile memory 902, the network interface 904, the non-volatile memory 906, the code 908 with respect to the network interface 904, the interconnection mechanism 916, and the battery assembly 914 with reference to the security sensor 922 are applicable to these same features with reference to the image capture device 924. As such, those descriptions will not be repeated here.

Continuing with the example of FIG. 9B, through execution of the code 908, the processor 900 can control operation of the image sensor assembly 950, the light 952, the speaker 954, and the microphone 956. For instance, in at least one example, when executing the code 908, the processor 900 controls the image sensor assembly 950 to acquire sensor data, in the form of image data, to be streamed to the base station 614 (or one of the processes 630, 628, or 632 of FIG. 6) via the network interface 904. Alternatively or additionally, in at least one example, through execution of the code 908, the processor 900 controls the light 952 to emit light so that the image sensor assembly 950 collects sufficient reflected light to compose the image data. Further, in some examples, through execution of the code 908, the processor 900 controls the speaker 954 to emit sound. This sound may be locally generated (e.g., a sonic alarm via the siren) or streamed from the base station 614 (or one of the components 630, 628, or 632 of FIG. 6) via the network interface 904 (e.g., utterances from the user or monitoring personnel). Further still, in some examples, through execution of the code 908, the processor 900 controls the microphone 956 to acquire sensor data in the form of sound for streaming to the base station 614 (or one of the components 630, 628, or 632 of FIG. 6) via the network interface 904.

It should be appreciated that in the example of FIG. 9B, the light 952, the speaker 954, and the microphone 956 implement an instance of the user interface 912 of FIG. 9A. It should also be appreciated that the image sensor assembly 950 and the light 952 implement an instance of the sensor assembly 920 of FIG. 9A. As such, the image capture device 924 illustrated in FIG. 9B is at least one example of the security sensor 922 illustrated in FIG. 9A. The image capture device 924 may be a battery-powered outdoor sensor configured to be installed and operated in an outdoor environment, such as outside a home, office, store, or other commercial or residential building, for example.

Figure 9C:
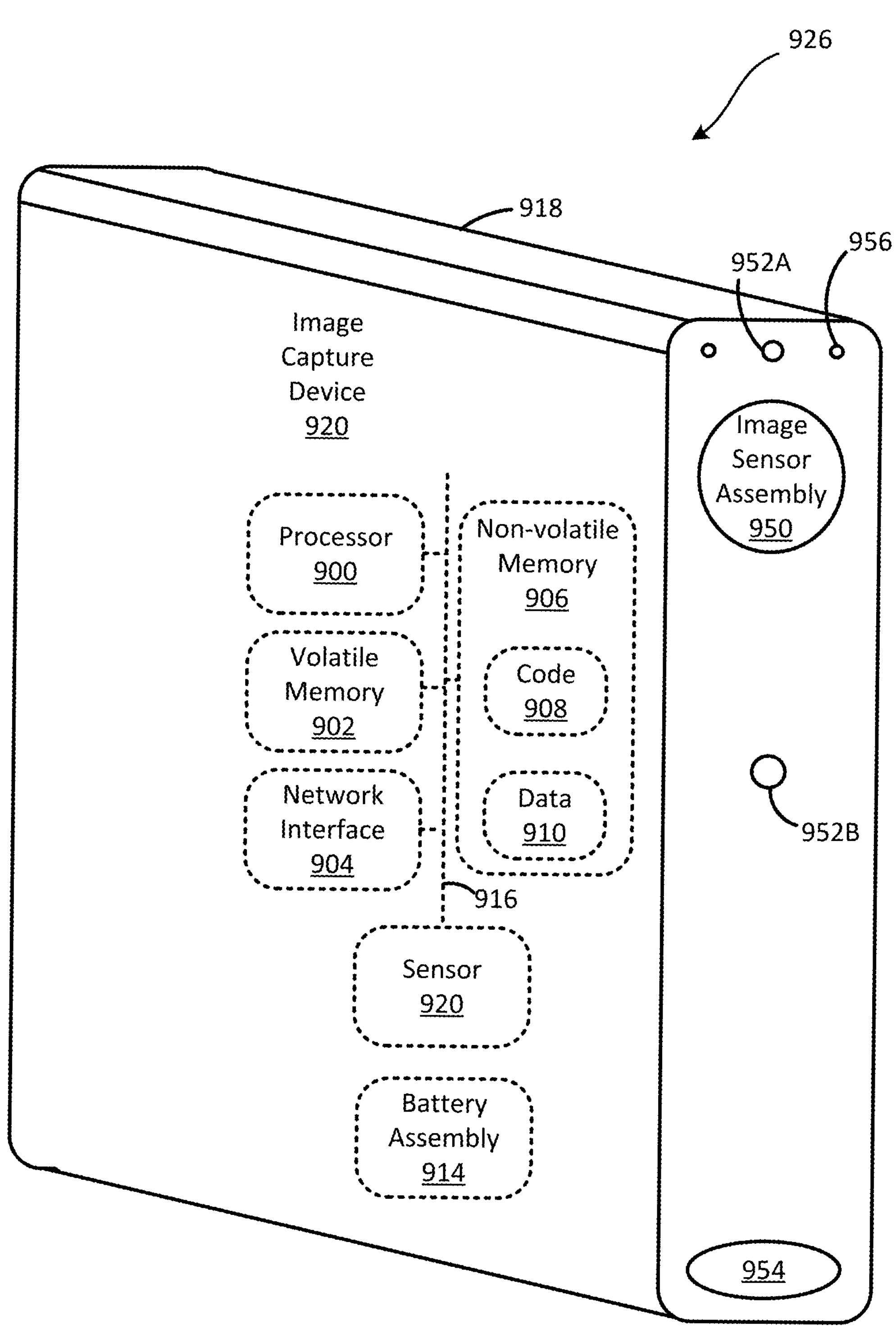
FIG. 9C shows an example implementation of another image capture device of the security system shown in FIG. 6, according to some implementations of the present disclosure.

Turning now to FIG. 9C, another example image capture device 926 is schematically illustrated. Particular configurations of the image capture device 926 (e.g., the image capture devices 604 and 610) are illustrated in FIG. 6 and described above. As shown in FIG. 9C, the image capture device 926 includes at least one processor 900, volatile memory 902, non-volatile memory 906, at least one network interface 904, a battery assembly 914, and an interconnection mechanism 916. These features of the image capture device 926 are illustrated in dashed lines to indicate that they reside within a housing 918. The non-volatile memory 906 stores executable code 908 and a data store 910. The image capture device 926 further includes an image sensor assembly 950, a speaker 954, and a microphone 956 as described above with reference to the image capture device 924 of FIG. 9B.

In some examples, the image capture device 926 further includes lights 952A and 952B. The light 952A may include a light emitting diode (LED), such as a red-green-blue emitting LED. The light 952B may also include an infrared emitting diode to enable night vision in some examples.

It should be appreciated that in the example of FIG. 9C, the lights 952A and 952B, the speaker 954, and the microphone 956 implement an instance of the user interface 912 of FIG. 9A. It should also be appreciated that the image sensor assembly 950 and the light 952 implement an instance of the sensor assembly 920 of FIG. 9A. As such, the image capture device 926 illustrated in FIG. 9C is at least one example of the security sensor 922 illustrated in FIG. 9A. The image capture device 926 may be a battery-powered indoor sensor configured to be installed and operated in an indoor environment, such as within a home, office, store, or other commercial or residential building, for example.

Figure 10:
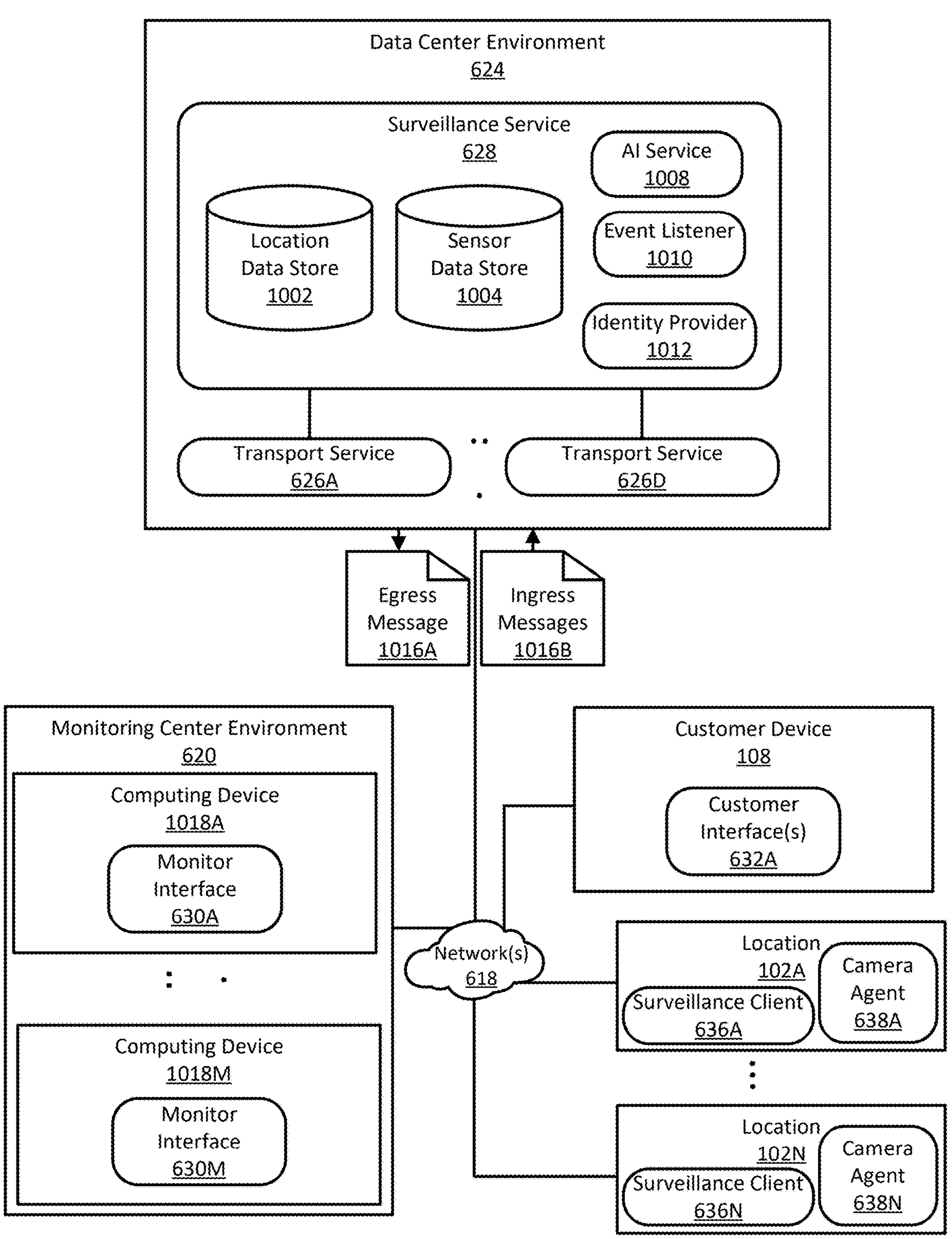
FIG. 10 shows example implementations of the surveillance center environment and the monitoring center environment of the security system shown in FIG. 6, according to some implementations of the present disclosure.

Turning now to FIG. 10, aspects of the data center environment 624 of FIG. 6, the monitoring center environment 620 of FIG. 6, one of the customer devices 622 of FIG. 6, the network(s) 618 of FIG. 6, and a plurality of monitored locations 602A through 602N of FIG. 6 (collectively referred to as the locations 602) are schematically illustrated. As shown in FIG. 10, the data center environment 624 hosts the surveillance service 628 and the transport services 626 (individually referred to as the transport services 626A through 626D). The surveillance service 628 includes a location data store 1002, a sensor data store 1004, an artificial intelligence (AI) service 1008, an event listening service 1010, and an identity provider 1012. The monitoring center environment 620 includes computing devices 1018A through 1018M (collectively referred to as the computing devices 1018) that host monitor interfaces 630A through 630M. Individual locations 602A through 602N include base stations (e.g., the base station 614 of FIG. 6, not shown) that host the surveillance clients 636A through 636N (collectively referred to as the surveillance clients 636) and image capture devices (e.g., the image capture device 610 of FIG. 6, not shown) that host the software camera agents 638A through 638N (collectively referred to as the camera agents 638).

As shown in FIG. 10, the transport services 626 may be configured to process ingress messages 1016B from the customer interface(s) 632A, the surveillance clients 636, the camera agents 638, and/or the monitor interfaces 630. The transport services 626 are also configured to process egress messages 1016A addressed to one or more of the customer interface(s) 632A, the surveillance clients 636, the camera agents 638, and the monitor interfaces 630. The location data store 1002 is configured to store, within a plurality of records, location data in association with identifiers of customers (for example, user account identifiers) for whom the location is monitored. For example, the location data may be stored in a record with an identifier of a customer and/or an identifier of the location to associate the location data with the customer and the location. The sensor data store 1004 is configured to store, within a plurality of records, sensor data (e.g., one or more frames of image data) separately from other location data but in association with identifiers of locations and timestamps at which the sensor data was acquired. In some examples, the sensor data store 1004 is optional and may be used, for example, where the sensor data housed therein has specialized storage or processing requirements.

Continuing with the example of FIG. 10, the AI service 1008 is configured to process sensor data (e.g., images and/or sequences of images) to identify movement, human faces, and other features within the sensor data. The event listening service 1010 is configured to scan location data transported via the ingress messages 1016B for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 632 and/or a monitor interface 630). In some examples, the event listening service 1010 can interoperate with the AI service 1008 to identify events from sensor data. The identity provider 1012 is configured to receive, via the transport services 626, authentication requests from the surveillance clients 636 or the camera agents 638 that include security credentials. When the identity provider 1012 can authenticate the security credentials in a request (e.g., via a validation function, cross-reference look-up, or some other authentication process), the identity provider 1012 can communicate a security token in response to the request. A surveillance client 636 or a camera agent 638 can receive, store, and include the security token in subsequent ingress messages 1016B, so that the transport service 626A is able to securely process (e.g., unpack/parse) the packages included in the ingress messages 1016B to extract the location data prior to passing the location data to the surveillance service 628.

Continuing with the example of FIG. 10, the transport services 626 may be configured to receive the ingress messages 1016B, verify the authenticity of the ingress messages 1016B, parse the ingress messages 1016B, and extract the location data encoded therein prior to passing the location data to the surveillance service 628 for processing. This location data can include any of the location data described above with reference to FIG. 6. Individual transport services 626 may be configured to process ingress messages 1016B generated by location-based monitoring equipment of a particular manufacturer and/or model. The surveillance clients 636 and the camera agents 638 are configured to generate and communicate, to the surveillance service 628 via the network(s) 618, ingress messages 1016B that include packages of location data based on sensor information received at the locations 602. The transport services 626 may additionally include the SMS gateway 106 described above in connection with FIG. 1, to enable SMS communications with other components of the system 600. In some implementations, the SMS gateway 106 may be operated by a third party provider external to the data center environment 624.

Continuing with the example of FIG. 10, the computing devices 1018 are configured to host the monitor interfaces 630. In some examples, individual monitor interfaces 630A-630M are configured to render GUIs including one or more image frames and/or other sensor data. In certain examples, the customer device 622 is configured to host the customer interface 632. In some examples, customer interface 632 is configured to render GUIs including one or more image frames and/or other sensor data. Additional features of the monitor interfaces 630 and the customer interface 632 are described further below with reference to FIG. 11.

Figure 11:
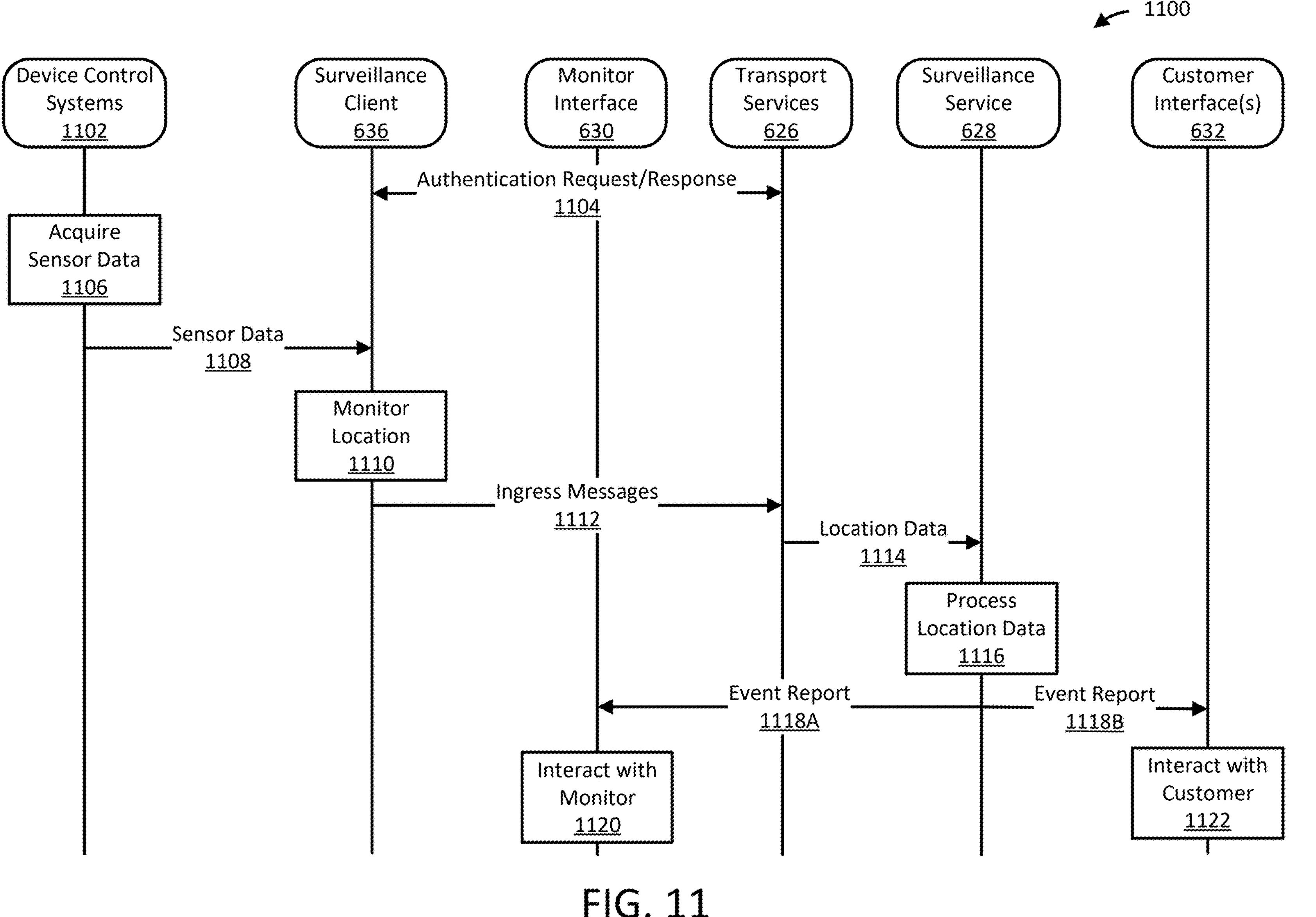
FIG. 11 is a sequence diagram of a monitoring process that may be performed by components of the security system shown in FIG. 6, according to some implementations of the present disclosure.

Turning now to FIG. 11, a monitoring process 1100 is illustrated as a sequence diagram. The process 1100 can be executed, in some examples, by a security system (e.g., the security system 600 of FIG. 6). More specifically, in some examples, at least a portion of the process 1100 is executed by the location-based devices under the control of device control system (DCS) code (e.g., either the code 808 or 908) implemented by at least one processor (e.g., either of the processors 800 or 900 of FIGS. 8-9C). The DCS code can include, for example, a camera agent (e.g., the camera agent 638 of FIG. 6). At least a portion of the process 1100 is executed by a base station (e.g., the base station 614 of FIG. 6) under control of a surveillance client (e.g., the surveillance client 636 of FIG. 6). At least a portion of the process 1100 is executed by a monitoring center environment (e.g., the monitoring center environment 620 of FIG. 6) under control of a monitor interface (e.g., the monitor interface 630 of FIG. 6). At least a portion of the process 1100 is executed by a data center environment (e.g., the data center environment 624 of FIG. 6) under control of a surveillance service (e.g., the surveillance service 628 of FIG. 6) or under control of transport services (e.g., the transport services 626 of FIG. 6). At least a portion of the process 1100 is executed by a customer device (e.g., the customer device 622 of FIG. 6) under control of one or more customer interfaces (e.g., customer interface(s) 632 of FIG. 6).

As shown in FIG. 11, the process 1100 starts with the surveillance client 636 authenticating with an identity provider (e.g., the identity provider 1012 of FIG. 10) by exchanging one or more authentication requests and responses 1104 with the transport service 626. More specifically, in some examples, the surveillance client 636 communicates an authentication request to the transport service 626 via one or more API calls to the transport service 626. In these examples, the transport service 626 parses the authentication request to extract security credentials therefrom and passes the security credentials to the identity provider for authentication. In some examples, if the identity provider authenticates the security credentials, the identity provider generates a security token and transmits the security token to the transport service 626. The transport service 626, in turn, receives a security token and communicates the security token as a payload within an authentication response to the authentication request. In these examples, if the identity provider is unable to authenticate the security credentials, the transport service 626 generates an error code and communicates the error code as the payload within the authentication response to the authentication request. Upon receipt of the authentication response, the surveillance client 636 parses the authentication response to extract the payload. If the payload includes the error code, the surveillance client 636 can retry authentication and/or interoperate with a user interface of its host device (e.g., the user interface 712 of the base station 614 of FIG. 7) to render output indicating the authentication failure. If the payload includes the security token, the surveillance client 636 stores the security token for subsequent use in communication of location data via ingress messages. It should be noted that the security token can have a limited lifespan (e.g., 1 hour, 1 day, 1 week, 1 month, etc.) after which the surveillance client 636 may be required to reauthenticate with the transport services 626.

Continuing with the process 1100, one or more DCSs 1102 hosted by one or more location-based devices acquire 1106 sensor data descriptive of a location (e.g., the location 602A of FIG. 6). The sensor data acquired can be any of a variety of types, as discussed above with reference to FIGS. 6-4. In some examples, one or more of the DCSs 1102 acquire sensor data continuously. In some examples, one or more of the DCSs 1102 acquire sensor data in response to an event, such as expiration of a local timer (a push event) or receipt of an acquisition polling signal communicated by the surveillance client 636 (a poll event). In certain examples, one or more of the DCSs 1102 stream sensor data to the surveillance client 636 with minimal processing beyond acquisition and digitization. In these examples, the sensor data may constitute a sequence of vectors with individual vector members including a sensor reading and a timestamp. Alternatively or additionally, in some examples, one or more of the DCSs 1102 execute additional processing of sensor data, such as generation of one or more summaries of multiple sensor readings. Further still, in some examples, one or more of the DCSs 1102 execute sophisticated processing of sensor data. For instance, if the security sensor includes an image capture device, the security sensor may execute image processing routines such as edge detection, motion detection, facial recognition, threat assessment, and reportable event generation.

Continuing with the process 1100, the DCSs 1102 communicate the sensor data 1108 to the surveillance client 636. As with sensor data acquisition, the DCSs 1102 can communicate the sensor data 1108 continuously or in response to an event, such as a push event (originating with the DCSs 1102) or a poll event (originating with the surveillance client 636).

Continuing with the process 1100, the surveillance client 636 monitors 1110 the location by processing the received sensor data 1108. For instance, in some examples, the surveillance client 636 executes one or more image processing routines. These image processing routines may include any of the image processing routines described above with reference to the operation 1106. By distributing at least some of the image processing routines between the DCSs 1102 and surveillance clients 636, some examples decrease power consumed by battery-powered devices by off-loading processing to line-powered devices. Moreover, in some examples, the surveillance client 636 may execute an ensemble threat detection process that utilizes sensor data 1108 from multiple, distinct DCSs 1102 as input. For instance, in at least one example, the surveillance client 636 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 636 may execute includes outputting local alarms (e.g., in response to detection of particular events and/or satisfaction of other criteria) and detection of maintenance conditions for location-based devices, such as a need to change or recharge low batteries and/or replace/maintain the devices that host the DCSs 1102. Any of the processes described above within the operation 1110 may result in the creation of location data that specifies the results of the processes.

Continuing with the process 1100, the surveillance client 636 communicates the location data 1114 to the surveillance service 628 via one or more ingress messages 1112 to the transport services 626. As with sensor data 1108 communication, the surveillance client 636 can communicate the location data 1114 continuously or in response to an event, such as a push event (originating with the surveillance client 636) or a poll event (originating with the surveillance service 628).

Continuing with the process 1100, the surveillance service 628 processes 1116 received location data. Additionally or alternatively, in some examples, the surveillance service 628 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 628 may increase a threat score calculated by a DCS 1102 and/or the surveillance client 636. In some examples, the surveillance service 628 determines, by applying a set of rules and criteria to the location data 1114, whether the location data 1114 includes any reportable events and, if so, communicates an event report 1118A and/or 1118B to the monitor interface 630 and/or the customer interface(s) 632. A reportable event may be an event of a certain type (e.g., break-in) or an event of a certain type that satisfies additional criteria. For example, movement within a particular zone combined with a threat score that exceeds a threshold value may be a reportable event, while movement within the particular zone combined with a threat score that does not exceed a threshold value may be a non-reportable event. The event reports 618A and/or 618B may have a priority based on the same criteria used to determine whether the event reported therein is reportable or may have a priority based on a different set of criteria or rules.

Continuing with the process 1100, the monitor interface 630 interacts 1120 with monitoring personnel through, for example, one or more GUIs. These GUIs may provide details and context regarding one or more reportable events.

Continuing with the process 1100, the customer interface(s) 632 interact 1122 with at least one customer through, for example, one or more GUIs. These GUIs may provide details and context regarding one or more reportable events.

It should be noted that the processing of sensor data and/or location data, as described above with reference to the operations 1106, 1110, and 1116, may be executed by processors disposed within various parts of the system 600. For instance, in some examples, the DCSs 1102 execute minimal processing of the sensor data (e.g., acquisition and streaming only) and the remainder of the processing described above is executed by the surveillance client 636 and/or the surveillance service 628. This approach may be helpful to prolong battery runtime of location-based devices. In other examples, the DCSs 1102 execute as much of the sensor data processing as possible, leaving the surveillance client 636 and the surveillance service 628 to execute only processes that require sensor data that spans location-based devices and/or locations. This approach may be helpful to increase scalability of the system 600 with regard to adding new locations.

Turning now to FIG. 12, parts 1200 of a security system (e.g., the security system 600 of FIG. 6) that are configured to implement at least some of the context-based SMS features described above are schematically illustrated. These parts include the data center environment 624 of FIG. 6, the monitoring center environment 620 of FIG. 6, one of the customer devices 622 of FIG. 6, and a monitored location 602A of FIG. 6. As shown in FIG. 12, the data center environment 624 may host portions of the surveillance service 628 including the location data store 1002 of FIG. 10, the sensor data store 1004 of FIG. 10, one or more alarm event queues 1204, and the alarm history service 102 of FIG. 1, and the SMS service 104 of FIG. 1. The data center environment 624 optionally includes one or more message queues to persist alarm incident data and relationship data between alarm events and alarm incidents, for example as generated by an alarm lifecycle calculator which will be disclosed in turn. These one or more message queues may also be used by the alarm history service 102 to publish alarm events and alarm incidents, e.g., to the SMS service 104. The data center environment 624 further hosts portions of the transport services 626 including the SMS service 104, one or more device APIs 1202, and one or more monitoring APIs 1206. As noted previously, in some implementations, the SMS gateway 106 may instead be implemented by a third-party provider external of the data center environment 624.

The monitoring center environment 620 includes at least one computing device that hosts a monitor interface 630A and, in this example, at least one computing device that hosts a monitor platform 1208. In the illustrated example, the location 602A includes a base station 614, an image capture device 610, and a sensor 606. The base station 614 may host a surveillance client (e.g., the surveillance client 636 of FIG. 6; not shown in FIG. 12). The image capture device 610 may host a software camera agent (e.g., the camera agent 638 of FIG. 6; not shown in FIG. 12). The sensor 606 may host a DCS (e.g., as described above with reference to FIG. 9A). As will be apparent in view of this disclosure, the location-based devices 614, 610, and 606 are illustrated by way of example only and the location 602A may omit any of these devices or include one or more other devices. Similarly, the examples illustrated by FIG. 12 are not limited to a single customer device 622, location 602A, or monitoring center environment 620. In general, the monitor platform 1208 may be collocated with the monitoring center (as illustrated in FIG. 12), collocated with the rest of the surveillance service (as part of data center environment 624), or independently hosted.

The customer interface(s) 632A shown in FIG. 12 may include a text messaging application to enable SMS messages to be exchanged between the customer device 108 and the SMS gateway 106. In some implementations, the customer interface(s) 632A may also include one or more other applications (or "apps") to enable the customer to interact with one or more components of the system in other ways. In such implementations, the data center environment 624 may also include one or more additional transport services 626, e.g., an application hub (not illustrated), to facilitate such interactions.

Continuing with the example of FIG. 12, the location-based devices 614, 610, and 606 may be configured to detect events (e.g., reportable events) that occur within the location 602A and communicate messages regarding such events and other location data to the surveillance service 628 via the device APIs 1202. This other location data can include, for example, audio-visual sensor data acquired by the image capture device and arm/disarm events processed by the location-based devices. Table 1 lists examples of types of events that the location-based devices may be configured to communicate to the surveillance service 628 according to some examples.

TABLE 1

| Reportable Event | Description |
|---|---|
| Panic_Button | This event is reported if an alarm is triggered by user selection of a panic button associated with the location. |
| Alarm | This event is reported if the base station enters an alarm state due to reception of a trigger signal from an armed location-based device (e.g., a contact sensor, glass break sensor, motion sensor, camera, etc.). |
| Alarm_Stopped | This event is reported if a "stoppable" alarm (e.g., an alarm triggered by detection of an occurrence other than a human threat) is stopped. Examples of "stoppable" alarms include carbon-monoxide alarms, smoke alarms, water/moisture alarms, temperature/freeze alarms, and the like. |
| Medical_Alarm | This event is reported if an alarm is triggered by user selection of a medical alarm, such as via a keypad, key fob, or panic button. |
| Fire_Alarm | This event is reported if an alarm is triggered by user selection of a fire alarm, such as via a keypad, key fob, or panic button or a sensor detecting a fire, such as a smoke detector. |
| Power_Event | This event is reported if a change to line power is detected. |
| Camera_Event | This event is reported if an alarm is triggered by an image capture device, such as may occur by detection of motion, a human threat, or the like. |
| Cancel_Alarm | This event is reported if an alarm is canceled (e.g., by a user via a location-based device, the customer interface, or the monitor interface). |
| System_Off | This event is reported if the location-based devices are disarmed. |
| System_Home | This event is reported if the location-based devices are selectively armed and disarmed according to a set of user preferences that accommodate a user's physical presence at the location. |
| System_Away | This event is reported if the location-based devices are armed. |
| Personnel_Actions | This event is reported if monitoring personnel access any of the location-based devices. |

Continuing with the example of FIG. 12, the monitor interface 630A may include a browser-based application and/or portal hosted by computing devices within the monitoring center environment 620 and served by the monitor platform 1208. For example, in one implementation the monitor interface 630A comprises a combination of an application provided by the monitoring service provider that interacts with the monitoring platform, and a browser-based extension for video verification that interacts with the data center environment. The monitor interface 630A may be configured to interact with monitoring personnel to both receive input and render output regarding alarms triggered at monitored locations, such as the location 602A. For instance, in some examples, the monitor interface 630A is configured to notify monitoring personnel of the occurrence of alarms at monitored locations, render audio-visual data and other sensor data collected by location-based devices at the monitored locations and stored in the data stores 1002 and/or 1004, and establish real time connections with location-based devices. Further, in some examples, the monitor interface 630A includes controls configured to receive input specifying actions taken by the monitoring personnel to address the alarms, such as interacting with actors including customers, customer contacts, dispatchers, and/or first responders called upon to investigate the alarms. These actions can include, for example, taking or making calls from or to customers regarding an alarm; verifying the authenticity of the alarm; making contact with individuals at a location reporting an alarm; calling an appropriate Public Safety Answering Point (PSAP) to request dispatch of emergency responders, such as police, fire, or emergency medical services; updating status information regarding such dispatches; updating status information for alarm; and canceling alarms and/or dispatched responders, to name a few actions. Some or all of these and other actions may be handled by the monitor platform 1208, which may then translate them into events that are communicated to the surveillance service 628 via the monitoring APIs 1206. Table 2 lists examples of types of events that monitor interface 630A may be configured to communicate to the surveillance service 628 according to some examples.

TABLE 2

| Reportable Event | Description |
|---|---|
| Alarm_Accessed | This event is reported if the monitor interface receives input specifying monitoring personnel began handling an alarm. |
| Alarm_Verified | This event is reported if the monitor interface receives input specifying monitoring personnel verified authenticity of an alarm. |
| Dispatch_Fire | This event is reported if the monitor interface receives input specifying that fire department personnel were dispatched to a location. |
| Dispatch_Medical | This event is reported if the monitor interface receives input specifying that emergency medical services were dispatched to a location. |
| Dispatch_Police | This event is reported if the monitor interface receives input specifying that police department personnel were dispatched to a location. |
| Dispatch_Update | This event is reported if the monitor interface receives input specifying an update to dispatch status (e.g., initiated, on-site, canceled, completed, etc.). |
| Customer_Contact | This event is reported if the monitor interface receives input specifying monitoring personnel interacted with a customer or customer contact. |
| Customer_Contact_Failed | This event is reported if the monitor interface receives input specifying monitoring personnel were unable to reach a customer or customer contact. |
| Invalid_Safeword | This event is reported if the monitor interface receives input specifying a customer or customer contact responded to a security challenge with an unrecognized response. |
| Threat_Contact | This event is reported if the monitor interface receives input specifying monitoring personnel interacted (e.g., within a real time communication session via a location-based device) with a threat at the location. |
| Alarm_Update | This event is reported if the monitor interface receives input specifying an update to alarm status (e.g., triggered, under investigation, cancelled, completed, etc.). |

currently being handled by monitoring personnel. In these examples, the alarm queue may identify individual alarms and may prioritize the alarms for urgency in handling, relative to one another.

As shown in FIG. 12, the monitor platform 1208 may be further configured to interoperate with the monitoring APIs 1206. For instance, in some examples, the monitor platform 1208 is configured to exchange messages with the monitoring APIs 1206 that generate events (e.g., reportable events). These events may result, for example, from actions taken by monitoring personnel as part of the workflows they perform. These events may include, for instance, initiation or escalation of an alarm initiated by monitoring personnel.

Continuing with the example of FIG. 12, the monitor platform 1208 may be configured to interoperate with a plurality of monitor interfaces, including the monitor interface 630A. In some examples where the monitor interface 630A is a browser-based application, the monitor platform 1208 may serve the monitor interface 630A to a browser executing on a computing device accessible by monitoring personnel. Alternatively or additionally, in certain examples, the monitor platform 1208 may operate as a service to a specialized, native version of the monitor interface 630A executing on the computing device accessible by monitoring personnel. Regardless of its particular method of implementation, the monitor platform 1208 may exchange messages with the monitor interface 630A to drive workflows conducted by monitoring personnel (e.g., reviewing alarms raised at monitored locations, contacting monitoring service customers, contacting dispatchers, following up on alarms, canceling false alarms, closing out fully addressed alarms, etc.). In some examples, the monitor platform 1208 includes an alarm queue that stores data representative of alarms Continuing with the example of FIG. 12, the device APIs 1202 may be configured to interoperate with the location-based devices 614, 610, and 606 at the location 602A to exchange ingress messages (e.g., the ingress messages 1016B of FIG. 10) and egress messages (e.g., the egress messages 1016A of FIG. 10) with the location-based devices 614, 610, and 606. For instance, in some examples, the device APIs 1202 may establish WebSocket connections with DCS processes hosted by the location-based devices 614, 610, and/or 606, and the connected DCS processes communicate the ingress and egress messages via the WebSocket connections. The ingress and egress messages may include data specifying alarms and any of the events associated therewith, as described herein. In some examples, the device APIs 1202 are further configured to interoperate with the data stores 1002 and/or 1004 to store event and/or sensor data received from the location 602A. In these examples, the device APIs 1202 may also be configured to interoperate with the alarm event queues 1204 to place certain events (e.g., reportable events) thereon for processing by the alarm history service 102. These events can be utilized by the alarm history service 102 to build comprehensive lists of events related to particular alarms. Examples of processes that the device APIs 1202 are configured to implement in various examples are described further below with reference to FIGS. 13-16.

Continuing with the example of FIG. 12, the monitoring APIs 1206 may be configured to interoperate with the monitor platform 1208 at the monitoring center environment 620 to exchange ingress messages (e.g., the ingress messages 1016B of FIG. 10) and egress messages (e.g., the egress messages 1016A of FIG. 10) with the monitor platform 1208. For instance, in some examples, the monitoring APIs 1206 may establish WebSocket connections with the monitor platform 1208, and the connected processes may communicate the ingress and egress messages via such WebSocket connections. The ingress and egress messages may include data specifying alarms and any of the events associated therewith, as described herein. In some examples, the monitoring APIs 1206 may be further configured to interoperate with the data stores 1002 and/or 1004 to manipulate event and sensor data received from the location 602A. In these examples, the monitoring APIs 1206 may also be configured to interoperate with the alarm event queues 1204 to place certain events thereon for processing by the alarm history service 102. These events can be utilized by the alarm history service 102 to build comprehensive lists of events related to particular alarms. Examples of processes that the monitoring APIs 1206 are configured to implement in various examples are described further below with reference to FIGS. 13-16. It should be noted that, in some examples, the monitoring APIs 1206 may support the Automated Secure Alarm Protocol and may be configured to receive messages including events from computer-aided dispatch systems operated by PSAPs and to add the events to the alarm event queues 1204.

Continuing with the example of FIG. 12, the one or more alarm event queues 1204 may include one or more data structures and, in certain examples, surrounding services that support enqueuing and dequeuing of member data structures that house events (e.g., reportable events). The alarm event queues may be implemented using any of a variety of queuing technologies such as KAFKA, IBM MQ, and AMAZON MQ, to name a few. In some examples, the one or more alarm event queues 1204 may include a first queue for events inbound from the device APIs 1202, a second queue for events inbound from the monitoring APIs 1206, a third queue for events outbound from the alarm history service 102, and a fourth queue for alarm states outbound from the alarm history service 102. Examples of processes that the alarm event queues 1204 are configured to implement in various examples are described further below with reference to FIG. 13-16.

Continuing with the example of FIG. 12, the alarm history service 102 may be configured to retrieve events from the alarm event queues 1204, organize the events into lists by alarm, and publish the organized lists to the SMS service 104, and perhaps other services within the data center environment 624, for processing, as described above. In certain examples, the alarm history service 102 may maintain and refer to a filter that prevents and/or allows enumerated types of events to be passed to SMS service 104. Examples of processes that the alarm history service 102 may be configured to implement in various examples are described further below with reference to FIGS. 13-16.

As described above in connection with FIGS. 1-5, the SMS service 104 shown in FIG. 12 may be configured to generate context-driven and/or context-tailored SMS messages for delivery to the customer interface(s) 632A of the customer device 108 via the SMS gateway 106 and/or to determine context appropriate actions to take, and/or generate context-appropriate replies, in response to SMS messages received from the customer interface(s) 632A via the SMS gateway 106. As noted previously, the SMS gateway 106 may be configured to interoperate with the customer interface 632A (e.g., a text messaging application) on the customer device 108 to exchange SMS messages (e.g., the egress messages 1016A and ingress messages 1016B of FIG. 10) with the customer interface 632A.

Customers often view alarms as something more than a collection of signals produced by alarm system components that change the state of the alarm system as a whole. In particular, customers typically understand alarms as an aggregation of signals related to an intrusion or other event at a location, in addition to the activities involved in responding to or otherwise handling the alarm.

As used herein, the term "alarm" refers to the real-world experience of a customer having their alarm system, installed at a monitored location, detect an issue (such as an intrusion, an environmental issue, a reported medical emergency, or a "panic" signal received when a customer actuates a panic button), annunciate the issue through the triggering of an alarm state for the alarm system (for example, by triggering one or more sirens), and report the alarm details to a monitoring platform for handling. An "alarm" may also include subsequent activities of the monitoring center, customer contacts, dispatchers, and emergency services personnel.

As disclosed herein, the triggering and subsequent handling of an alarm may involve actions taken by various alarm system components and people (also referred to herein as "actors") interacting with such components. Examples of such actors include the customer of the alarm service, contacts of the customer, monitoring personnel associated with a monitoring center environment, dispatchers, emergency services personnel who are dispatched to a monitored location, and even an intruder observed at the monitored location.

Signals generated by alarm system components can be routed to monitoring center environment 620 using, for example, monitoring APIs 1206. In some cases the alarm signals may be delivered to multiple distinct monitoring center environments. Monitoring and other alarm handling activities, such as dispatch of emergency services, can be handled by monitoring personnel associated with the monitoring center environment and/or other personnel downstream of the monitoring center environment (for example, dispatchers at a dispatch center). In certain implementations, and as disclosed in greater detail herein, actions taken by monitoring personnel and/or other downstream personnel can be reported back to data center environment 624. This provides transparency to the surveillance service 628, and in turn to customers, with respect to the handling of alarms, as defined above.

Certain of the techniques disclosed herein provide the customer with more robust information on what activities were performed in the course of handling an alarm. More specifically, certain techniques disclosed herein can aggregate alarm signals and base station status changes with monitoring and dispatch events to catalogue detailed information about an alarm incident. Disclosed herein is logic that aggregates alarm events into alarm incidents, and that generates summary state information from such alarm events.

As used herein, the term "alarm event" refers to an activity associated with the triggering and handling of an alarm at a monitored location. In certain implementations, alarm events may be uniquely identified with an event identifier, have a timestamp, and identity the monitored location associated with the alarm event. An alarm event may also optionally include additional details specific to the type of alarm event and the source of the alarm event. Tables 2 and 3, above, list examples of reportable events which may be considered "alarm events."

As used herein, the term "alarm incident" refers to an aggregation of alarm events intended to represent an alarm. An alarm incident includes the collection of one or more alarm events and summary data derived from the collection of alarm events. In certain implementations alarm incidents may be uniquely identified with an incident identifier ("incident ID"), will be associated with an identifier of the monitored location, and/or will have a timestamp that is generated by identifying the timestamp of the alarm event that triggered the alarm.

In certain implementations, the alarm history service 102 may aggregate alarm events into an alarm incident and calculate a summary state for the alarm incident. In particular, in some implementations, the alarm history service 102 may host an alarm lifecycle calculator that aggregates alarm events into alarm incidents. The aggregated events and state information may then be published to the SMS service 104, and perhaps other components within the data center environment 624, for processing as described above.

To this end, FIG. 13 provides a schematic diagram illustrating data flows to and from the alarm history service 102 according to some examples described herein. In particular, FIG. 13 illustrates a plurality of sources 1301 (for example, alarm event sources which may include, but are not limited to, an image capture device, a contact sensor assembly, a keypad, a motion sensor assembly, a monitoring specialist, and a base station) that generate event data 1302. Event data 1302 may be representative of, or otherwise characterize, an event detected by one or more of sources 1301. A source can be understood as a device or platform that links one of the aforementioned "actors" to the alarm platform. Event data 1302 may be passed to a service, for example, the alarm history service 102. In some implementations, the alarm history service 102 may subscribe to event data 1302 generated by sources 1301, for example, using a data distribution platform such as MQTT or Apache Kafka, and may receive push notifications based on such subscription. This may be understood as an asynchronous approach to delivery of event data 1302. FIG. 13 illustrates an example wherein the data distribution platform is implemented using one or more event queues 1303.

In some cases, the alarm history service 102 may additionally or alternatively retrieve event data 1302 by sending a request to a particular source 1301'. Such a request is represented in FIG. 13 by a "get event data" request 1305 extending from the alarm history service 102 to the source 1301'. More specifically, this represents the alarm history service 102 sending the "get event data" request 1305 to the source 1301' for event data 1302. The source 1301' may respond to such request by sending the event data 1302 to the alarm history service 102.

FIG. 13 also illustrates production, by the alarm history service 102, of messages that include event data 1302 that has been transformed into processed and aggregated alarm data 1306, which can in turn be provided to one or more consumers 1307. Depending on the particular implementation, in this context, a "consumer" may include the SMS service 104 described above or any other application, device, or user that is to receive the processed and aggregated alarm data 1306.

A consumer can be understood as an electronic device able to retrieve alarm data 1306 through at least two pathways. First, a particular consumer 1307' can send a query to a public application programming interface (API) and retrieve data for a specified monitored location. Such a request may be referred to as a "synchronous" request, as the time at which the consumer 1307' receives the alarm data 1306 is synchronized with the time at which the consumer 1307' sends the query to the API. This is represented in FIG. 13 by a "get alarm data" request 1308 extending from the consumer 1307' to the alarm history service 102. The request 1308 may specify, for example, a specific location and/or a specific timeframe. In some implementations, the request 1308 may specify a particular resource, such as a certain alarm incident identifier or the latest alarm for a specified monitored location.

Additionally or alternatively, one or more consumers 1307 may subscribe to receive alarm data 1306 generated by the alarm history service 102 using a data distribution platform such as MQTT or Apache Kafka. Examples of such a data distribution platform are illustrated schematically in FIG. 13 as an alarm data queue 1309. In this case, the one or more consumers may receive push notifications based on such subscription. This may be understood as an "asynchronous" approach to delivery of alarm data 1306 to one or more consumers 1307, as the time at which the consumer 1307 receives the alarm data 1306 is not synchronized with a time at which the consumer submits a request for the alarm data 1306. In general, in a given implementation, there may be several alarm data queues, such as an alarm event data queue, an alarm queue, a latest alarms queue, and an active alarms queue.

FIG. 14 is a sequence diagram illustrating operations performed by an alarm lifecycle calculator 1401 of the alarm history service 102, according to some examples described herein. More specifically, FIG. 14 schematically illustrates the handling of incoming alarm events; the aggregation of those alarm events into an alarm incident; the calculation of an updated alarm incident state; and the publication of the alarm incident and the updated alarm incident state to a consumer 1307, such as the SMS service 104 described above. In general, a wide range of event sources 1301 will individually publish messages to a corresponding queue, for example, the event queue 1303, corresponding to that source of an event (see also, for example, event queue(s) 1204 described above with reference to FIG. 12). The alarm history service 102 may subscribe to these queues 1303 and can then handle messages from individual sources (for example, alarm event sources) with source- and message-specific logic. In general, event data 1302 can be delivered to the alarm history service 102 asynchronously using the event queue 1303. In particular, while event data 1302 is published to the event queue 1303 synchronously and is consumed from the event queue 1303 synchronously, such publication and consumption are not coupled, and therefore the delivery of event data 1302 from the source 1301 to the alarm history service 102 may be asynchronous. However, as noted above, in alternative implementations alarm events can be retrieved synchronously. For example, video recording quality data can be retrieved and converted into an alarm event where the alarm event being processed represents the creation of a new contemporary alarm incident.

Referring still to FIG. 14, the consumer 1307 refers to an entity, e.g., the SMS service 104, that wishes to consume alarm event and/or alarm incident messages generated by the alarm history service 102.

As illustrated in FIG. 14, the event queue 1303 may receive event data 1302 characterizing one or more events indicative of an alarm condition. In general, the event data 1302 may be delivered to the alarm history service 102 out of chronological order, but will be reordered and processed by the service as a time ordered stream of events. FIG. 14 schematically illustrates an alarm event to alarm incident association logic where the latest alarm incident represents the only potential existing alarm incident for the incoming alarm event. This logic represents a significant portion of alarm event handling scenarios because alarm events are often processed as they are generated. However, as alluded to above, it is possible that an older alarm event may be received out of chronological order, in which case additional logic will be used to determine the appropriate alarm incident with which to associate the alarm event, as will be described in turn.

FIG. 14 illustrates a process associated with the alarm lifecycle calculator 1401 that may be used to aggregate alarm events into an alarm incident and to calculate an "alarm incident state" associated with the alarm incident. In certain implementations, this may be accomplished by subscribing to message topics that publish alarm events to the alarm history service 102, grouping these alarm events by a unique location identifier, aggregating these events with existing events for that location identifier, ordering the alarm events by time (for example, event timestamp), associating groups of alarm events into alarm incidents, and calculating summary state information (also referred to as "alarm incident state") for the alarm incident. The relationship of the alarm events to alarm incidents can be persisted with an alarm incident summary state. For example, in an implementation wherein an RDBMS store is used to persist this relationship, a join table with an alarm event identifier and alarm incident identifier keys could be used. The alarm events can be persisted with the alarm incident identifier. While alarm lifecycle calculator 1401 is capable of appending new alarm events to existing alarm incidents, it can also inject historic alarm events as well (that is, alarm events that occurred before the most recent alarm incident). As used in this context, references to information being "persisted with" an object refers to the information being stored in a persistent layer of a data structure.

In general, alarm incident states are derived from the collection of alarm events which have been aggregated into a corresponding alarm incident at a given time, although these states are ephemeral and can change as new alarm events are received. This behavior represents an appreciation that knowledge of a given alarm incident may be imperfect at any given time. Alarm lifecycle calculator 1401 may receive an incoming stream of alarm events which may be ordered based on their timestamps. The alarm lifecycle calculator 1401 may evaluate the alarm events and determine whether individual incoming alarm events should be added to a new alarm incident or should be aggregated into an existing alarm incident. In some implementations, the alarm lifecycle calculator 1401 may be a server-based application (e.g., a cloud service) and, as such, may be implemented as a component of (or service used by) the alarm history service 102.

In certain implementations, an incoming alarm event will have at least two properties that may be used to determine how a chronological collection of alarm events to be aggregated into alarm incidents. A first property may be a unique identifier (such as a service identifier) that represents the monitored location where the alarm event originated or that allows such monitored location to be determined. A second property may be a timestamp (for example, a UTC timestamp or any other timestamp defined with respect to a fixed reference (such as any specified time zone), thereby allowing timestamps to be compared to each other) that can be used to generate the chronological collection of alarm events. If an incoming alarm event does not include its own timestamp, a timestamp can be generated upon receipt. The specific type of the data used to represent these properties (for example string, integer, hash, or GUID) is not relevant to the solution, provided that the identifier adequately identifies the relevant location or timestamp.

In some implementations, an alarm event may have additional properties. For example, an alarm event may be characterized by a "type" that indicates the source of the alarm event, the nature of the alarm event, and the shape of the event data. In some implementations, an alarm event may include an "Alarm Signal" dataset, which includes data characterizing the sensor, with properties identifying the sensor such as the sensor name, type, and unique identifier, and the signal generated by the sensor (with properties uniquely identifying the signal code, for example, the contact identifier and zone). Such data can be acquired from the data center environment 624 (for example, "an alarm event generated by the back door glass break sensor") when an event documenting receipt of alarm signals is received from the monitoring center environment 620 (for example, "an alarm event generated by receipt of the back door glass break signal by the monitoring center environment (a burglary signal was received and will be handled accordingly)").

As another example, an alarm event may define activities involved in handling the alarm event in the monitoring center environment 620, for example, as those documented in Table 3 above. Some of all of such event codes may have additional data. For example, the additional data may include an "assigned" parameter, which indicates that the alarm event has been dequeued and assigned to personnel associated with the monitoring center environment. The additional data may contain an identifier of the personnel associated with the monitoring center environment who is assigned to handle the alarm.

As another example, an alarm event may indicate that monitoring center environment personnel are initiating a call. Such an alarm event may include the call recipient, the type, and the phone number. Such data could provide insight such as an indication that the monitoring center personnel is attempting to call a customer contact, and could be used to subsequently update a customer state to include a contact with the state of "Contacting." Alternatively, such data could provide insight such as an indication that the monitoring center personnel is attempting to call an emergency services dispatcher, in which case the agency type (for example, police, fire, medical) and phone number could be indicated. This might trigger a new dispatch to be added to a dispatch state, with the appropriate agency type and the state of "Contacting."

As still another example, an alarm event may indicate the disposition of a call. Such an alarm event may include data indicating which call was completed and the outcome of the call (for example, "left message"). In some implementations, the call disposition could be matched with a set of active calls that have been recorded and the call in question could be updated (or a new call may be generated and the disposition recorded). The call disposition could be used to update the customer contact or dispatch request, which in turn would update the summary state based on the outcome and the other customer contacts and/or dispatches associated with the alarm incident. The outcome could be, for example, an invalid phone number, a request for dispatch, or a request to cancel. The monitoring center environment 620 may or may not honor these requests based on an established event handling protocol.

Referring still to FIG. 14, when event data 1302 corresponding to an event indicative of an alarm condition is received by the alarm history service 102, the latest alarm incident for the monitored location associated with the alarm event may be retrieved from an alarm history persistence data store 1310. See reference numerals 1403 and 1410 in FIG. 14. Optionally, if no such alarm incident exists, a new alarm incident with only the new alarm event may be created. See reference numeral 1404 in FIG. 14. The latest alarm incident retrieval can be accomplished using various techniques depending on the type of persistence layer in which alarm event records are stored. For example, in some implementations, records may be stored in an Amazon DynamoDB database with a partition key that includes the location identifier and a sort key that includes the event timestamp in a ISO 8601 format that produces a linearly sortable value. In such implementations, the first record for the identified location may be retrieved when the records are ordered by the sort key in reverse and the first record may then be returned. Once the latest incident is identified, or once a new incident is created, the alarm event may be associated with the incident. See reference numeral 1405 in FIG. 14.

In certain implementations, when a new alarm incident is created, it may be possible to identify certain system events occurring within a certain "pre-roll" period that precedes the alarm event that triggered creation of the new alarm incident. In some example implementations, the pre-roll period may be approximately 5 minutes, although shorter (for example, 1 minute, 2 minutes, 3 minutes, or 4 minutes) or longer (for example, 6 minutes, 7 minutes, 8 minutes, 9 minutes, or 10 minutes) periods may be used in alternative implementations. The duration of the pre-roll period may be set as a fixed default, or may be based on user input. The identified events in the pre-roll period can be incorporated into the alarm incident. These events may be identified and incorporated into the alarm incident because, in many cases, information about what happened in the moments leading up to the start of the alarm can be valuable in determining whether the alarm is real or false.

For example, an electronic cancellation signal followed shortly thereafter by a panic signal might normally be separated into distinct alarm incidents. In particular, delineation of alarm incidents may be determined by both the alarm signals and a time component, where the time component works in at least two ways. First, signals that are significantly separated in time generally should be broken into distinct alarm incidents, as that represents the real-world experience. Second, alarms that would ordinarily be considered distinct might be aggregated if they occur close in time. In some embodiments, a de-duplication process may be invoked on alarm events identified in the pre-roll period to avoid processing a same event multiple times. The de-duplication process can be used, for example, to enforce a rule that each alarm event can be associated with only one alarm incident.

In certain implementations, alarm events that are associated with a particular incident can be ordered based on a timestamp. See reference numeral 1406 in FIG. 14. For example, if, in response to receiving the alarm event, it is determined that the incoming alarm event postdates the most recent alarm incident (that is, the timestamp of the incoming alarm event is greater than or equal to the timestamp of the earliest alarm event already assigned to the most recent alarm incident), the new alarm event may be added to the events associated with the most recent alarm incident. The alarm incident state may then be calculated using the aggregated set of events (including the incoming alarm event), e.g., by using one or more rules or other logic to evaluate the various events for the incident to determine its current status. See reference numeral 1407 in FIG. 14. In some applications, this calculation may yield an update to the latest alarm incident or may yield multiple alarm incidents depending on whether the new event represents a new alarm incident. That is, the set of alarm events may be reallocated into a new set of alarm incidents, possibly with one or more previously-received alarm events being reallocated into a different alarm incident.

In some cases a time threshold may optionally be used to separate alarm events into distinct alarm incidents.

If, in response to receiving the alarm event, it is determined that the incoming alarm event predates the most recent alarm incident, then all alarm incidents for the monitored location may be retrieved and the two sequential alarm incidents that immediately precede and follow the alarm event may be identified, if they exist. The incoming alarm event may be aggregated with all the alarm events for those two adjacent alarm incidents, and the alarm incident states may be recalculated based on the aggregated set of alarm events. In some applications, this recalculation may yield an update to one or both of the existing alarm incidents, while in other applications this recalculation may yield a new alarm incident. The particular result in a given application will, in general, depend on the nature of the incoming alarm event and the existing chronological listing of previously received alarm events.

In some implementations alarm signals may be aggregated such that concurrent alarm events can be allocated to separate alarm incidents. This can be accomplished by decomposing alarm signals into specified alarm signal classifications. Example classifications may include security threats (such as a glass break signal or motion detection signal) and environmental threats (such as a moisture detection signal or a freeze detection signal). Where such classifications are used, incoming alarm signals may be grouped first by location and then by classification. This framework may facilitate monitoring of a single location that experiences multiple discrete events simultaneously, and may help both monitoring personnel and customers to deliberately ignore events associated with a less critical alarm incident (for example, a water leak) if there is a more critical alarm incident (for example, an intruder) occurring simultaneously.

Referring still to FIG. 14, once the alarm events are allocated into one or more alarm incidents, and the corresponding alarm incident state is calculated, the resulting state information can be persisted such that it is available to an alarm consumer, e.g., the SMS service 104, that requests a state of the alarm incident. For example, alarm data 1306 that represents an alarm event and/or an alarm incident can be persisted in alarm history persistence resource 1310. See reference numerals 1408 and 1409 in FIG. 14. In certain applications, alarm data 1306 can also be published on one or more alarm event queues 1309 from which the consumer 1307, e.g., the SMS service 104, can retrieve event and/or incident information based on a subscription. The consumer 1307 can use a public API associated with alarm history service 102 to acquire such data (see, for example, get alarm data request 1308 in FIG. 13), or via a subscription to a published message queue.

In certain implementations, the process illustrated in FIG. 14 can be executed concurrently for different monitored locations, with alarm events for a particular location being processed either sequentially in chronological order or as a batch. In other implementations calculations for a particular monitored location can be held until intervening calculations for a different monitored location are performed. In general, if incoming alarm events are processed in real-time, a corresponding collection of alarm incidents may be generated by alarm lifecycle calculator 1401 in real-time.

As noted above, the alarm lifecycle calculator 1401 may take as input a collection of alarm events for a given monitored location, ordered by time, and return a collection of alarm incident states. In certain implementations, an alarm incident state may include the contiguous block of alarm events associated with the calculation, as well as the alarm state data derived from the alarm events. The alarm state data may indicate, for example, whether a given alarm incident is currently in progress or resolved. The details of the alarm state data may be specific to the alarm event type. For example, an alarm signal may have an event contact identifier and a zone identifier, whereas an action performed by monitoring center environment personnel may have an action code, and optionally a comment or other similar information. The zone identifier may used, in certain implementations, to identify the type of device that generated a given alarm signal. When all pertinent alarm events have been processed, the collection of alarm incident states may be finalized, and the alarm lifecycle calculation may complete.

When incoming alarm events are processed by the alarm lifecycle calculator 1401 as illustrated in FIG. 14, alarm events triggered by personnel at the monitoring center environment, dispatch personnel, or emergency services personnel may generally aggregate into an existing alarm incident status calculation. Alarm events generated in response to a customer request (such as an alarm cancellation or a request for assistance) may also generally aggregate into an existing alarm incident status calculation. Alarm events generated from an alarm system, such as a location-based device, may trigger the creation of a new alarm incident status calculation, such as a panic signal generated by pressing a button on a keypad or fob. Likewise, the alarm lifecycle calculator 1401 may identify certain events, such as a signal from the monitoring center environment 620 that an alarm has been successfully cancelled, as triggering the closing of an alarm incident, such that a subsequent alarm signal may be separated into a corresponding subsequent alarm incident. Thus, alarm lifecycle calculator 1401 may be capable of both timeline-based and ruled-based differential processing of alarm events.

As outlined above, if there is an existing active alarm incident, the alarm event may be aggregated into the existing alarm incident status calculation, though it may change the handling of the alarm incident if the incoming alarm event has a higher priority than the alarm event currently governing the handling of the alarm incident. If there is not an existing active alarm incident, the incoming alarm event may trigger the creation of a new alarm incident status calculation.

In some cases, a de-duplication process may be invoked before performing an alarm incident status calculation to avoid processing a same event multiple times. For example, when incoming alarm events are processed, de-duplication can be performed (e.g., by comparing the data representing different events to identify instances in which the same or similar data is repeated) to determine whether the incoming alarm event has already been incorporated into an alarm event history for the relevant location. The de-duplication process may also be used, for example, to enforce a rule that each alarm event can be associated with only one alarm incident.

As alluded to above, certain alarm events can cause the priority of an active alarm event to be escalated, thereby affecting how the incident is handled (for example, by monitoring center environment personnel). For example, if an alarm event is generated at a monitored location 602 due to a glass break sensor having been triggered, the corresponding alarm incident might be rated as a burglary. Personnel at the monitoring center environment may respond by evaluating video clips captured by one or more image capture devices at the monitored location and dispatching law enforcement. If a customer arrives at the monitored location and generates a subsequent alarm event by actuating a "panic" button, that subsequent event may escalate handling of the alarm incident, thereby causing police dispatch to be prioritized. If the customer generates a subsequent alarm event by providing a "duress PIN", then that subsequent event may further escalate the police response, cause a monitoring specialist to abort customer contact calls, silence sirens annunciating the alarm, and/or hide alarm state information from the customer.

In certain implementations, only one alarm incident may be active at a particular time at a particular monitored location. In some cases, the active alarm incident can be assigned a high (or highest) priority and the handling of the alarm incident by personnel at the monitoring center environment 620 and the user interface provided to the customer is adjusted accordingly. The priority of an active alarm incident may be referred to as a governing signal that reflects both the monitoring center event handling protocol for the alarm (for example, how the monitoring center environment 620 will handle the alarm) and governs the user's experience vis-à-vis the alarm (including what is displayed to the user and what options are provided to the user). For example, a triggering alarm event may be associated with an initial lower priority, but the governing signal can be escalated in response to subsequently received alarm events based on, for example, actuation of a panic button or actuation and/or provision of a duress PIN. The governing signal and the alarm category may reflect what actions the monitoring center environment is expected to take, if any, in response to a given alarm incident and dictate the customer's user experience.

In some cases, priority escalation may make some alarms no longer cancelable, in which case monitoring center environment personnel may still dispatch emergency responders notwithstanding subsequent provision of a disarm or cancel command. These sequences of events may be processed differently in alternative implementations.

Figure 15:
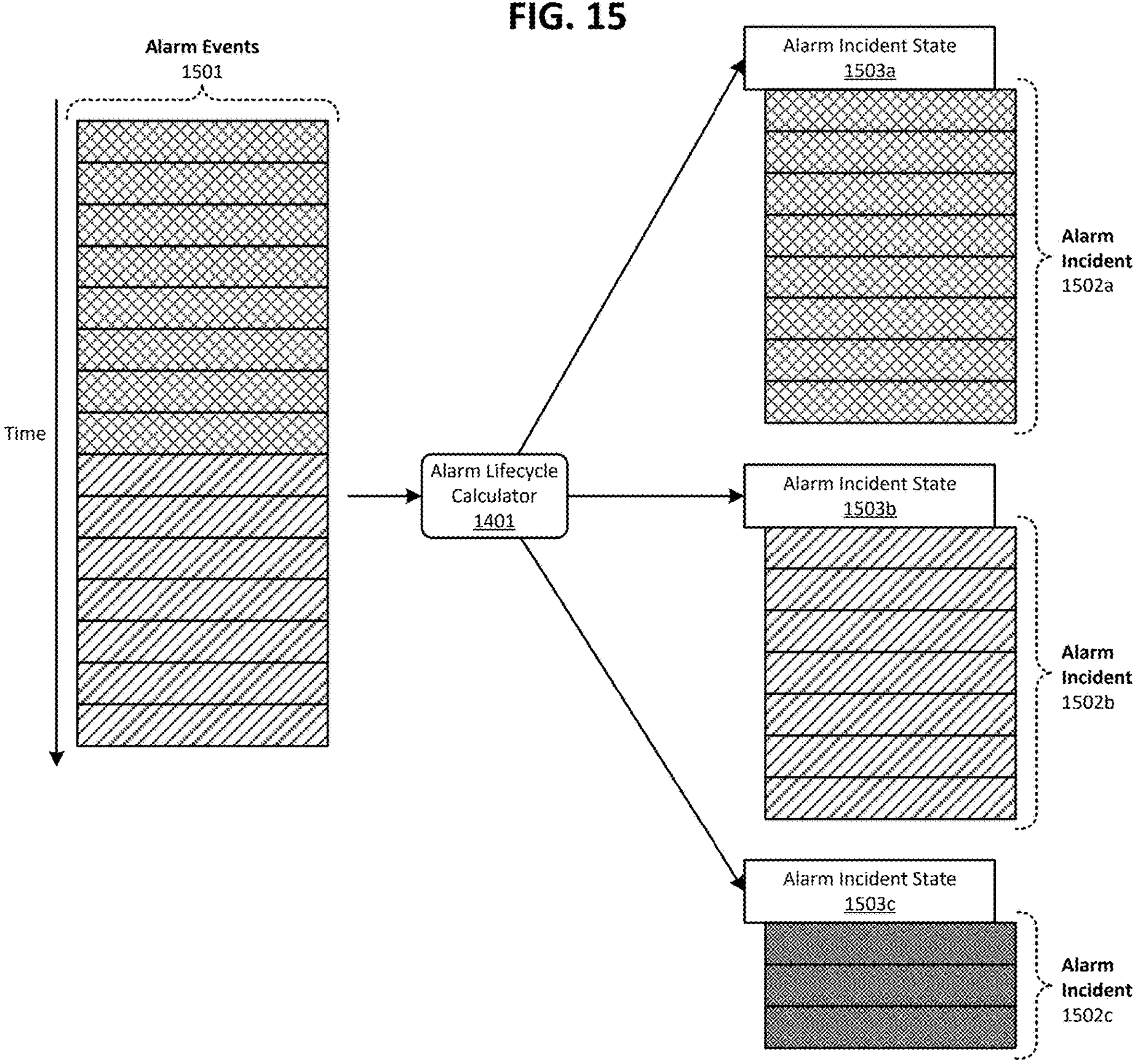
FIG. 15 is a schematic diagram illustrating the segmentation of an ordered list of alarm events into alarm incidents, in accordance with some implementations of the present disclosure.

FIG. 15 is a schematic diagram illustrating the segmentation of an ordered list of alarm events 1501 into alarm incidents 1502*a*, 1502*b*, 1502*c*, according to some examples described herein. More specifically, FIG. 15 represents the transformation of a collection of time-ordered alarm events 1501 into a collection of alarm incident states 1503*a*, 1503*b*, 1503*c* using the alarm lifecycle calculator 1401. As illustrated, an alarm incident state (for example, state 1503*a*) may be associated with a contiguous collection of alarm events (for example, the collection of alarm events aggregated into alarm incident 1502*a*).

Before alarm lifecycle calculator 1401 is invoked, event data 1302 may be received from event queue 1303 or retrieved from alarm history persistence resource 1310. An incoming alarm event may be combined with existing (that is, previously received) alarm events to form a chronologically-ordered sequence of alarm events 1501. The alarm lifecycle calculator 1401 may generate alarm incident states 1503*a*, 1503*b*, 1503*c*, and determine how the collection of alarm events 1501 should be allocated into alarm incidents 1502*a*, 1502*b*, 1502*c*, regardless of previous assignments. One technique for performing these allocations and determining these states is schematically illustrated in FIG. 14.

For example, if there are ten existing alarm events and an incoming (eleventh) alarm event is received, execution of the alarm lifecycle calculator 1401 could result in a total redistribution of the eleven alarm events. Execution of the alarm lifecycle calculator 1401 may also result in updated alarm incident states. For example, in the particular application represented in FIG. 15, receipt of one new alarm event may result in up to three updated alarm incident states. In other words, receipt of a new alarm event may trigger a reassessment of previously-received alarm events as part of the chronologically-ordered input to the alarm lifecycle calculator 1401, although that reassessment may not necessarily result in a modified alarm incident state for existing alarm incidents. Because certain alarm events may not affect the state of the corresponding alarm incident, it is possible that processing of an incoming alarm event will not result in modification of any previously calculated alarm incident states. In applications where there are no existing alarm incidents when a new alarm event is received, a new alarm incident may be created and a state for that new alarm incident may be determined.

Figure 16:
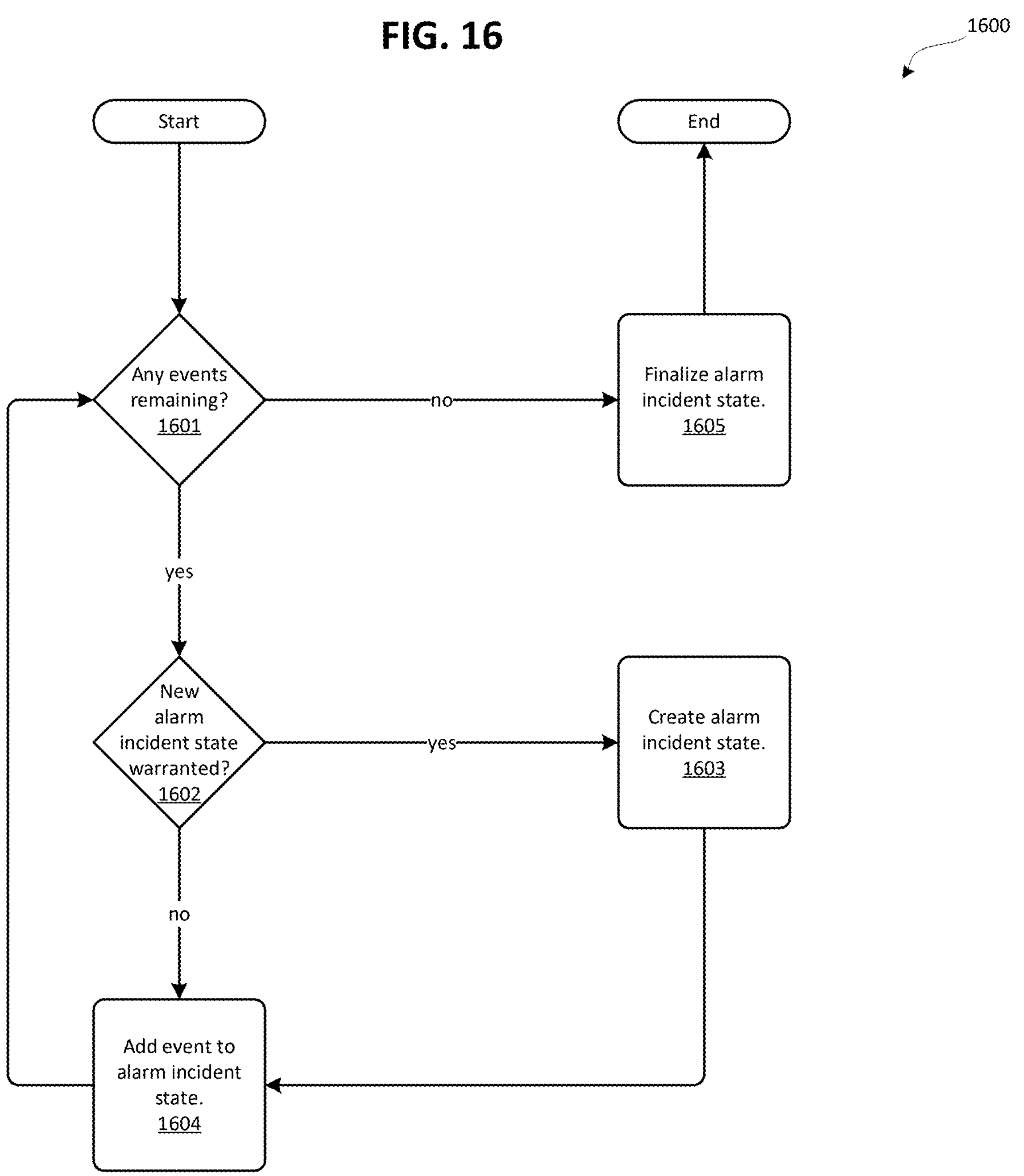
FIG. 16 is a flowchart illustrating a technique for processing a collection of alarm events into alarm incident states, in accordance with some implementations of the present disclosure.

FIG. 16 is a flowchart illustrating an example method 1600 for processing a collection of alarm events, according to some implementations described herein. More specifically, FIG. 16 represents example logic that can be invoked to process a collection of alarm events using the alarm lifecycle calculator 1401 as disclosed herein. As shown, the method 1600 may begin by making a determination with respect to whether any unprocessed incoming events exist or remain. See reference numeral 1601 in FIG. 16. For an unprocessed incoming alarm event, the alarm lifecycle calculator 1401 may determine whether a new alarm incident state calculation is warranted. See reference numeral 1602 in FIG. 16. A new alarm incident state calculation can be warranted when, for example, there is no active alarm incident status calculation; when an alarm event is trigged by a monitoring specialist, a dispatcher, emergency services personnel, or other designated personnel; and/or a customer request for alarm cancellation or assistance is received. On the other hand, if there is an active alarm incident, an alarm event may be aggregated into an existing alarm incident status calculation. Different criteria for determining whether a new alarm incident state calculation is warranted can be applied in different implementations. If a new alarm incident state calculation is warranted, such calculation may be performed. See reference numeral 1603 in FIG. 16.

After an alarm incident state is created, if warranted, the alarm lifecycle calculator may then add the incoming alarm event to the alarm incident state. See reference numeral 1604 in FIG. 16. When all alarm events (for example, all queued alarm events at any given time) have been processed, the collection of alarm incident states may be finalized by applying additional logic to the partial state of each alarm incident state. See reference numeral 1605 in FIG. 16. The resulting collection of alarm incident states may then be returned.

In certain implementations, the alarm history service 102 may map an alarm incident state calculation by alarm lifecycle calculator 1401 to either an existing alarm incident or a new alarm incident. The alarm history service 102 may further update the assignment of the alarm events to reflect the current associations to alarm incidents, persist the alarm incidents and any modified alarm events, and then publish the updated alarm incidents and any modified alarm events to the appropriate message topics. This information can be published, for example, to the SMS service 104 for processing as described above.

As described above, alarm signals can be delivered to the alarm history service 102 through at least two channels. First, as the data center environment 624 delivers the alarm signals from components at the monitored location 602 to the monitoring center environment 620, messages can be generated documenting such delivery. In this context, alarm lifecycle calculator 1401 can optionally predict how the incoming alarm signal will be handled by the monitoring center environment 620. Additionally or alternatively, when the monitoring center environment 620 receives the alarm signal, it can generate an alarm event documenting the delivery. If the alarm signal is delivered from the monitoring center environment 620 itself, the handling of such alarm signal may generally be resolved prior to the corresponding alarm event being generated.

For example, an alarm event may be generated at a monitored location 602 due to a glass break sensor having been triggered. An electronic alarm cancellation signal may be received a short time later. This scenario may results in four distinct alarm events associated with a single alarm incident: an alarm event generated by the glass break sensor, an alarm event generated by receipt of the glass break signal by the monitoring center environment (a burglary signal was received and will be handled accordingly), an alarm event corresponding to the electronic cancellation (for example generated by the base station, a text message cancel command, or an application-generated cancel command), and as long as the cancellation occurs within a specified time interval from the initial glass break signal, an alarm event generated by the receipt of the cancellation signal by the monitoring center environment may indicate that the cancel signal was received and the alarm may be treated as a false alarm. Based on this common event sequence, a prediction can be made that the incoming cancellation signal will, in fact, result in cancellation of the active alarm, such prediction being made even before the monitoring center environment 620 actually cancels the alarm. Later, a confirmation can be received that the monitoring center environment 620 actually cancelled the alarm as predicted. In this example, alarm lifecycle calculator 1401 may trigger an update to a corresponding customer state, indicating the customer's request to cancel the alarm. The customer may cancel the alarm using a mobile application, using SMS text messaging (e.g., as described above in connection with FIGS. 1-5), and/or using other similar communication means. In this example, if the customer does not cancel the alarm, the monitoring state may change, but the customer state may not change not until an event is received documenting another customer interaction.

When signals are received from the monitoring center environment 620 that characterize a response to a given alarm event, further predictions may be made regarding next actions which may be taken by monitoring personnel. For example, the monitoring center environment 620 may send an acknowledgement of an incoming alarm signal with information about how monitoring personnel plan to handle the alarm signal. Additionally or alternatively, the monitoring center environment 620 may send data characterizing activities of the monitoring personnel as they handle the alarm incident. Such data might indicate, for example, that monitoring personnel have attempted to dispatch emergency response to an invalid address or have attempted to call an invalid phone number. Each different message might have custom logic tailored to address a given situation.

While alarm signals generated by the data center environment 624 will often be received and handled before those generated by the monitoring center environment 620, race conditions may resolve themselves in such a fashion that alarm signals are received in the opposite order. However, regardless of which channel delivers the alarm signal event and in what order, the evaluation and response by alarm lifecycle calculator 1401, as described herein, can be the same.

As noted above, the triggering and subsequent handling of an alarm may involve actions taken by various actors interacting with alarm system components. These various actors may respond in different ways to an alarm event depending on the type of alarm incident (for example, burglary, fire, medical emergency, environmental event). So a given alarm incident may have different states corresponding to the status of these different actors. Because alarm incident state is not readily distilled into a single value, in certain implementations its representation can include a separate state per actor.

In certain implementations, the alarm lifecycle calculator 1401 may determine an "alarm state" that represents those properties of the alarm incident that are common across all relevant actors for the alarm incident. Examples of alarm state include, but are not limited to, a creation timestamp (the timestamp of the alarm event that triggered the alarm incident), an alarm category, a monitored location identifier, a triggering signal, a governing signal, and a final alarm disposition (for example, actual or false).

In certain implementations, the alarm lifecycle calculator 1401 may determine a "monitoring state" that represents the handling of the alarm incident as performed by the monitoring center environment 620, monitoring center environment personnel, and other personnel downstream of the monitoring center environment 620. Examples of monitoring state include, but are not limited to, an overall state (for example, representing whether the alarm is actively being handled by the monitoring center environment 620), details of the active monitoring center environment personnel assigned to the alarm incident, and any monitoring outcomes or dispositions. Monitoring state can be updated based on events generated by the monitoring center environment 620, monitoring center environment personnel, and other personnel downstream of the monitoring center environment 620.

In certain implementations, the alarm lifecycle calculator 1401 may determine a "customer contact state" that represents, for example, requests initiated by the customer and communications between the monitored location's customer contacts and the monitoring center environment 620. In certain implementations customers can request that an alarm be cancelled or that emergency services be dispatched via phone calls between the customer contact and the monitoring center. Such requests may be initiated using a mobile application (for example that provides customer interface 632A), using SMS text messaging (e.g., as described above in connection with FIGS. 1-5), and/or using other similar communication means. Different customers may make conflicting requests, in which case the alarm lifecycle calculator 1401 can be configured to determine the overall alarm incident state based on the nature and timing of the various requests. Customer contact state can be updated based on incoming customer requests and events generated by the monitoring center environment, monitoring center environment personnel, and other personnel downstream of the monitoring center environment 620.

In certain implementations, the alarm lifecycle calculator 1401 may determine a "dispatch state" that represents the state of dispatch requests for emergency services. Dispatch may be requested by, for example, personnel associated with the monitoring center environment 620. The dispatch of emergency services may be accepted or declined. After dispatch of emergency services has been requested, the dispatch may be cancelled, for example, when an alarm is later determined to be a false alarm. Dispatch state can be updated based on events generated by the monitoring center environment 620, monitoring center environment personnel, and other personnel downstream of the monitoring center environment 620.

Monitoring center personnel may undertake additional follow-up actions after the alarm incident has concluded. Examples of such follow-up actions include, but are not limited to, handling a customer or dispatcher call requesting additional information on the alarm incident; handling a customer call requesting that the alarm incident handling be changed (for example, by cancelling a dispatch request); handling a dispatcher call requesting and/or updating alarm incident status; and handling an inbound request in accordance with the Automated Secure Alarm Protocol (ASAP). In general, a customer or dispatcher may call regarding any concluded alarm incident, and thus such follow-up actions are not necessarily associated with the most recently concluded alarm incident. Thus, in certain implementations, monitoring personnel may annotate such follow-up actions with an identified alarm incident, thus allowing alarm incident status to be updated accurately. In such implementations, the annotation provided by the monitoring personnel may override a general instruction to aggregate alarm events by timestamp.

Figure 17:
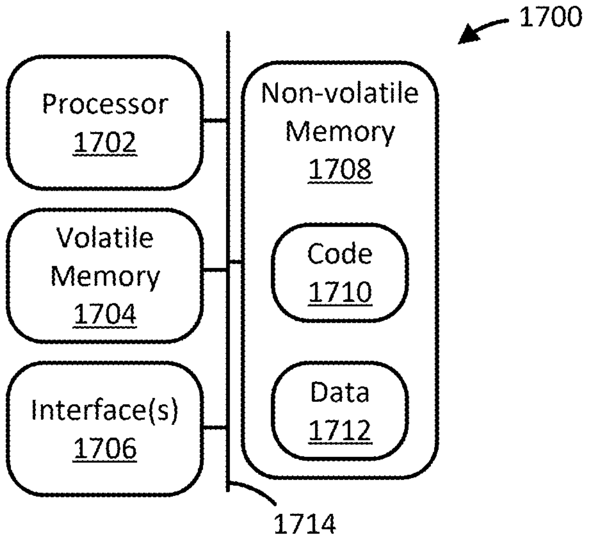
FIG. 17 is a schematic diagram of a computing device that may be used to implement a customer device, a monitoring device, and/or one or more of the other components of the systems shown in FIGS. 1, 6, 10 and 12, in accordance with some implementations of the present disclosure.

Turning now to FIG. 17, a computing device 1700 is illustrated schematically. As shown in FIG. 17, the computing device includes at least one processor 1702, volatile memory 1704, one or more interfaces 1706, non-volatile memory 1708, and an interconnection mechanism 1714. The non-volatile memory 1708 includes code 1710 and at least one data store 1712.

In some examples, the non-volatile (non-transitory) memory 1708 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1710 stored in the non-volatile memory can include an operating system and one or more applications or programs that are configured to execute under the operating system. Alternatively or additionally, the code 1710 can include specialized firmware and embedded software that is executable without dependence upon a commercially available operating system. Regardless, execution of the code 1710 can result in manipulated data that may be stored in the data store 1712 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing with the example of FIG. 17, the processor 1702 can be one or more programmable processors to execute one or more executable instructions, such as a computer program specified by the code 1710, to control the operations of the computing device 1700. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1704) and executed by the circuitry. In some examples, the processor 1702 is a digital processor, but the processor 1702 can be analog, digital, or mixed. As such, the processor 1702 can execute the function, operation, or sequence of operations using digital values and/or using analog signals. In some examples, the processor 1702 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1702 that are multicore can provide functionality for parallel, simultaneous execution of instructions or for parallel, simultaneous execution of one instruction on more than one piece of data.

Continuing with the example of FIG. 17, prior to execution of the code 1710 the processor 1702 can copy the code 1710 from the non-volatile memory 1708 to the volatile memory 1704. In some examples, the volatile memory 1704 includes one or more static or dynamic random access memory (RAM) chips and/or cache memory (e.g. memory disposed on a silicon die of the processor 1702). Volatile memory 1704 can offer a faster response time than a main memory, such as the non-volatile memory 1708.

Through execution of the code 1710, the processor 1702 can control operation of the interfaces 1706. The interfaces 1706 can include network interfaces. These network interfaces can include one or more physical interfaces (e.g., a radio, an ethernet port, a USB port, etc.) and a software stack including drivers and/or other code 1710 that is configured to communicate with the one or more physical interfaces to support one or more LAN, PAN, and/or WAN standard communication protocols. The communication protocols can include, for example, TCP and UDP among others. As such, the network interfaces enable the computing device 1700 to access and communicate with other computing devices via a computer network.

The interfaces 1706 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1710 that is configured to communicate with the user input and/or output devices. As such, the user interfaces enable the computing device 1700 to interact with users to receive input and/or render output. This rendered output can include, for instance, one or more GUIs including one or more controls configured to display output and/or receive input. The input can specify values to be stored in the data store 1712. The output can indicate values stored in the data store 1712.

Continuing with the example of FIG. 17, the various features of the computing device 1700 described above can communicate with one another via the interconnection mechanism 1714. In some examples, the interconnection mechanism 1714 includes a communications bus.

The following clauses describe example implementations of the systems and method described herein.

Clause 1. A method, comprising: causing, by a computing system, transmission of a short message service (SMS) message to an endpoint device, the SMS message being indicative of a signal for an alarm condition present at a monitored location; determining, by the computing system, that a reply to the SMS message from the endpoint device includes a command to take an action with respect to the alarm condition; retrieving, by the computing system and from one or more data stores, context about an incident at the monitored location; and sending, by the computing system and based at least in part on the command and the context, at least one instruction to take an action with respect to the alarm condition.

Clause 2. The method of clause 1, wherein: the reply includes a request to cancel the alarm condition; and sending the at least one instruction includes sending a first instruction to a second computing system to cancel the alarm condition.

Clause 3. The method of clause 2, further comprising: determining, by the computing system, to send the first instruction based at least in part on the context indicating that emergency services have not been dispatched to the monitored location.

Clause 4. The method of clause 2 or clause 3, further comprising: generating, by the computing system and based on information represented in the context, a second SMS message indicating how or by whom the alarm condition was canceled; wherein sending the at least one instruction further includes sending a second instruction to cause the second SMS message to be sent to the endpoint device.

Clause 5. The method of any of clauses 2-4, further comprising: generating, by the computing system and based on information represented in the context, a second SMS message indicating how or by whom the alarm condition was canceled; wherein sending the at least one instruction further includes sending a second instruction to cause the second SMS message to be sent to another endpoint device.

Clause 6. The method of clause 1, wherein: the reply includes a request to cancel the alarm condition; and sending the at least one instruction includes sending a first instruction to cause a second SMS message to be sent to the endpoint device, the second SMS message indicating that the alarm condition cannot be canceled.

Clause 7. The method of clause 6, further comprising: determining, by the computing system, to send the first instruction based at least in part on the context indicating that emergency services have already been dispatched to the monitored location.

Clause 8. The method of clause 6 or clause 7, further comprising: generating, by the computing system and based on information represented in the context, the second SMS message to indicate a reason why the alarm condition could not be canceled.

Clause 9. The method of clause 1, wherein: the reply includes a request to send emergency services; and sending the at least one instruction includes sending a first instruction to a second computing system to dispatch emergency services to the monitored location.

Clause 10. The method of clause 9, further comprising: generating, by the computing system and based on information represented in the context, a second SMS message indicating how or by whom emergency services were requested; wherein sending the at least one instruction further includes sending a second instruction to cause the second SMS message to be sent to the endpoint device.

Clause 11. The method of clause 9 or clauses 10, further comprising: generating, by the computing system and based on information represented in the context, a second SMS message indicating how or by whom emergency services were requested; wherein sending the at least one instruction further includes sending a second instruction to cause the second SMS message to be sent to another endpoint device.

Clause 12. A system, comprising: one or more processors; and one or more computer-readable mediums encoded with instructions which, when executed by the one or more processors, cause the system to: cause transmission of a short message service (SMS) message to an endpoint device, the SMS message being indicative of a signal for an alarm condition present at a monitored location; determine that a reply to the SMS message from the endpoint device includes a command to take an action with respect to the alarm condition; retrieve, from one or more data stores, context about an incident at the monitored location; and send, based at least in part on the command and the context, at least one instruction to take an action with respect to the alarm condition.

Clause 13. The system of clause 12, wherein the reply includes a request to cancel the alarm condition, and the one or more computer-readable mediums are further encoded with additional instructions which, when executed by the one or more processors, further cause the system to: send the at least one instruction at least in part by sending a first instruction to a second computing system to cancel the alarm condition.

Clause 14. The system of clause 13, wherein the one or more computer-readable mediums are further encoded with additional instructions which, when executed by the one or more processors, further cause the system to: determine to send the first instruction based at least in part on the context indicating that emergency services have not been dispatched to the monitored location.

Clause 15. The system of clause 13 or clause 14, wherein the one or more computer-readable mediums are further encoded with additional instructions which, when executed by the one or more processors, further cause the system to: generate, based on information represented in the context, a second SMS message indicating how or by whom the alarm condition was canceled; and send the at least one instruction further at least in part by sending a second instruction to cause the second SMS message to be sent to another endpoint device.

Clause 16. The system of clause 12, wherein the reply includes a request to cancel the alarm condition, and the one or more computer-readable mediums are further encoded with additional instructions which, when executed by the one or more processors, further cause the system to: send the at least one instruction at least in part by sending a first instruction to cause a second SMS message to be sent to the endpoint device, the second SMS message indicating that the alarm condition cannot be canceled.

Clause 17. The system of clause 16, wherein the one or more computer-readable mediums are further encoded with additional instructions which, when executed by the one or more processors, further cause the system to: determine to send the first instruction based at least in part on the context indicating that emergency services have already been dispatched to the monitored location.

Clause 18. The system of clause 16 or clause 17, wherein the one or more computer-readable mediums are further encoded with additional instructions which, when executed by the one or more processors, further cause the system to: generate, based on information represented in the context, the second SMS message to indicate a reason why the alarm condition could not be canceled.

Clause 19. A method, comprising: receiving, by a computing system, first and second indications that first and second conditions were detected by first and second sensors, respectively, at a monitored location; and causing, by the computing system, first and second short message service (SMS) messages indicative of the first and second conditions, respectively, to be sent to an endpoint device, the second SMS message including content abbreviated based at least in part on the first SMS message having been previously sent to the endpoint device.

Clause 20. The method of clause 19, further comprising: in response to receipt of the second indication, retrieving, by the computing system and from one or more data stores, context about an incident at the monitored location, the context including information concerning the first condition; causing, by the computing system and based at least in part on the information, the content of the second SMS message to be abbreviated.

Clause 21. A system, comprising: one or more processors; and one or more computer-readable mediums encoded with instructions which, when executed by the one or more processors, cause the system to the method of any of clauses 1-12.

Clause 22. A system, comprising: one or more processors; and one or more computer-readable mediums encoded with instructions which, when executed by the one or more processors, cause the system to the method of clause 19 or clause 20.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as “first,” “second,” “third,” etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements.

The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

What is claimed is:

1. A method, comprising:

causing, by a computing system, transmission of a short message service (SMS) message to an endpoint device, the SMS message indicating that an alarm condition was detected by a sensor at a monitored location;

determining, by the computing system, that a reply to the SMS message from the endpoint device includes a command requesting an action with respect to the alarm condition;

determining, by the computing system and based on a current state of an alarm incident at the monitored location, whether the requested action is allowed; and performing, by the computing system, at least one operation based on whether the requested action is allowed, wherein:

upon determining that the requested action is allowed, the at least one operation includes sending at least one instruction to a monitoring system to perform the requested action with respect to the alarm condition, and upon determining that the requested action is not allowed, the at least one operation includes causing a response to be sent to the endpoint device indicating that the requested action was denied.

2. The method of claim 1, wherein:

the reply includes a request to cancel the alarm condition;

determining whether the requested action is allowed includes determining that the requested action is allowed; and the at least one instruction includes a first instruction to cancel the alarm condition.

3. The method of claim 2, wherein the computing system determines that the requested action is allowed based at least in part on the current state of the alarm condition indicating that emergency services have not been dispatched to the monitored location.

4. The method of claim 3, further comprising:

retrieving, by the computing system and from one or more data stores, context about an incident at the monitored location; and generating, by the computing system and based on information represented in the context, a second SMS message indicating how or by whom the alarm condition was canceled;

wherein the at least one operation further includes causing the second SMS message to be sent to the endpoint device.

5. The method of claim 2, further comprising:

retrieving, by the computing system and from one or more data stores, context about an incident at the monitored location; and generating, by the computing system and based on information represented in the context, a second SMS message indicating how or by whom the alarm condition was canceled;

wherein the at least one operation further includes causing the second SMS message to be sent to another endpoint device.

6. The method of claim 1, wherein:

the reply includes a request to cancel the alarm condition;

determining whether the requested action is allowed includes determining that the requested action is not allowed; and causing the response to be sent to the endpoint device includes causing a second SMS message to be sent to the endpoint device, the second SMS message indicating that the alarm condition cannot be canceled.

7. The method of claim 6, wherein the computing system determines that the requested action is not allowed based at least in part on the current state of the alarm condition indicating that emergency services have already been dispatched to the monitored location.

8. The method of claim 6, further comprising:

retrieving, by the computing system and from one or more data stores, context about an incident at the monitored location; and generating, by the computing system and based on information represented in the context, the second SMS message to indicate a reason why the alarm condition could not be canceled.

9. The method of claim 1, wherein:

the reply includes a request to send emergency services;

determining whether the requested action is allowed includes determining that the requested action is allowed; and the at least one instruction includes a first instruction to dispatch emergency services to the monitored location.

10. The method of claim 9, further comprising:

retrieving, by the computing system and from one or more data stores, context about an incident at the monitored location; and generating, by the computing system and based on information represented in the context, a second SMS message indicating how or by whom emergency services were requested;

wherein the at least one operation further includes causing the second SMS message to be sent to the endpoint device.

11. The method of claim 9, further comprising:

retrieving, by the computing system and from one or more data stores, context about an incident at the monitored location; and generating, by the computing system and based on information represented in the context, a second SMS message indicating how or by whom emergency services were requested;

wherein the at least one operation further includes causing the second SMS message to be sent to another endpoint device.

12. A system, comprising:

one or more processors; and one or more computer-readable mediums encoded with instructions which, when executed by the one or more processors, cause the system to:

cause transmission of a short message service (SMS) message to an endpoint device, the SMS message indicating that an alarm condition was detected by a sensor at a monitored location;

determine that a reply to the SMS message from the endpoint device includes a command requesting an action with respect to the alarm condition;

determine, based on a current state of an alarm incident at the monitored location, whether the requested action is allowed; and perform at least one operation based on whether the requested action is allowed, wherein:

upon determining that the requested action is allowed, the at least one operation includes sending at least one instruction to a monitoring system to perform the requested action with respect to the alarm condition, and upon determining that the requested action is not allowed, the at least one operation includes causing a response to be sent to the endpoint device indicating that the requested action was denied.

13. The system of claim 12, wherein:

the reply includes a request to cancel the alarm condition;

the one or more computer-readable mediums are further encoded with additional instructions which, when executed by the one or more processors, further cause the system to determine, based on the current state of the alarm incident at the monitored location, that the requested action is allowed; and the at least one instruction includes a first instruction to cancel the alarm condition.

14. The system of claim 13, wherein the one or more computer-readable mediums are further encoded with additional instructions which, when executed by the one or more processors, further cause the system to:

determine that the requested action is allowed based at least in part on the current state of the alarm condition indicating that emergency services have not been dispatched to the monitored location.

15. The system of claim 13, wherein the one or more computer-readable mediums are further encoded with additional instructions which, when executed by the one or more processors, further cause the system to:

retrieve, from one or more data stores, context about an incident at the monitored location; and generate, based on information represented in the context, a second SMS message indicating how or by whom the alarm condition was canceled;

wherein the at least one operation further includes causing the second SMS message to be sent to another endpoint device.

16. The system of claim 12, wherein the reply includes a request to cancel the alarm condition, and the one or more computer-readable mediums are further encoded with additional instructions which, when executed by the one or more processors, further cause the system to:

determine, based on the current state of the alarm incident at the monitored location, that the requested action is not allowed; and cause the response to be sent to the endpoint device at least in part by causing a second SMS message to be sent to the endpoint device, the second SMS message indicating that the alarm condition cannot be canceled.

17. The system of claim 16, wherein the one or more computer-readable mediums are further encoded with additional instructions which, when executed by the one or more processors, further cause the system to:

determine that the requested action is not allowed based at least in part on the current state of the alarm condition indicating that emergency services have already been dispatched to the monitored location.

18. The system of claim 16, wherein the one or more computer-readable mediums are further encoded with additional instructions which, when executed by the one or more processors, further cause the system to:

retrieve, from one or more data stores, context about an incident at the monitored location; and generate, based on information represented in the context, the second SMS message to indicate a reason why the alarm condition could not be canceled.

19. The system of claim 12, wherein:

the reply includes a request to send emergency services;

the one or more computer-readable mediums are further encoded with additional instructions which, when executed by the one or more processors, further cause the system to determine, based on the current state of the alarm incident at the monitored location, that the requested action is allowed; and the at least one instruction includes a first instruction to dispatch emergency services to the monitored location.

20. The system of claim 19, wherein the one or more computer-readable mediums are further encoded with additional instructions which, when executed by the one or more processors, further cause the system to:

retrieve, from one or more data stores, context about an incident at the monitored location; and generate, based on information represented in the context, a second SMS message indicating how or by whom emergency services were requested;

wherein the at least one operation further includes causing the second SMS message to be sent to another endpoint device.

* * * * *